United States Patent [19]
Rouillard et al.

[11] Patent Number: 6,087,036
[45] Date of Patent: Jul. 11, 2000

[54] THERMAL MANAGEMENT SYSTEM AND METHOD FOR A SOLID-STATE ENERGY STORING DEVICE

[75] Inventors: Roger Rouillard, Beloeil, Canada; Michael K. Domroese, South St. Paul, Minn.; Michel Gauthier, La Prairie, Canada; Joseph A. Hoffman, Minneapolis, Minn.; David D. Lindeman, Hudson, Wis.; Joseph-Robert-Gaétan Noël, St-Hubert, Canada; Vern E. Radewald, Austin, Tex.; Michel Ranger, Lachine, Canada; Jean Rouillard, Saint-Luc, Canada; Toshimi Shiota, St. Bruno, Canada; Philippe St-Germain, Outremont, Canada; Anthony Sudano, Laval, Canada; Jennifer L. Trice, Eagan; Thomas A. Turgeon, Fridley, both of Minn.

[73] Assignees: 3M Innovative Properties Company, St. Paul, Minn.; Hydro-Quebec Corporation, Montreal, Canada

[21] Appl. No.: 08/900,566

[22] Filed: Jul. 25, 1997

[51] Int. Cl.[7] .................................................. H01M 10/50
[52] U.S. Cl. ............................................. 429/66; 429/120
[58] Field of Search ................................ 429/62, 66, 120

[56] References Cited

U.S. PATENT DOCUMENTS

| | | |
|---|---|---|
| 2,812,376 | 11/1957 | Yardney . |
| 3,193,412 | 7/1965 | Salkind et al. . |
| 3,390,014 | 6/1968 | Eisler . |
| 3,578,506 | 5/1971 | Chassoux . |
| 3,630,783 | 12/1971 | Przybyla ................................. 136/107 |
| 3,786,466 | 1/1974 | Naito et al. ............................ 340/255 |
| 3,793,501 | 2/1974 | Stonestrom . |
| 3,899,355 | 8/1975 | Chiklis . |
| 3,937,635 | 2/1976 | Mead et al. ........................... 136/83 R |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 0 170 883 A1 | 2/1986 | European Pat. Off. . |
| 177 225 A1 | 4/1986 | European Pat. Off. . |
| 0 225 767 A2 | 6/1987 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |

(List continued on next page.)

*Primary Examiner*—Stephen Kalafut
*Attorney, Agent, or Firm*—Mueting, Raasch & Gebhardt, P.A.

[57] ABSTRACT

An improved electrochemical energy storing device includes a number of thin-film electrochemical cells which are maintained in a state of compression through use of an internal or an external pressure apparatus. A thermal conductor, which is connected to at least one of the positive or negative contacts of each electrochemical cell, conducts current into and out of the electrochemical cells and also conducts thermal energy between the electrochemical cells and thermally conductive material disposed on a wall structure adjacent the conductors. The wall structure includes electrically resistive material, such as an anodized coating or a thin film of plastic. The thermal conductors are fabricated to include a spring mechanism which expands and contacts to maintain mechanical contact between the electrochemical cells and the thermally conductive material in the presence of relative movement between the electrochemical cells and the wall structure. An active cooling apparatus may be employed external to a hermetically sealed housing containing the electrochemical cells to enhance the transfer of thermal energy into and out of the electrochemical cells. An integrated interconnect board may be disposed within the housing onto which a number of electrical and electromechanical components are mounted. Heat generated by the components is conducted from the interconnect board to the housing using the thermal conductors.

37 Claims, 55 Drawing Sheets

U.S. PATENT DOCUMENTS

| | | | |
|---|---|---|---|
| 4,028,479 | 6/1977 | Fanciullo et al. | 429/152 |
| 4,060,669 | 11/1977 | Fanciullo | 429/152 |
| 4,060,670 | 11/1977 | Tamminen | 429/154 |
| 4,080,728 | 3/1978 | Buckler | 29/623.4 |
| 4,091,186 | 5/1978 | Ott et al. | 429/157 |
| 4,098,965 | 7/1978 | Kinsman | 429/153 |
| 4,105,807 | 8/1978 | Arora | 427/126 |
| 4,137,627 | 2/1979 | Kinsman | 29/623.4 |
| 4,150,266 | 4/1979 | Patrichi . | |
| 4,152,825 | 5/1979 | Bruneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,238,721 | 12/1980 | DeLuca et al. . | |
| 4,241,152 | 12/1980 | Klink . | |
| 4,303,877 | 12/1981 | Meinhold . | |
| 4,321,435 | 3/1982 | Grieger et al. . | |
| 4,322,484 | 3/1982 | Sugalski | 429/94 |
| 4,342,978 | 8/1982 | Meister . | |
| 4,370,531 | 1/1983 | Tobin . | |
| 4,383,013 | 5/1983 | Bindin et al. . | |
| 4,409,086 | 10/1983 | Haas et al. | 204/269 |
| 4,409,538 | 10/1983 | Tabata . | |
| 4,429,026 | 1/1984 | Bruder | 429/152 |
| 4,436,792 | 3/1984 | Tomino et al. | 429/1 |
| 4,477,545 | 10/1984 | Akridge et al. | 429/191 |
| 4,479,083 | 10/1984 | Sullivan . | |
| 4,490,707 | 12/1984 | O'Leary . | |
| 4,495,259 | 1/1985 | Uba | 429/161 |
| 4,507,857 | 4/1985 | Epstein et al. | 29/623.2 |
| 4,517,265 | 5/1985 | Belanger et al. . | |
| 4,518,665 | 5/1985 | Fujita et al. . | |
| 4,525,439 | 6/1985 | Simonton | 429/162 |
| 4,547,438 | 10/1985 | McArthur et al. | 429/82 |
| 4,571,468 | 2/1986 | Weldon . | |
| 4,654,278 | 3/1987 | McManis, III et al. | 429/112 |
| 4,664,993 | 5/1987 | Sturgis et al. | 429/178 |
| 4,670,703 | 6/1987 | Williams . | |
| 4,691,085 | 9/1987 | Swanson . | |
| 4,692,577 | 9/1987 | Swanson . | |
| 4,707,795 | 11/1987 | Alber et al. . | |
| 4,752,540 | 6/1988 | Chua et al. | 429/56 |
| 4,758,483 | 7/1988 | Armand et al. . | |
| 4,816,354 | 3/1989 | Tamminen | 429/162 |
| 4,824,746 | 4/1989 | Belanger et al. . | |
| 4,828,939 | 5/1989 | Turley et al. . | |
| 4,830,936 | 5/1989 | Planchat et al. | 429/110 |
| 4,851,307 | 7/1989 | Armand et al. . | |
| 4,852,684 | 8/1989 | Packard . | |
| 4,883,726 | 11/1989 | Peled et al. | 424/120 |
| 4,887,348 | 12/1989 | Tamminen | 29/623.2 |
| 4,897,917 | 2/1990 | Gauthier et al. . | |
| 4,911,993 | 3/1990 | Turley et al. | 429/27 |
| 4,913,259 | 4/1990 | Packard . | |
| 4,923,582 | 5/1990 | Abrahamson et al. | 204/255 |
| 4,927,717 | 5/1990 | Turley et al. | 429/27 |
| 4,961,043 | 10/1990 | Koenck . | |
| 4,967,136 | 10/1990 | Nofzinger . | |
| 4,971,531 | 11/1990 | Aikioniemi . | |
| 4,973,936 | 11/1990 | Dimpault-Darcy et al. . | |
| 4,997,732 | 3/1991 | Austin et al. | 429/153 |
| 5,008,161 | 4/1991 | Johnston | 429/7 |
| 5,057,385 | 10/1991 | Hope et al. . | |
| 5,066,555 | 11/1991 | Tamminen | 429/121 |
| 5,070,787 | 12/1991 | Weldon et al. . | |
| 5,071,652 | 12/1991 | Jones et al. . | |
| 5,089,027 | 2/1992 | Rossoll et al. | 29/623.2 |
| 5,162,171 | 11/1992 | Jones . | |
| 5,180,641 | 1/1993 | Burns et al. | 429/1 |
| 5,197,889 | 3/1993 | Rizzo et al. . | |
| 5,199,239 | 4/1993 | Younger . | |
| 5,204,194 | 4/1993 | Miller et al. | 429/7 |
| 5,227,259 | 7/1993 | Weaver et al. . | |
| 5,227,264 | 7/1993 | Duval et al. . | |
| 5,283,512 | 2/1994 | Stadnick et al. . | |
| 5,300,373 | 4/1994 | Shackle | 429/152 |
| 5,313,152 | 5/1994 | Wozniak et al. . | |
| 5,324,597 | 6/1994 | Leadbetter et al. | 429/62 |
| 5,337,042 | 8/1994 | Hormel et al. . | |
| 5,346,786 | 9/1994 | Hodgetts | 429/159 |
| 5,354,630 | 10/1994 | Earl et al. . | |
| 5,363,405 | 11/1994 | Hormel . | |
| 5,382,480 | 1/1995 | Molyneux | 429/120 |
| 5,384,212 | 1/1995 | Heiman et al. . | |
| 5,385,793 | 1/1995 | Tiedemann et al. | 429/62 |
| 5,393,617 | 2/1995 | Klein | 429/59 |
| 5,401,595 | 3/1995 | Kagawa et al. | 429/152 |
| 5,409,787 | 4/1995 | Blanyer et al. . | |
| 5,415,954 | 5/1995 | Gauthier et al. . | |
| 5,422,200 | 6/1995 | Hope et al. . | |
| 5,423,110 | 6/1995 | Gauthier et al. . | |
| 5,438,249 | 8/1995 | Chang et al. . | |
| 5,478,667 | 12/1995 | Shackle et al. | 429/120 |
| 5,478,668 | 12/1995 | Gozdz et al. | 429/127 |
| 5,479,083 | 12/1995 | Brainard . | |
| 5,487,958 | 1/1996 | Tura . | |
| 5,503,947 | 4/1996 | Kelly et al. . | |
| 5,503,948 | 4/1996 | MacKay et al. . | |
| 5,504,415 | 4/1996 | Podrazhansky et al. . | |
| 5,519,563 | 5/1996 | Higashijima et al. . | |
| 5,521,024 | 5/1996 | Sasaki et al. | 429/162 |
| 5,528,122 | 6/1996 | Sullivan et al. . | |
| 5,530,336 | 6/1996 | Eguchi et al. . | |
| 5,532,087 | 7/1996 | Nerz et al. . | |
| 5,547,775 | 8/1996 | Eguchi et al. . | |
| 5,547,780 | 8/1996 | Kagawa et al. . | |
| 5,548,200 | 8/1996 | Nor et al. . | |
| 5,552,243 | 9/1996 | Klein | 429/157 |
| 5,556,576 | 9/1996 | Kim et al. . | |
| 5,561,380 | 10/1996 | Sway-Tin et al. | 329/509 |
| 5,563,002 | 10/1996 | Harshe | 429/7 |
| 5,567,539 | 10/1996 | Takahashi et al. . | |
| 5,568,039 | 10/1996 | Fernandez . | |
| 5,569,063 | 10/1996 | Morioka et al. | 451/296 |
| 5,569,550 | 10/1996 | Garrett et al. . | |
| 5,573,869 | 11/1996 | Hwang et al. . | |
| 5,582,931 | 12/1996 | Kawakami . | |
| 5,585,207 | 12/1996 | Wakabe et al. . | |
| 5,589,290 | 12/1996 | Klink et al. . | |
| 5,593,604 | 1/1997 | Beasly et al. . | |
| 5,594,320 | 1/1997 | Pacholok et al. . | |
| 5,595,835 | 1/1997 | Miyamoto et al. . | |
| 5,595,839 | 1/1997 | Hossain . | |
| 5,599,636 | 2/1997 | Braun | 429/62 |
| 5,600,230 | 2/1997 | Dunstan . | |
| 5,602,481 | 2/1997 | Fukuyama . | |
| 5,610,495 | 3/1997 | Yee et al. . | |
| 5,612,153 | 3/1997 | Moulton et al. . | |
| 5,618,541 | 4/1997 | Arias | 429/210 |
| 5,619,417 | 4/1997 | Kendall . | |
| 5,620,808 | 4/1997 | Wheeler et al. | 429/98 |
| 5,622,789 | 4/1997 | Young . | |
| 5,623,196 | 4/1997 | Fernandez et al. . | |
| 5,626,990 | 5/1997 | Miller et al. | 429/247 |
| 5,631,537 | 5/1997 | Armstrong . | |
| 5,633,573 | 5/1997 | van Phuoc et al. . | |
| 5,637,981 | 6/1997 | Nagai et al. . | |
| 5,643,044 | 7/1997 | Lund | 451/5 |
| 5,647,534 | 7/1997 | Kelz et al. . | |
| 5,648,713 | 7/1997 | Mangez . | |
| 5,650,240 | 7/1997 | Rogers . | |
| 5,652,498 | 7/1997 | Edye et al. . | |

| | | | | | |
|---|---|---|---|---|---|
| 5,652,502 | 7/1997 | van Phuoc et al. . | 63-062156 | 3/1988 | Japan . |
| 5,654,622 | 8/1997 | Toya et al. . | 01-320758 | 12/1989 | Japan . |
| 5,670,272 | 9/1997 | Cheu et al. ............................. 429/162 | 04294071 | 10/1992 | Japan . |
| 5,824,432 | 10/1998 | Currle ................................... 429/120 | 05-166533 | 7/1993 | Japan . |
| | | | 6-036756 | 2/1994 | Japan . |
| | | | 6-203823 | 7/1994 | Japan . |

FOREIGN PATENT DOCUMENTS

| | | | | | |
|---|---|---|---|---|---|
| 569 035 A1 | 11/1993 | European Pat. Off. . | 07250788 | 10/1995 | Japan . |
| 570 590 A1 | 11/1993 | European Pat. Off. . | 07282841 | 10/1995 | Japan . |
| 584 639 A1 | 3/1994 | European Pat. Off. . | 08-115711 | 5/1996 | Japan . |
| 643 429 A2 | 3/1995 | European Pat. Off. . | 9-017416 | 1/1997 | Japan . |
| 652 620 A1 | 5/1995 | European Pat. Off. . | 1066-385 | 6/1986 | U.S.S.R. . |
| 700 109 A1 | 3/1996 | European Pat. Off. . | 1582979 | 1/1981 | United Kingdom . |
| 0 721 247 A2 | 7/1996 | European Pat. Off. . | 2 206 726 | 1/1989 | United Kingdom . |
| 774 795 A2 | 5/1997 | European Pat. Off. . | 2 282 924 | 4/1995 | United Kingdom . |
| 780 920 A1 | 6/1997 | European Pat. Off. . | 2295718 | 6/1996 | United Kingdom . |
| 2 511 547 | 2/1983 | France . | WO 91/17451 | 11/1991 | WIPO . |
| 2 721 407 | 12/1995 | France . | WO 92/02963 | 2/1992 | WIPO . |
| 3246968 A1 | 7/1984 | Germany . | WO 93/01624 | 1/1993 | WIPO . |
| 4218381 C1 | 5/1993 | Germany . | WO 94/14206 | 6/1994 | WIPO . |
| 42 25 746 A1 | 2/1994 | Germany . | WO 95/00978 | 1/1995 | WIPO . |
| 94 15 874 U | 12/1994 | Germany . | WO 95/26055 | 9/1995 | WIPO . |
| 19618897 A1 | 11/1997 | Germany . | WO 95/34824 | 12/1995 | WIPO . |
| 59-091658 | 5/1984 | Japan . | WO 96/17397 | 6/1996 | WIPO . |
| 59-117061 | 7/1984 | Japan . | WO 96/19816 | 6/1996 | WIPO . |
| 59-139555 | 8/1984 | Japan . | WO 96/22523 | 7/1996 | WIPO . |
| 61-099278 | 5/1986 | Japan . | WO 98/11620 | 3/1998 | WIPO . |

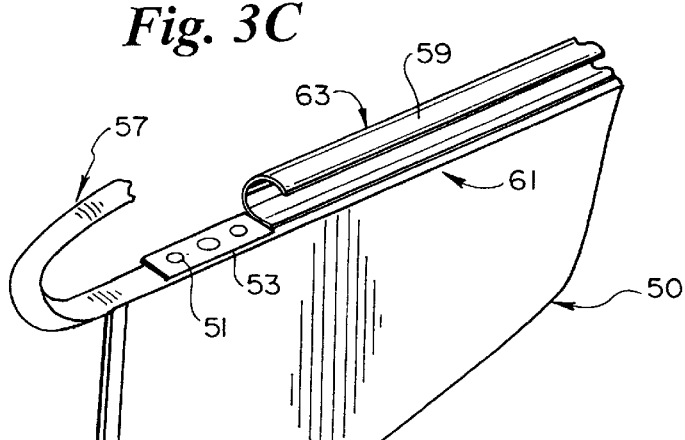
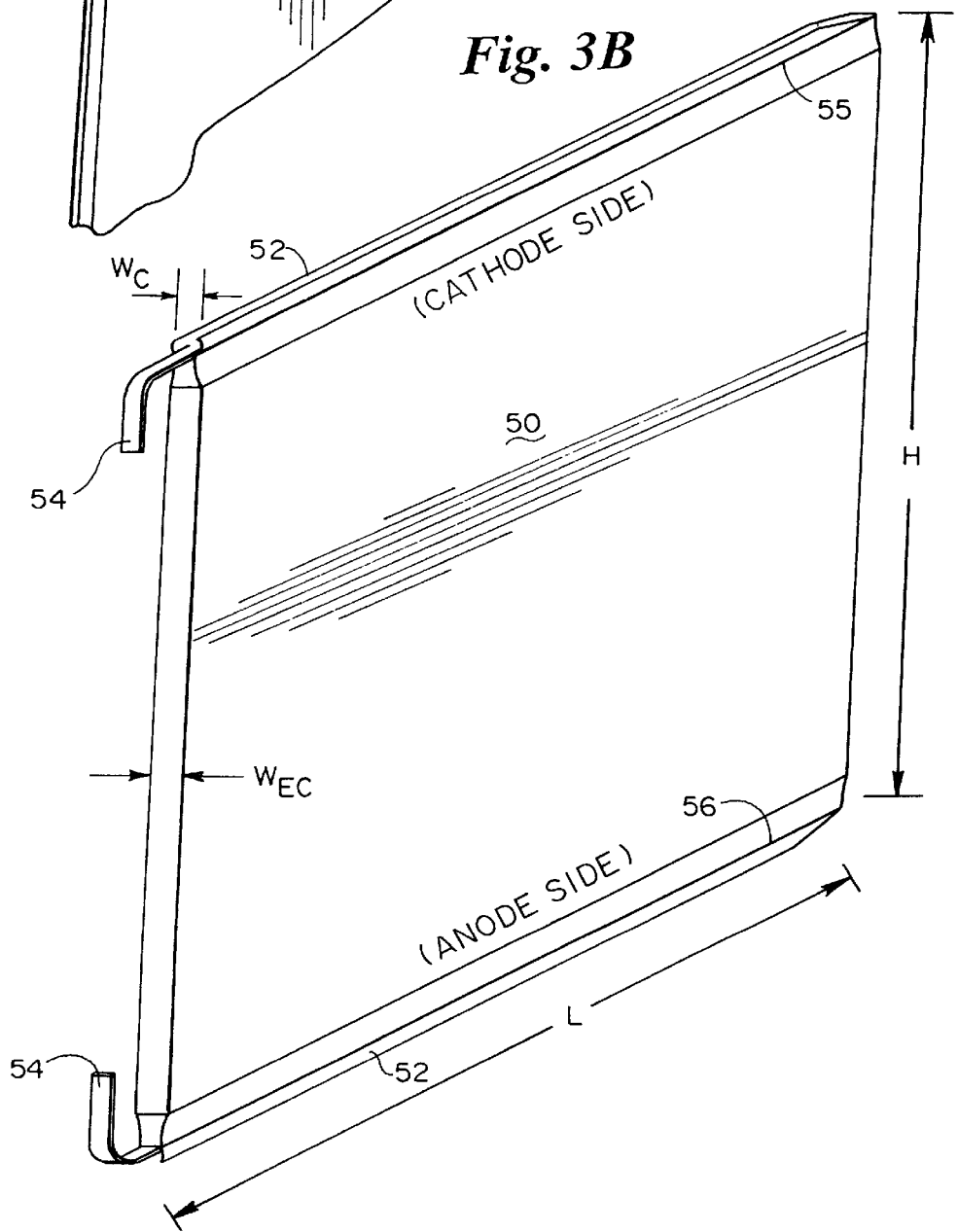

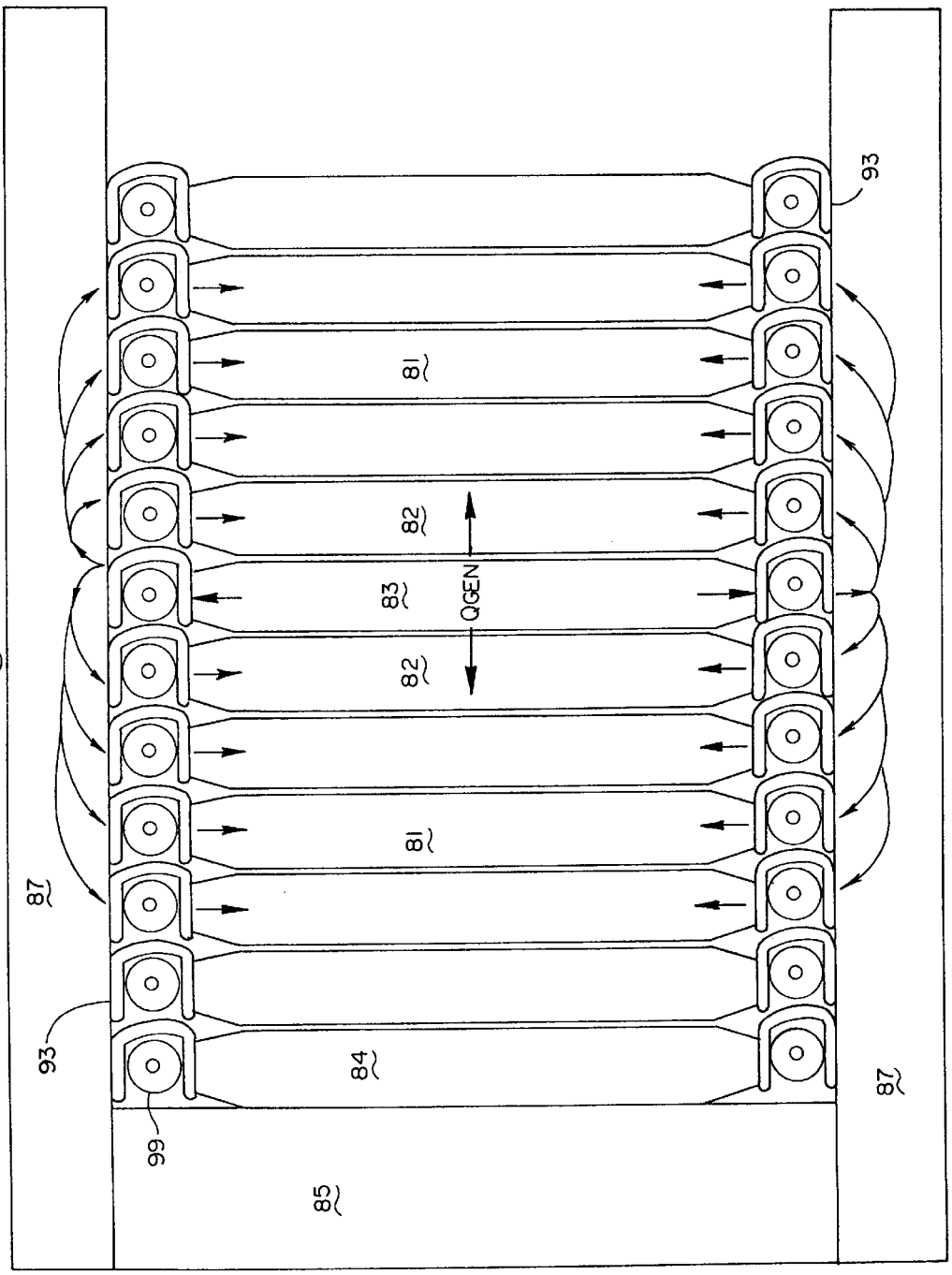

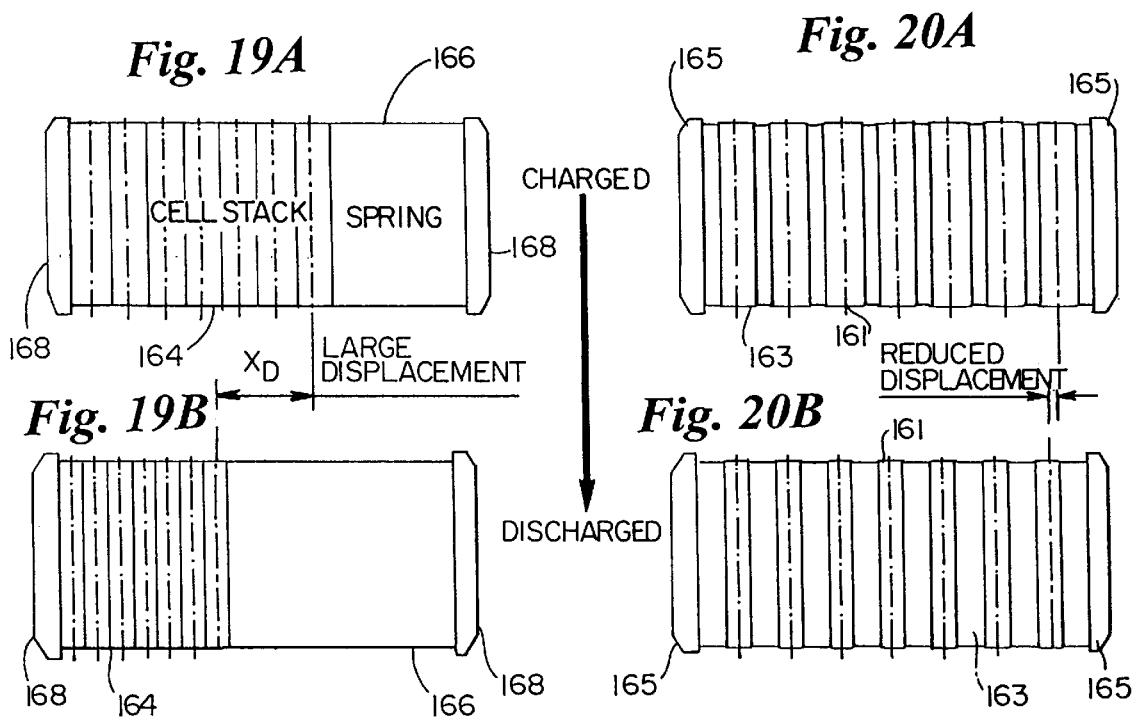

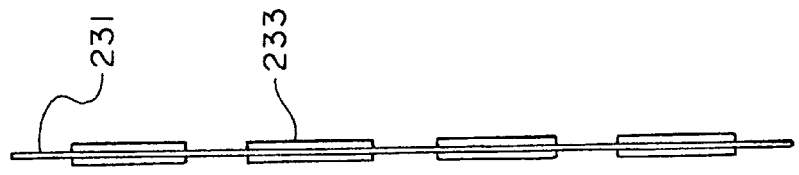
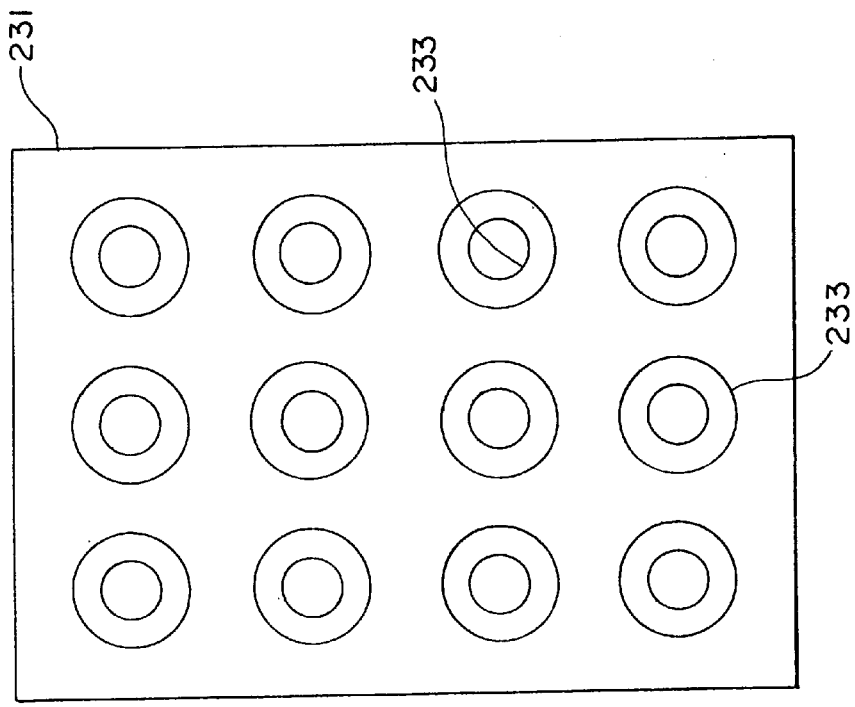

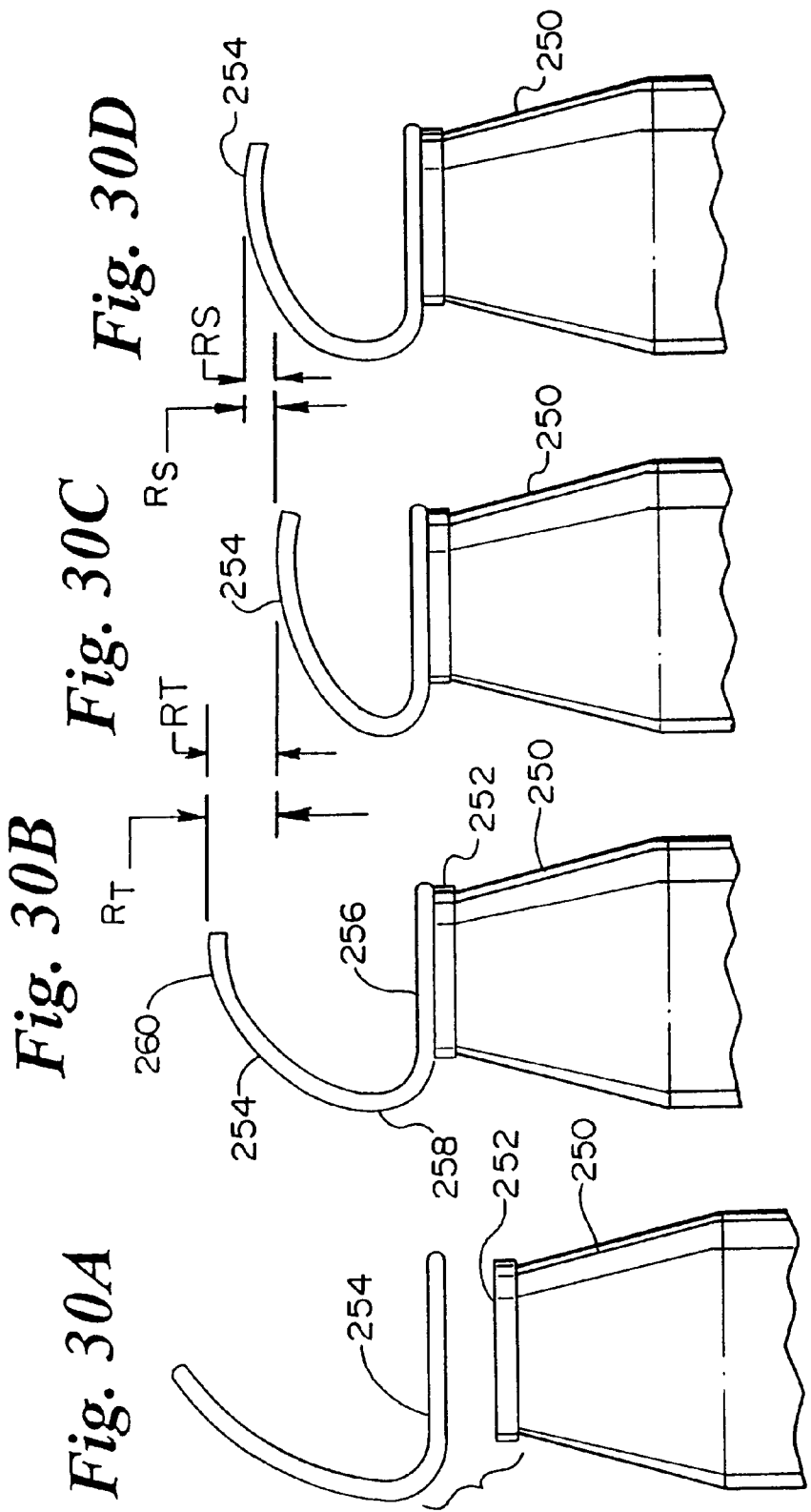

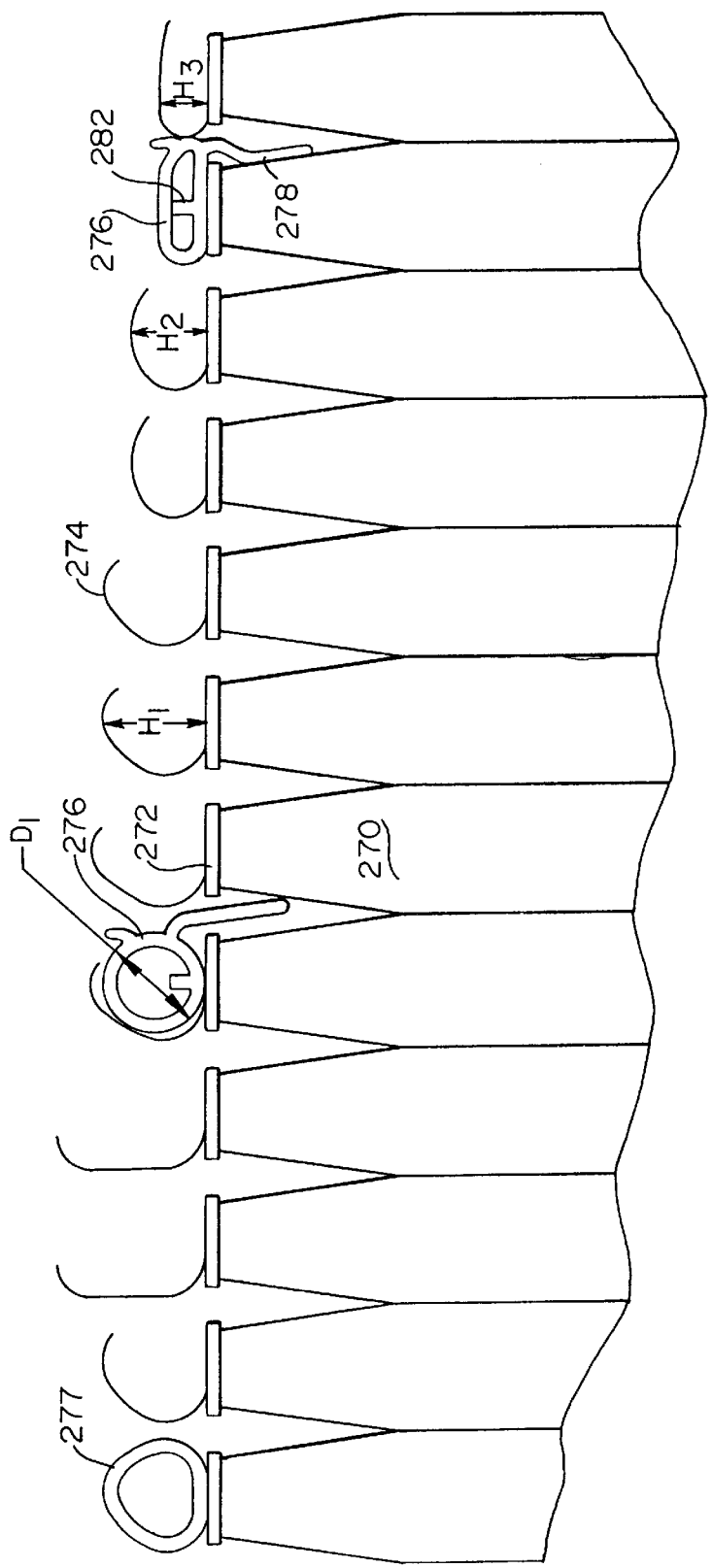

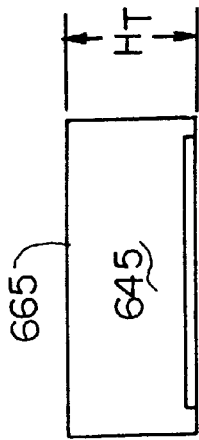
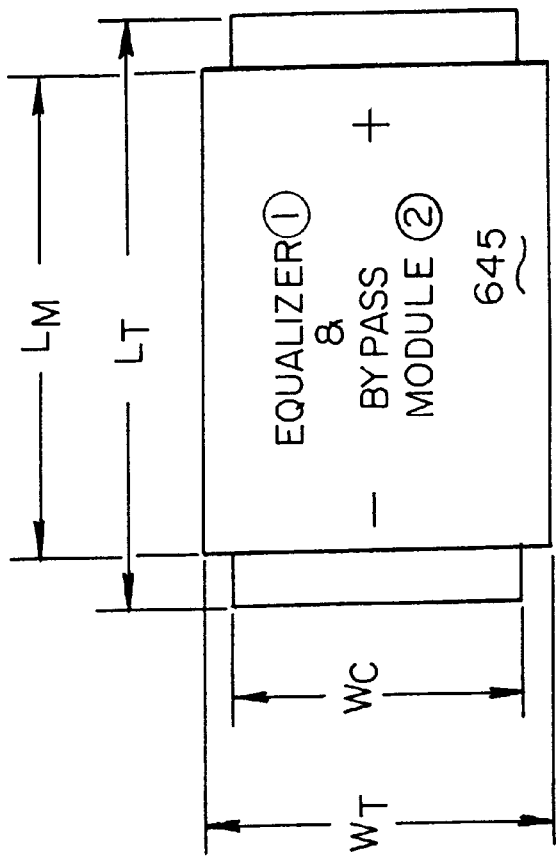
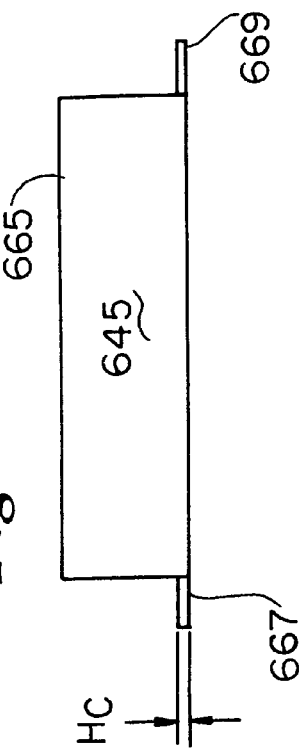
Fig. 48A
Fig. 48B
Fig. 48C

THERMAL MANAGEMENT SYSTEM AND METHOD FOR A SOLID-STATE ENERGY STORING DEVICE

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storing devices, and more particularly, to an apparatus and method for managing thermal energy produced in a high-energy energy storing device.

BACKGROUND OF THE INVENTION

The demand for new and improved electronic and electromechanical systems has placed increased pressure on the manufacturers of energy storing devices to develop battery technologies that provide for high energy generation in a low-volume package. Conventional battery systems, such as those that utilize lead acid for example, are often unsuitable for use in high-power, low-weight applications. Other known battery technologies may be considered too unstable or hazardous for use in consumer product applications.

A number of advanced battery technologies have recently been developed, such as metal hydride (e.g., Ni-MH), lithium-ion, and lithium polymer cell technologies, which would appear to provide the requisite level of energy production and safety margins for many commercial and consumer applications. Such advanced battery technologies, however, often exhibit characteristics that provide challenges for the manufacturers of advanced energy storage devices.

For example, such advanced power generating systems typically produce a significant amount of heat which, if not properly dissipated, can result in a thermal runaway condition and eventual destruction of the cells, as well as the system being powered by the cells. The thermal characteristics of an advanced battery cell must therefore be understood and appropriately considered when designing a battery system suitable for use in commercial and consumer devices and systems. A conventional approach of providing a heat transfer mechanism external to such a cell, for example, may be inadequate to effectively dissipate heat from internal portions of the cell. Such conventional approaches may also be too expensive or bulky in certain applications. The severity of consequences resulting from short-circuit and thermal run-away conditions increases significantly when advanced high-energy electrochemical cells are implicated.

Other characteristics of advanced battery technologies provide additional challenges for the designers of advanced energy storage devices. For example, certain advanced cell structures are subject to cyclical changes in volume as a consequence of variations in the state of charge of the cell. The total volume of such a cell may vary as much as five to six percent or more during charge and discharge cycling. Such repetitive changes in the physical size of a cell significantly complicates the mechanical housing design and the thermal management strategy. The electrochemical, thermal, and mechanical characteristics of an advanced battery cell must therefore be understood and appropriately considered when designing an energy storage system suitable for use in commercial and consumer devices and systems.

There is a need in the advanced battery manufacturing industry for a power generating system that exhibits high-energy output, and one that provides for safe and reliable use in a wide range of applications. There exists a further need for an effective thermal management approach that protects energy storage cells from thermal run-away resulting from a short-circuit condition. The present invention fulfills these and other needs.

SUMMARY OF THE INVENTION

The present invention is directed to an improved electrochemical energy storing device. The electrochemical energy storing device includes a number of thin-film electrochemical cells which are maintained in a state of compression through use of an internal or an external pressure apparatus. A thermal conductor, which is connected to at least one of the positive or negative contacts of each electrochemical cell, conducts current into and out of the electrochemical cells and also conducts thermal energy between the electrochemical cells and thermally conductive material disposed on a wall structure adjacent the conductors. The wall structure includes electrically resistive material, such as an anodized coating or a thin film of plastic. The thermal conductors are fabricated to include a spring mechanism which expands and contracts to maintain mechanical contact between the electrochemical cells and the thermally conductive material in the presence of relative movement between the electrochemical cells and the wall structure. An active cooling apparatus may be employed external to a hermetically sealed housing containing the electrochemical cells to enhance the transfer of thermal energy into and out of the electrochemical cells. An integrated interconnect board may be disposed within the housing onto which a number of electrical and electro-mechanical components are mounted. Heat generated by the components is conducted from the interconnect board to the housing using the thermal conductors.

BRIEF DESCRIPTION OF THE DRAWINGS

FIGS. 3B–3C illustrate two embodiments of a thermal conductor which may be attached to one or both of the anode and cathode contacts of a prismatic electrochemical cell;

FIG. 3D is a partial illustration of an energy storing module containing a stack of thin-film electrochemical cells and employing an in-situ thermal management methodology in accordance with an embodiment of the present invention;

FIGS. 19A–19B show an embodiment of an external pressure producing apparatus for maintaining a stack of electrochemical cells in a state of compression during charge and discharge cycling;

FIGS. 20A–20B show another embodiment of an external pressure producing apparatus for maintaining a stack of electrochemical cells in a state of compression during charge and discharge cycling;

FIGS. 29 and 30A–30D are top view illustrations of an embodiment of a thermal conductor which varies in height to maintain mechanical engagement with the wall of a containment vessel;

FIG. 32 illustrates various configurations of a thermal conductor, including a spring insulator, in compressed and uncompressed states;

FIGS. 48A–48C is an illustration of a component package within which equalizer and bypass devices are integrally incorporated.

DETAILED DESCRIPTION OF THE EMBODIMENTS

Figure 1:
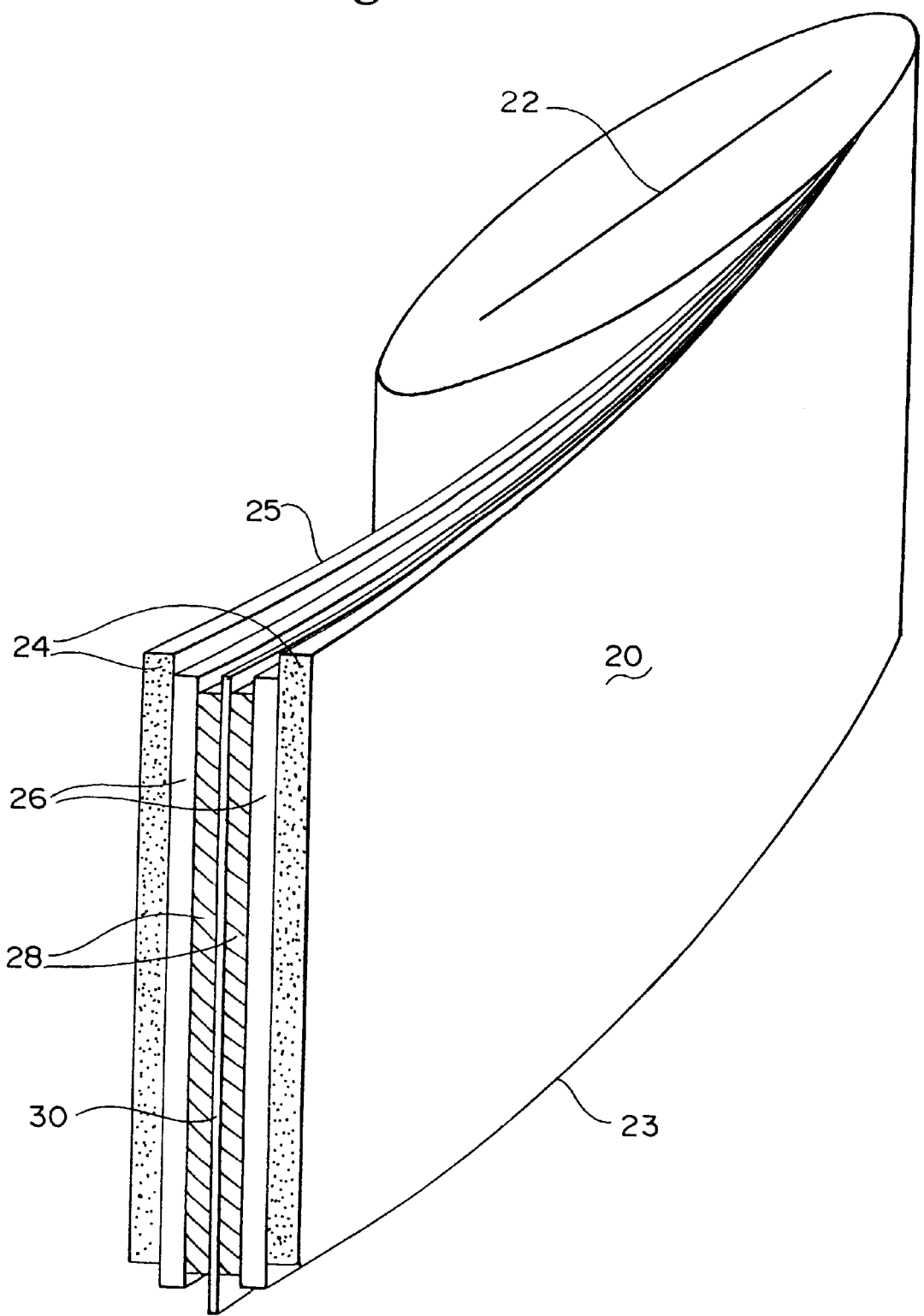
FIG. 1 illustrates an embodiment of a solid-state, thin-film electrochemical cell having a prismatic configuration.

In accordance with one embodiment of a power generating source which utilizes rechargeable high-energy electrochemical cells, the energy storing device includes a number of solid-state, thin-film cells of the type shown in FIG. 1. Such rechargeable thin-film electrochemical cells are particularly well-suited for use in the construction of high-current, high-voltage energy storage modules and batteries, such as those used to power electric vehicles for example.

The electrochemical cell 20 is shown as having a flat wound prismatic configuration in which a thin-film solid electrolyte 26 is disposed between a film 24 constituting an anode and a film 28 constituting a cathode. A central cathode current collector film 30 is disposed between each of the cathode films 28. The anode films 24 are laterally offset relative to the cathode current collector 30 so as to expose the anode 24 along a first edge 25 of the cell 20, and to expose the cathode current collector 30 along a second edge 23 of the cell 20. The embodiment shown in FIG. 1 includes a core element 22, such as a foam or metal spring element, about which the thin-film electrochemical cell 20 is wound.

Figure 2A:
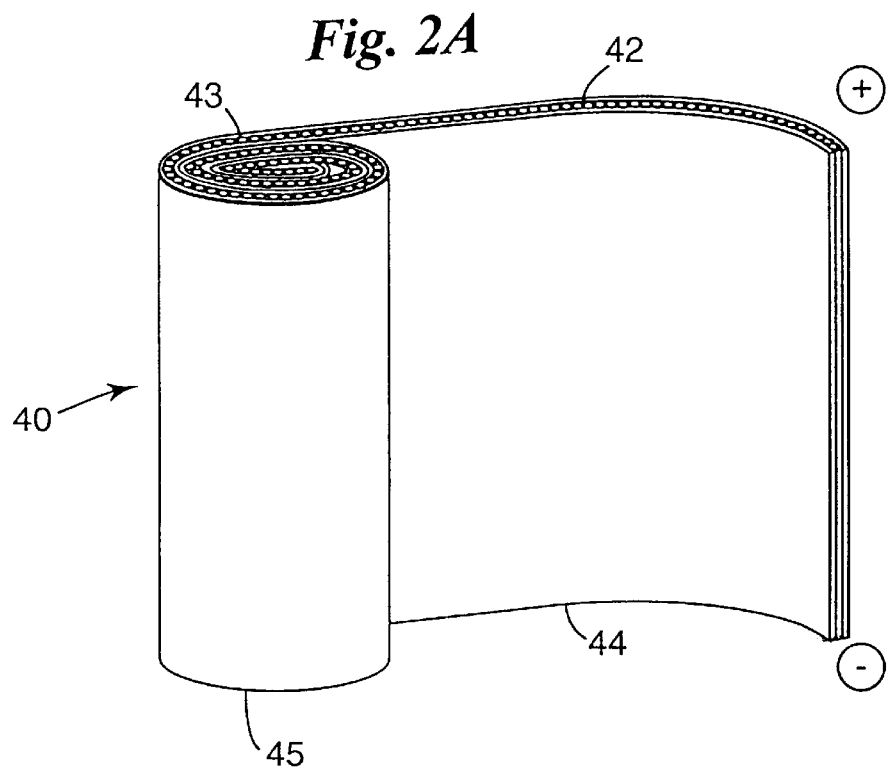
FIGS. 2A–2C illustrate alternative embodiments of a thin-film electrochemical cell.
Figure 2B:
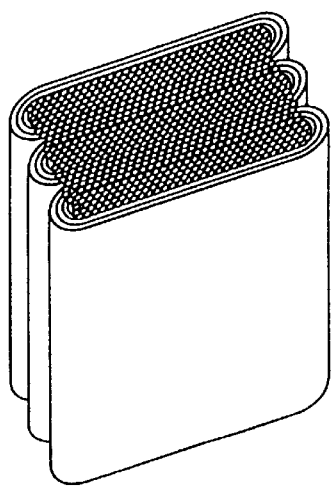
Figure 2C:
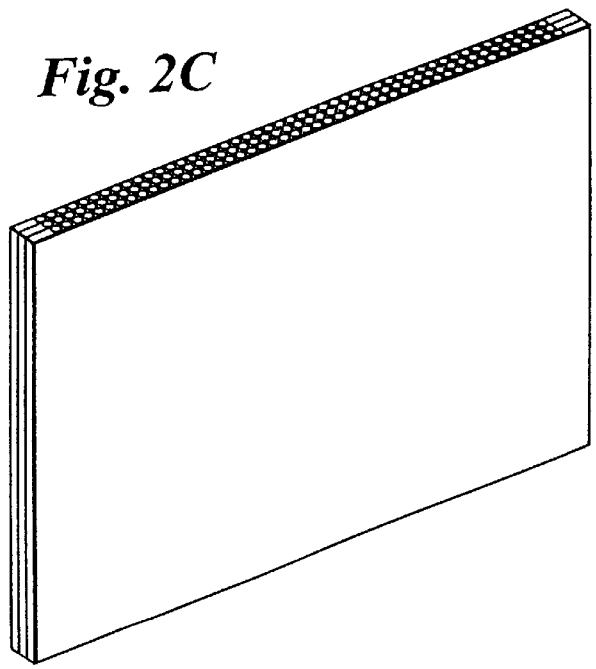

In FIGS. 2A–2C, there is illustrated various embodiments of a thin-film electrochemical cell which may be used in the fabrication of a rechargeable energy storing device. As is shown in FIG. 2A, a thin-film electrochemical cell may be packaged in a "jelly roll" configuration so as to form a generally cylindrical cell structure in which a first edge 42 of the cell forms a positive contact 43, and a second edge 44 forms a negative contact 45. The positive and negative contacts 43, 45 are formed typically by use of a known metal spraying technique.

FIGS. 2B and 2C illustrate alternative packaging configurations for a thin-film rechargeable electrochemical cell. A flat roll configuration, shown in FIG. 2B, or a flat stack configuration, shown in FIG. 2C, provides for the aggregation of a relatively large thin-film cell surface area within a relatively small packaging configuration. Such geometries minimize voltage losses and allow for the efficient transfer of electrical energy to and from the multi-layered cell structure.

In accordance with one embodiment, and with reference to FIG. 1, the electrochemical cell 20 includes a solid polymer electrolyte 26 which constitutes an ion transporting membrane, a lithium metal anode 24, and a vanadium oxide cathode 28. These film elements are fabricated to form a thin-film laminated prismatic structure, which may include an insulation film such as polypropylene film. A known sputtering metallization process is employed to form current collecting contacts along the edges 25, 23 of the anode 24 and cathode 28 films, respectively. It is noted that the metal-sprayed contacts provide for superior current collection along the length of the anode and cathode film edges 25, 23, and demonstrate good electrical/mechanical contact and heat transfer characteristics.

The cell shown in FIG. 1 includes a central cathode current collector 30 which is disposed between each of the two cathode films 28 to form a bi-face cell configuration. A mono-face cell configuration may alternatively be employed in which a single cathode collector 30 is associated with a single anode/electrolyte/cathode element combination. In this configuration, an insulating film is typically disposed between individual anode/electrolyte/cathode/collector element combinations.

In general, the active materials constituting the solid-state, thin-film electrochemical cell retain chemical and mechanical integrity at temperatures well beyond typical operating temperatures. For example, temperatures of up to 180° C. may be tolerated. It is to be understood that various electrochemical cell configurations other than those depicted in the figures may be appropriate to satisfy the electrical, mechanical, and thermal requirements of a particular application. Various embodiments of the electrochemical cells depicted generally in the figures may be fabricated in accordance with the methodologies disclosed in U.S. Pat. Nos. 5,423,110, 5,415,954, and 4,897,917.

Figure 3A:
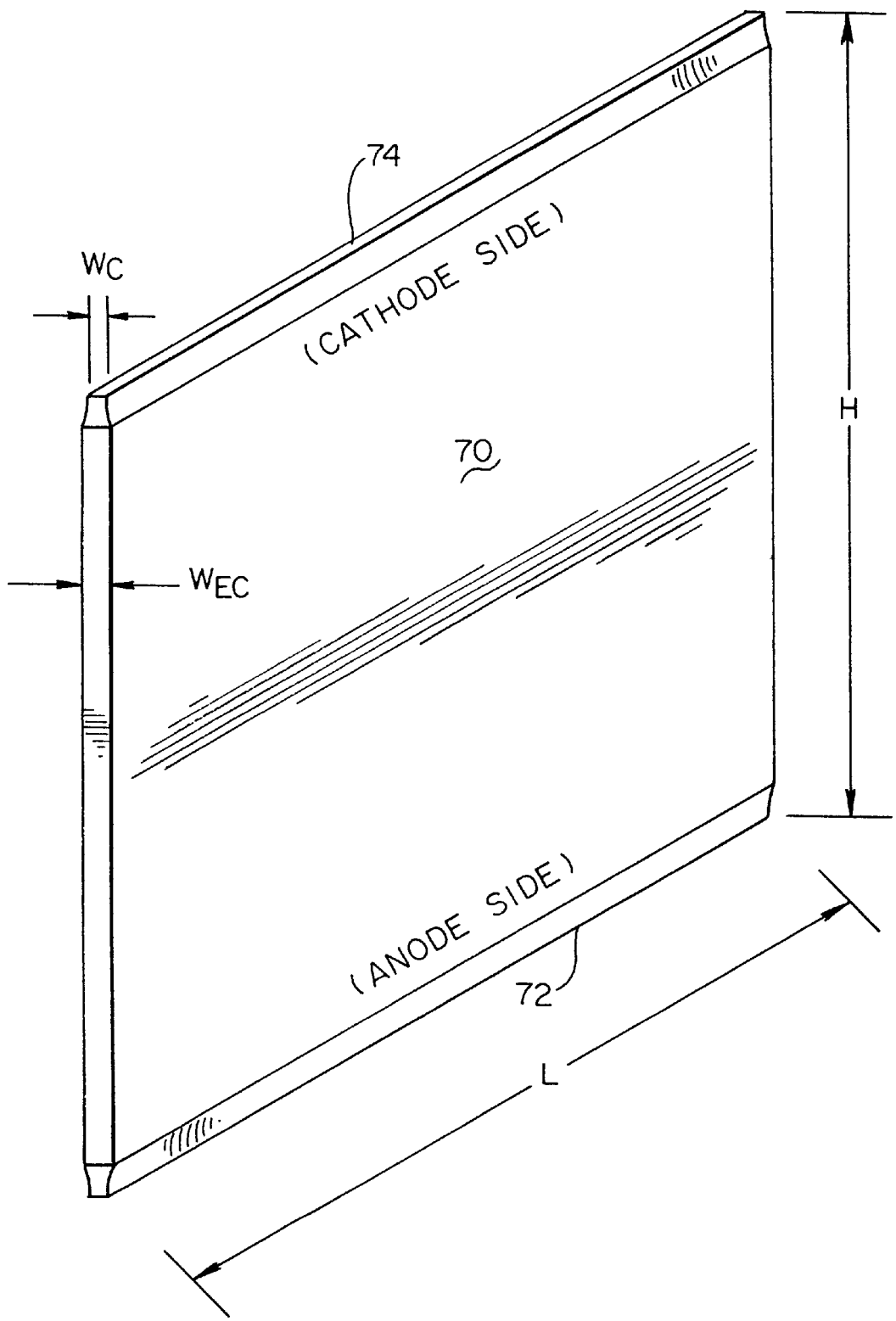
FIG. 3A is an illustration of another embodiment of a prismatic thin-film electrochemical cell.
Figure 4:
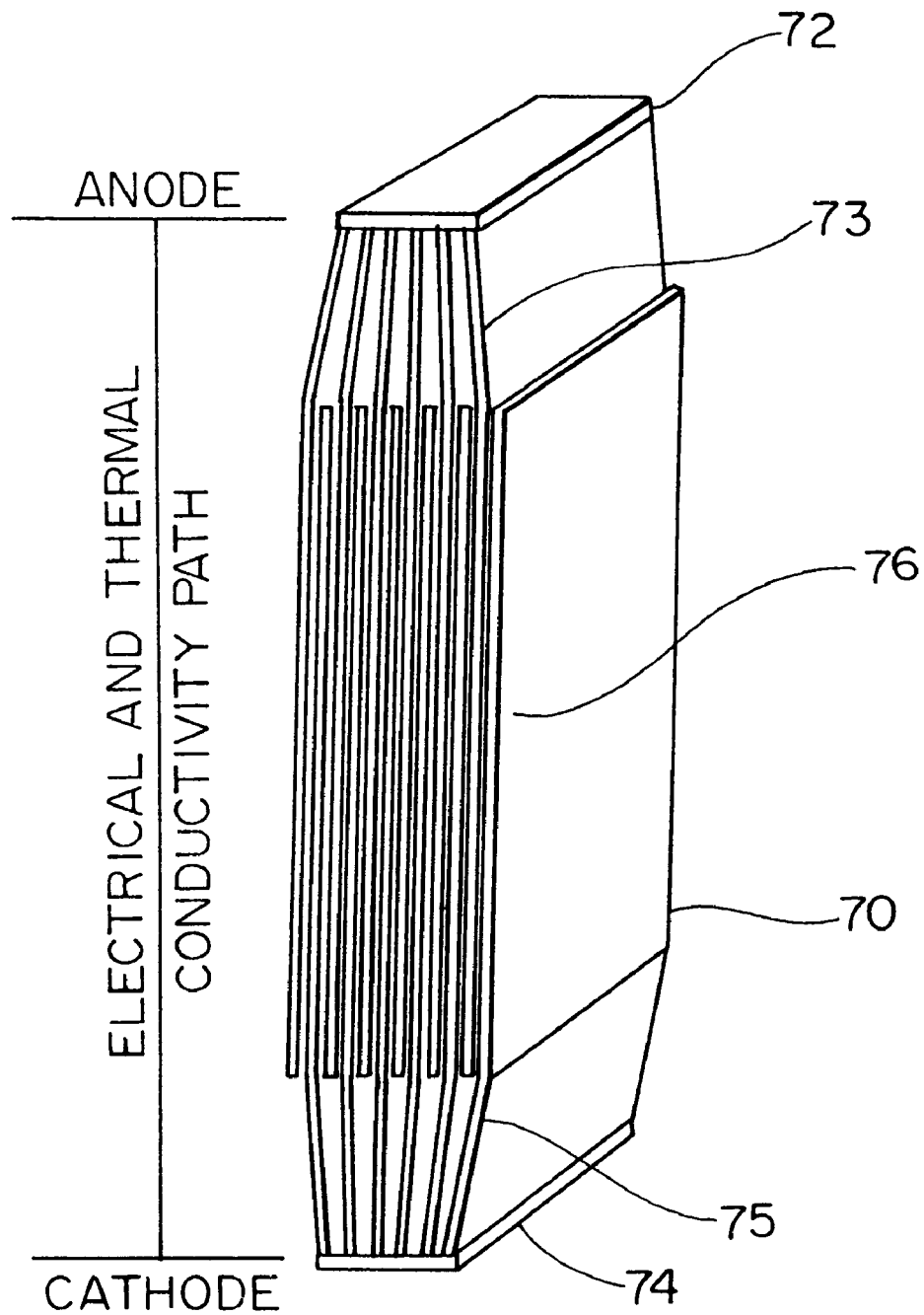
FIG. 4 illustrates another embodiment of a prismatic thin-film electrochemical cell.

Concerning FIGS. 3A and 4, an embodiment of a prismatic electrochemical cell 70 is shown in which an anode contact 72 and a cathode contact 74 is formed respectively along opposing edges of the cell 70. The electrochemical cell 70 shown in FIG. 4 illustrates the laterally offset anode and cathode film layers 73, 75 which terminate respectively at common anode and cathode contacts 72, 74. A copper spraying technique is typically employed to form anode and cathode contacts 72, 74.

During charge and discharge cycling, electrical energy is conducted preferentially along the surfaces of the anode and cathode films 73, 75 and through the anode and cathode contacts 72, 74. During electrical discharge, the active portion 76 of the cell 70 produces an appreciable amount of thermal energy which is preferentially conducted along the anode and cathode film surfaces, thus sharing the same conductivity path as that for the electrical energy produced by the cell 70. As such, the contacts 72, 74 respectively disposed on the edge portions of the extended anode and cathode film layers 73, 75 provide a site for establishing both electrical and thermal connectivity with the cell 70.

Figure 5:
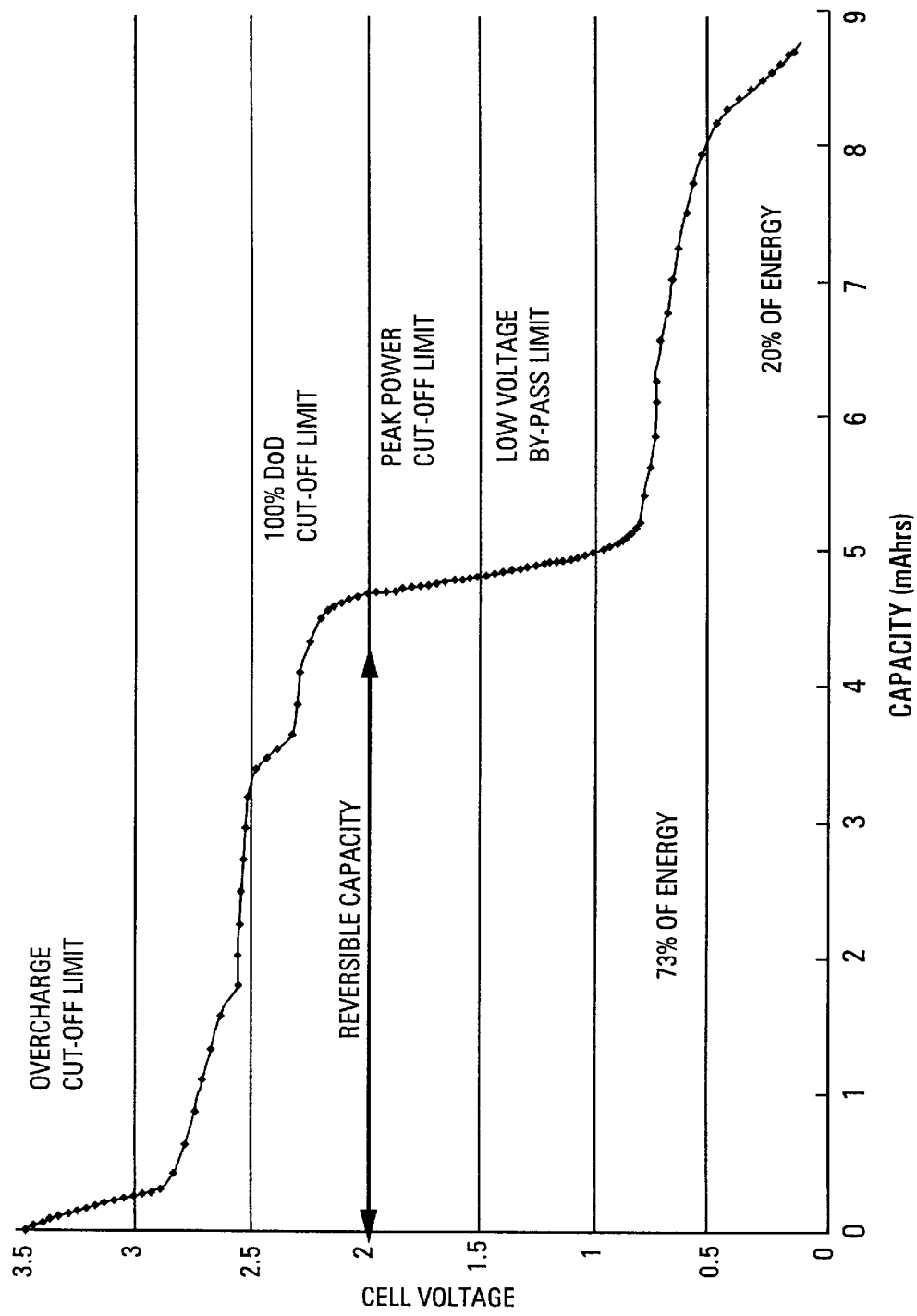
FIG. 5 is a graphical representation of a relationship between voltage and capacity for an electrochemical cell of the type illustrated in FIG. 1.

The electrochemical cell shown in FIGS. 3A–4 may be fabricated to have a length L of approximately 135 mm, a height H of approximately 149 mm, and a width $W_{ec}$ of approximately 5.4 mm or $W_{ec}$ of approximately 5.86 mm when including a foam core element 22. The width $W_c$ of the cathode contact 74 and the anode contact 72 is approximately 3.9 mm, respectively. A cell having these dimensions typically exhibits a nominal energy rating of approximately 36.5 Wh, a peak power rating of 87.0 W at 80 percent depth of discharge (DOD), a cell capacity of 14.4 Ah, and a nominal voltage rating of 3.1 volts at full charge. The graph of FIG. 5 illustrates a relationship between voltage and capacity of a typical prismatic thin-film cell having the above-described dimensions and construction.

In Table 1 below, various thermal properties are provided for an electrochemical cell maintained at a temperature of approximately 60° C. and having a structure similar to that illustrated in FIGS. 3–4.

TABLE 1

| Section | Thermal Conductivity (W/m ° C.) | | Density (kg/m³) | Specific Heat (J/kg ° C.) |
|---|---|---|---|---|
| | Direction of the film thickness | Direction of the connectors | | |
| Active Section | 0.4042 | 48.10 | 1356 | 1411 |
| Anode Side, Inactive Zone | 0.0466 | 28.90 | 252 | 2714 |
| Cathode Side, Inactive Side | 0.0388 | 18.45 | 441 | 1470 |
| Complete Cell | | | 1218 | 1435 |

| Other Components | | |
|---|---|---|
| Component | Thermal Conductivity (W/m ° C.) | Density × specific heat (kJ/m3 ° C.) |
| Cell's core | 0.071 | 401.3 |
| Metallization | 366.7 | 3254.6 |
| Spring type terminal | 134.5 | 3254.6 |
| Vessel wall - anodized | 178.8 | 2566.9 |

The tabulation of thermal conductivity values demonstrates that the preferred thermal conductivity path is laterally along the surface of the film layers of the cell rather than axially through the film material.

Figure 6:
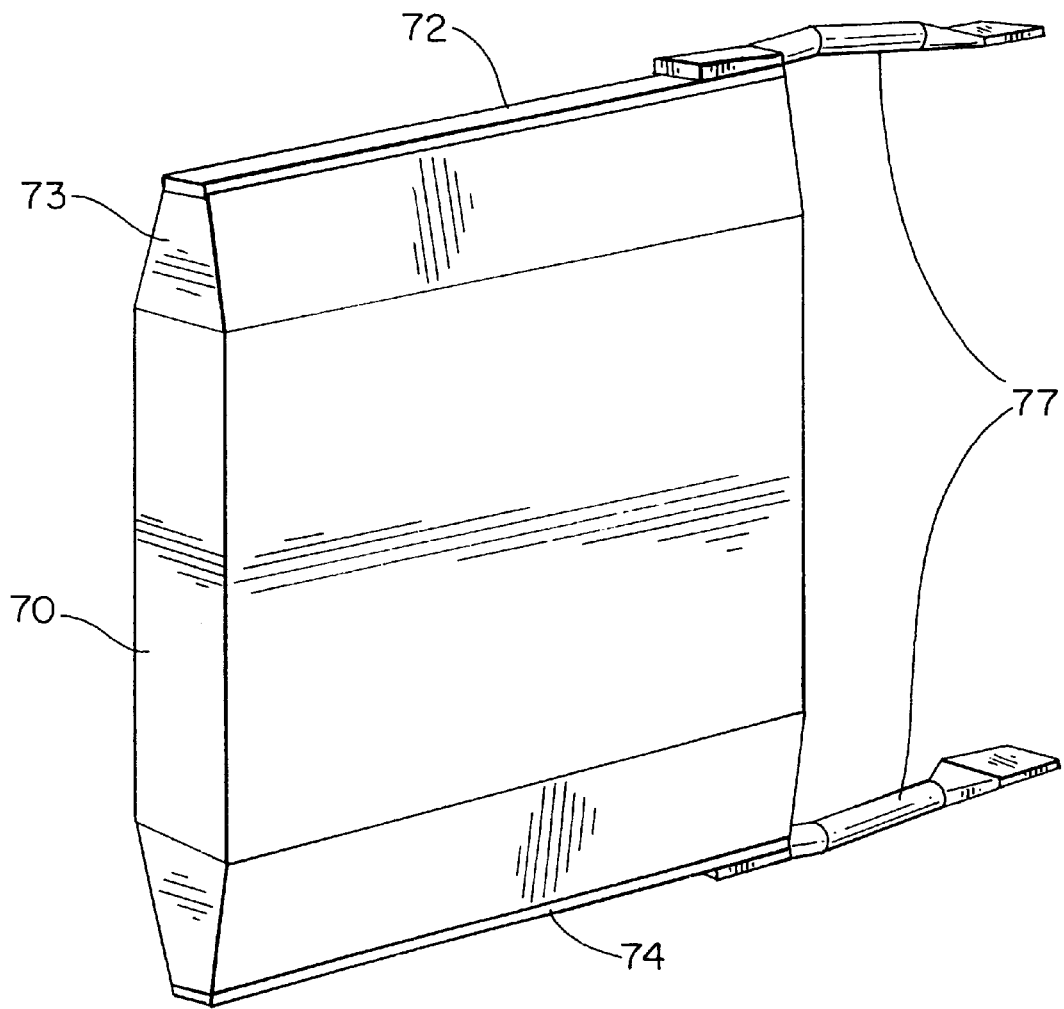
FIG. 6 illustrates a conventional lead attachment configuration for a prismatic electrochemical cell.

Those skilled in the art will appreciate that a conventional approach of attaching an electrical lead 77 to an end portion of the anode and cathode contacts 72, 74, such as that illustrated in FIG. 6, would prove to be an inadequate configuration for effectively conducting heat into and out of the cell 70. Although this relatively long conductivity path would likely be satisfactory for purposes of conducting electrical current between the cell 70 and an external connection, such a configuration would be incapable of conducting a sufficient amount of thermal energy into or out of the cell 70 to ensure reliable and safe operation of the cell 70.

In the embodiment of a prismatic electrochemical cell 50 shown in FIG. 3B, a thermal conductor 52 in accordance with one embodiment of the present invention advantageously provides for the efficient transfer of heat between the cell and an adjacently disposed heat sink/source, such as a thermally conductive wall of a protective enclosure. The thermal conductor 52 is spot welded or otherwise attached to each of the anode and cathode contacts 56, 55, respectively. The thermal conductor 52 is typically disposed along the length of the anode contact 56 and the cathode contact 55, and typically includes an electrical connection lead 54 for conducting current into and out of the electrochemical cell 50, the current being collected and conducted preferentially along the anode and cathode contacts 56, 55.

The embodiment of a thermal conductor 63 shown in FIG. 3C includes a copper tab 53 that extends along the length of a sprayed metal anode or cathode contact 61. The copper tab 53 includes a resilient member 59 through which heat is transferred between the cell 50 and an adjacently disposed heat sink, such as a wall of a metallic housing. The copper tab 53 is spot welded to the sprayed metal contact 61 at a number of weld locations 51. A flexible electrical lead 57 is ultrasonically welded to the end of the copper tab 53. Current is conducted primarily along the sprayed metal contact 61 of the cell 50 and communicated to external connections via the flexible electrical leads 57.

As is shown in FIG. 3D, a thermal conductor 93 provides a thermal flux path for transferring thermal energy between the electrochemical cells and a thermally conductive, electrically resistive material or element disposed adjacent the cell. It is to be understood that a thermally conductive, electrically resistive material, element or structure as described herein refers to a surface coating/treatment or separate material that permits a sufficient amount of heat to be conducted therethrough, yet is electrically resistive to the flow of current relative to a current path provided for conducting current into and out of an electrochemical cell.

An anodized coating, for example, may have a thickness that permits a sufficient amount of thermal energy to be conducted therethrough, yet is sufficiently resistive to electrical current relative to the anode and cathode contacts of the cell or the thermal conductor. By way of further example, a thermally conductive foam element may be employed, with the density of thermally conductive particles impregnated therein being selected to provide a desired balance between thermal and electrical conductivity characteristics.

As is further shown in the multiple cell embodiment of FIG. 3D, the thermal conductors 93 also provide a thermal flux path for transferring heat between adjacent and neighboring cells. If a short develops in a cell 83 within a stack of cells, for example, the excess heat, $Q_{gen}$, generated by the short-circuited cell 83 is conducted through the thermally conductive, electrically resistive material 87 to adjacent cells 82 and non-adjacent neighboring cells 81 via the thermal conductors 93. The excess heat, $Q_{gen}$, is also conducted to adjacent cells 82 in physical contact with the short-circuited cell 83. A thermally conductive plate 85 serves as a heat sink for a cell 84 situated at the end of the cell stack.

Further, the thermal conductors 93 are configured so as to exhibit a spring-like character which provides for substantially continuous contact between a cells and a structure, such as a metallic planar surface 87, disposed adjacent the cells in response to relative movement between the cells and the adjacent structure 87. A separate spring element, 99, such as a tubular elastomeric element, may be retained within the thermal conductor 93 to enhance the spring properties of the thermal conductor 93. Other features and advantages realized by employing a thermal conductor in accordance with the present invention will be described in greater detail hereinbelow.

The problem of adequately managing the thermal and electrical conditions of a thin-film electrochemical cell is further complicated when multiple cells are situated in close proximity to one another, such as when forming a stack or bundle of cells. One failure mechanism which is of particular concern involves the development of a low resistance current flux path or short within the cell. The cell typical generates a significant amount of heat as a consequence of a high rate of energy discharge resulting from the short-circuit condition. Such short-circuit events must be appropriately considered when developing an effective thermal management system for use with high-energy power sources, such as solid-state, thin-film electrochemical cells.

Figure 7:
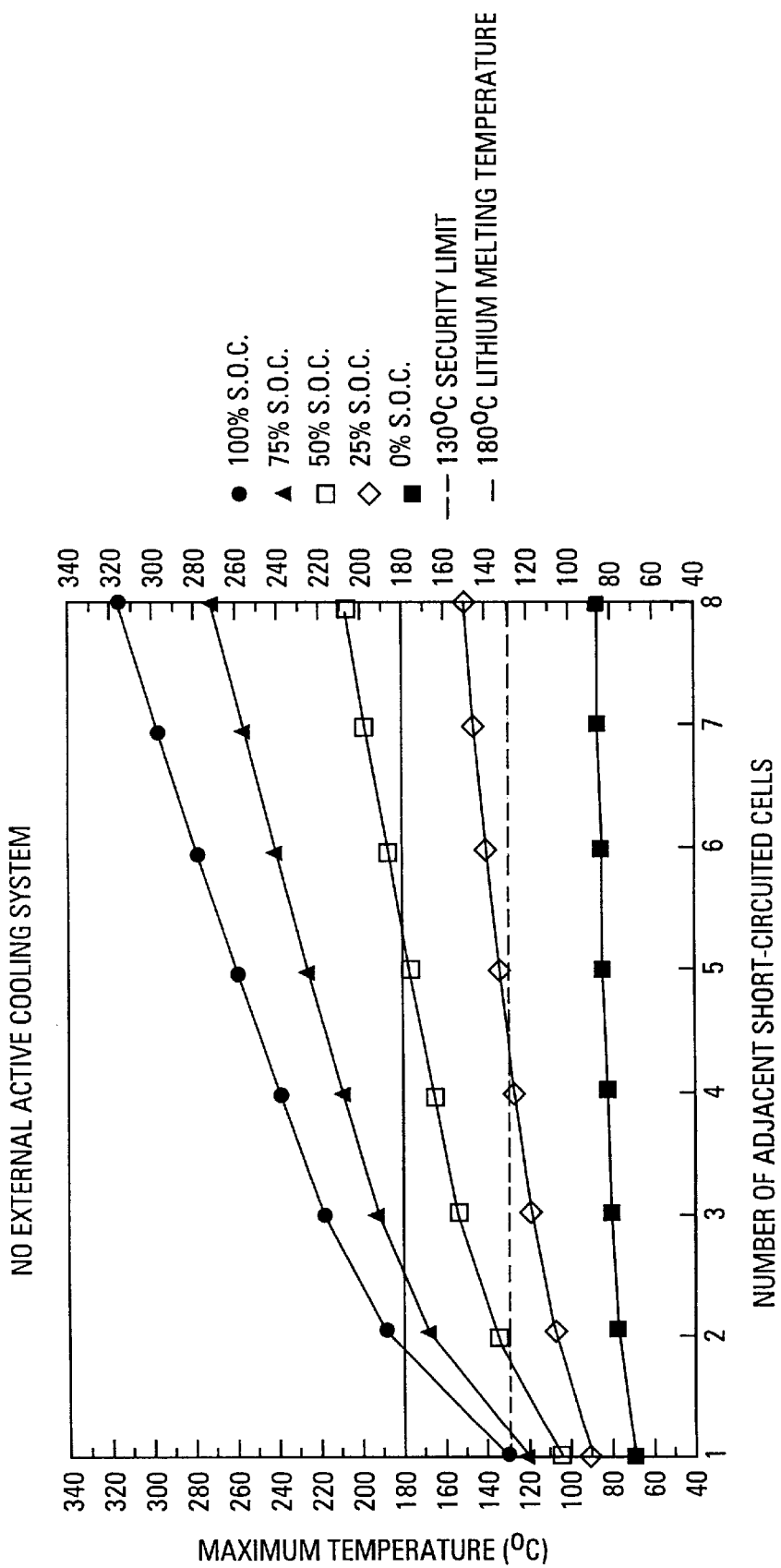
FIGS. 7–8 illustrate a relationship between the maximum temperature in a cell stack and the number of adjacent short-circuited cells at five different state of charge (SOC) levels in the absence and presence of an external active cooling apparatus, respectively.
Figure 8:
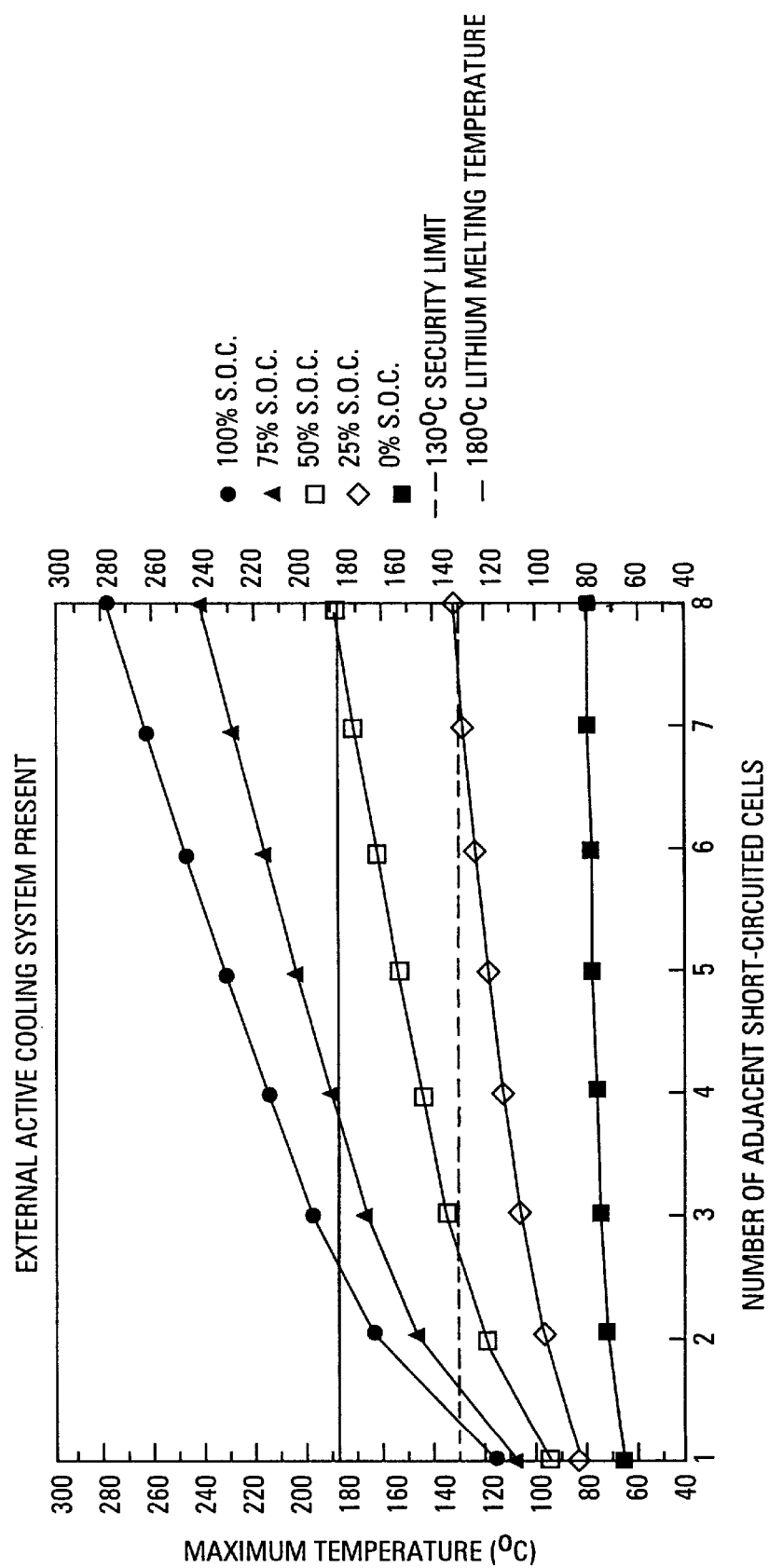

FIGS. 7–8 illustrate the effect of short-circuit conditions on cell temperature for a stack of thin-film electrochemical cells which are in thermal contact with one another. The graph shown in FIG. 7 illustrates a relationship between the maximum temperature in a cell stack as a function of the number of adjacent short-circuited cells when no external thermal management apparatus, such as an active cooling system of the type described hereinbelow, is employed in combination with a unique in-situ thermal management apparatus to facilitate the transfer of heat out of the cells constituting the cell stack. Five plots of data corresponding to five state of charge (SOC) levels are depicted.

FIG. 8 provides a similar plot of data with the exception that an external thermal management apparatus is employed together with an in-situ thermal management apparatus provided within the cell stack, as will later be described in greater detail. It is noted that the solid line provided at 180° C. represents the melting temperature of lithium, and that 130° C. is considered a security or safety limit. It is understood that the 130° C. limit is provided to demonstrate that a particular energy storing device may be designed to operate below a maximum temperature which may be different from a cell breakdown temperature.

The data presented in graphical form in FIGS. 7–8 demonstrates the significant impact of short-circuit conditions on cell stack temperature. The data plotted in FIG. 7 demonstrates that in the absence of an external active cooling system, no greater than one short-circuited cell can be tolerated within a cell stack without the defective cell exceeding an unsafe temperature (e.g., the melting point of lithium). The data depicted in FIG. 8 suggests that no greater than two-short circuited cells can be tolerated in a module without jeopardizing the integrity of the stack, and that no greater than one short-circuited cell can be tolerated without exceeding a 130° C. safety limit, notwithstanding the presence of an external thermal management apparatus. Those skilled in the art will immediately appreciate the importance of providing for the efficient transfer of thermal energy out of a thin-film electrochemical cell in order to minimize the adverse effects of over-temperature conditions within a stack of closely situated cells.

Figure 9:
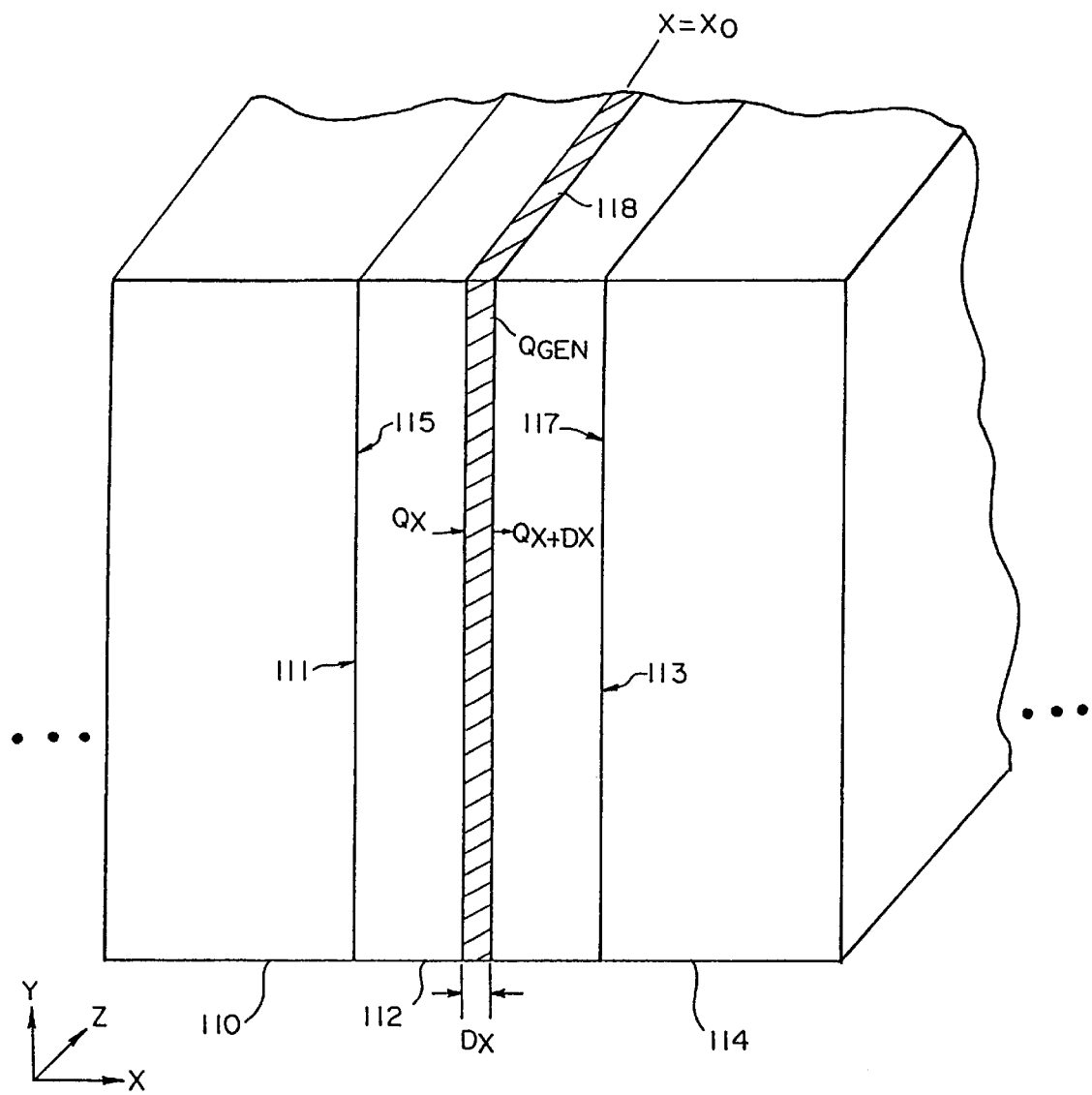
FIG. 9 is a partial depiction of a multiple-cell energy storing device in which one of the cells is subject to a short-circuit condition.

In FIG. 9, there is shown a number of electrochemical cells arranged in a stack configuration. A particular cell 112 is depicted as having sustained a short-circuit. The cell 112 generates heat as a consequence of the high rate of energy discharge resulting from the short-circuit. In accordance with this one-dimensional (x-axis) heat conduction model, the thermal energy generated by the short-circuit in the cell 112 is partially conducted through the cell 112 and to the outer surfaces 115, 117 of the cell 112. The close proximity of an adjacent cell 110 to the short-circuited cell 112 permits the thermal energy conducted to the outer surfaces 115, 117 of the cell 112 to dissipate into the adjacent cell 110.

In a similar manner, an adjacent cell 114, having an outer surface 113 in thermal contact with an outer surface 117 of the cell 112, conducts heat produced by the cell 112 through the thermal contact interface 113, 117. In this illustrative example, the adjacent cells 110, 114 include outer surfaces 111, 113 which are in intimate thermal contact with the outer surfaces 115, 117 of the cell 112. It is understood that an insert element, such as a foam or metallic flat spring element, or thermally conductive material, may be situated between adjacent cells. Although not depicted in FIG. 9, it is understood that the heat generated by the short-circuited cell 112 is also conducted in the y and z directions and, in particular, to adjacent and neighboring cells via the thermal conductors and thermally conductive, electrically resistive material as is depicted in FIG. 3D.

It is believed that immediately following a short-circuit event in the cell 112, approximately 50% of the generated heat dissipates in the x-direction to adjacent cells 110, 114, while the remaining 50% is dissipated via the thermal conductors and thermally conductive, electrically resistive material. As time progresses, a disproportionate amount of the excess heat is dissipated via the thermal conductor route. It is noted that the end cells of the cell stack require the presence of an adjacently situated heat sink, such as the metal plate 85 shown in FIG. 3D, which is in intimate contact with end cell 84.

Those skilled in the art will appreciate that the energy increase within the short-circuited cell 112, and the rate at which the energy generated from the short-circuit event is dissipated into adjacent cells 110, 114, can be characterized through use of Fourier's Law of Heat Conduction. In describing a process by which heat generated from the short-circuited cell 112 is conducted to adjacent cells 110, 114, a brief discussion of a generalized one-dimensional heat conduction analysis may be useful. It is understood that the following description is provided for purposes of illustration only, and ignores three-dimensional transient heat transfer considerations.

In the energy storage system illustrated in FIG. 9, the rate at which heat is generated in the short-circuited cell 112 is denoted as $Q_{gen}$, which represents the heat generated per unit time in a section of the cell 112 having a thickness dx. The heat conducted into the volume element 118 at a location $x=x_0$ is given by the parameter $Q_x$. The heat conducted out of the volume element 118 at a location $x=x+dx$ is given by the parameter $Q_{x+dx}$. In this simplistic description, the quantity $Q_{gen}$ represents the heat energy generated throughout the volume element 118 which is dependent on the rate of heat generation per unit volume per unit time, represented by the parameter $\dot{q}$, and the volume of the element 118. The resulting energy balance equation is given by:

$$Q_x + Q_{gen} = Q_{x+dx} \quad [1]$$

and;

$$Q_{gen} = \dot{q} A dx \quad [2]$$

where, $Q_x$, $Q_{x+dx}$, and $Q_{gen}$ represent heat flow rates measured in watts (W), $\dot{q}$ represents the rate of heat generation per unit volume per unit time measured in watts/m$^3$, d represents the thickness of the volume element 118, and A represents the cross-sectional area of the volume element 118.

Those skilled in the art will appreciate that a temperature increase within the energy storage system shown in FIG. 9 due to a short-circuit event can be appropriately managed by understanding the thermal characteristics and energy producing capability of the cells. An in-situ thermal management system in accordance with the principles of the present invention may be employed to effectively dissipate excess thermal energy resulting from a short-circuit event without necessity of an external active thermal management scheme, such as a forced cooling or forced convection apparatus. The in-situ thermal management methodology described herein may be implemented by characterizing the heat capacity and heat dissipation properties of the particular type of cells used in an energy storing system, and appropriately limiting the energy content of the cells. The characteristics of the thermal conductors used to facilitate the transfer of heat between the cells and a thermally conductive housing must also be determined when implementing an in-situ thermal management methodology.

An important consideration that impacts the design of a multiple-cell energy storage system concerns the temperature at which the materials of a particular cell technology break down or degrade such that overall cell performance is significantly reduced. By way of example, a cell having a construction of the type shown in FIG. 1 has a breakdown temperature of approximately 180° C., which represents the melting point of lithium. Employment of an in-situ thermal management scheme implemented in accordance with the principles of the present invention prevents the temperature of the cell from reaching a breakdown temperature, or, if desired, a safety temperature lower than the breakdown temperature, even under short-circuit conditions.

The heat dissipation characteristics of a particular cell are dependent on a number of factors, including the cell's technology, dimensions, and thermal/electrical properties. Taking into consideration these known factors, the heat dissipation characteristics of a cell may be altered and optimized. Since heat dissipation in the cell 112 depends in large part on the thermal contact surface area with respect to contact surfaces of adjacent cells 110, 114, the maximum energy content per unit contact surface area required to maintain the cell temperature below a breakdown or safety temperature may be determined.

Figure 10A:
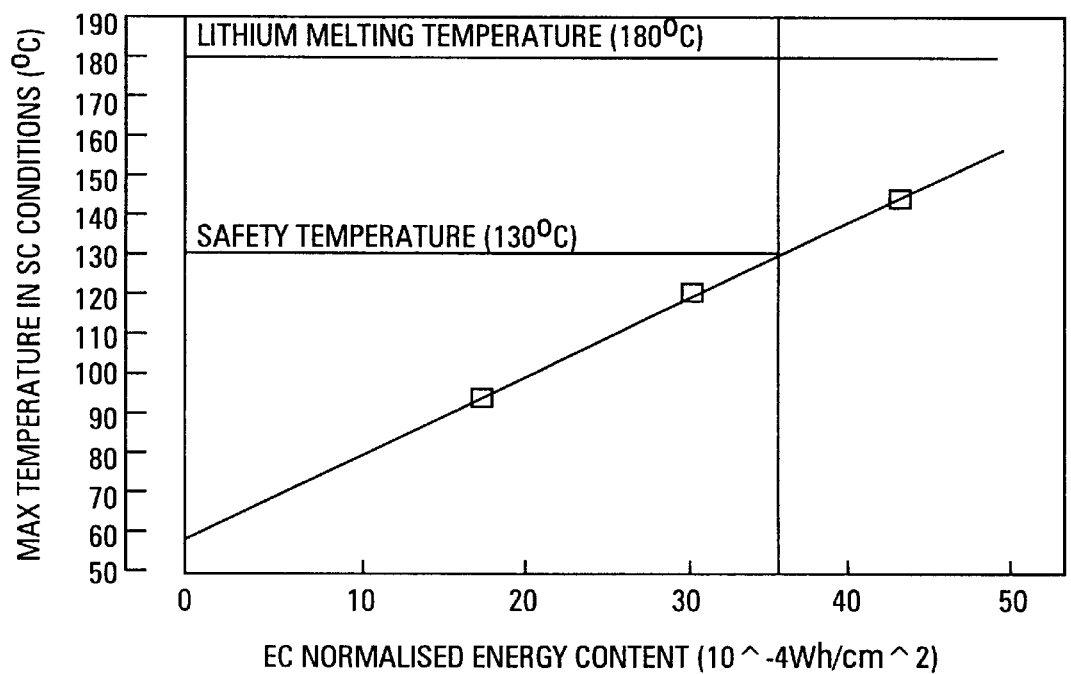
FIG. 10A is a graphical representation of a relationship between maximum temperature of a cell under short-circuited conditions and normalized energy content of a cell, the normalized energy content representing the ratio of energy content-to-contact surface area for adjacently disposed cells.
Figure 10B:
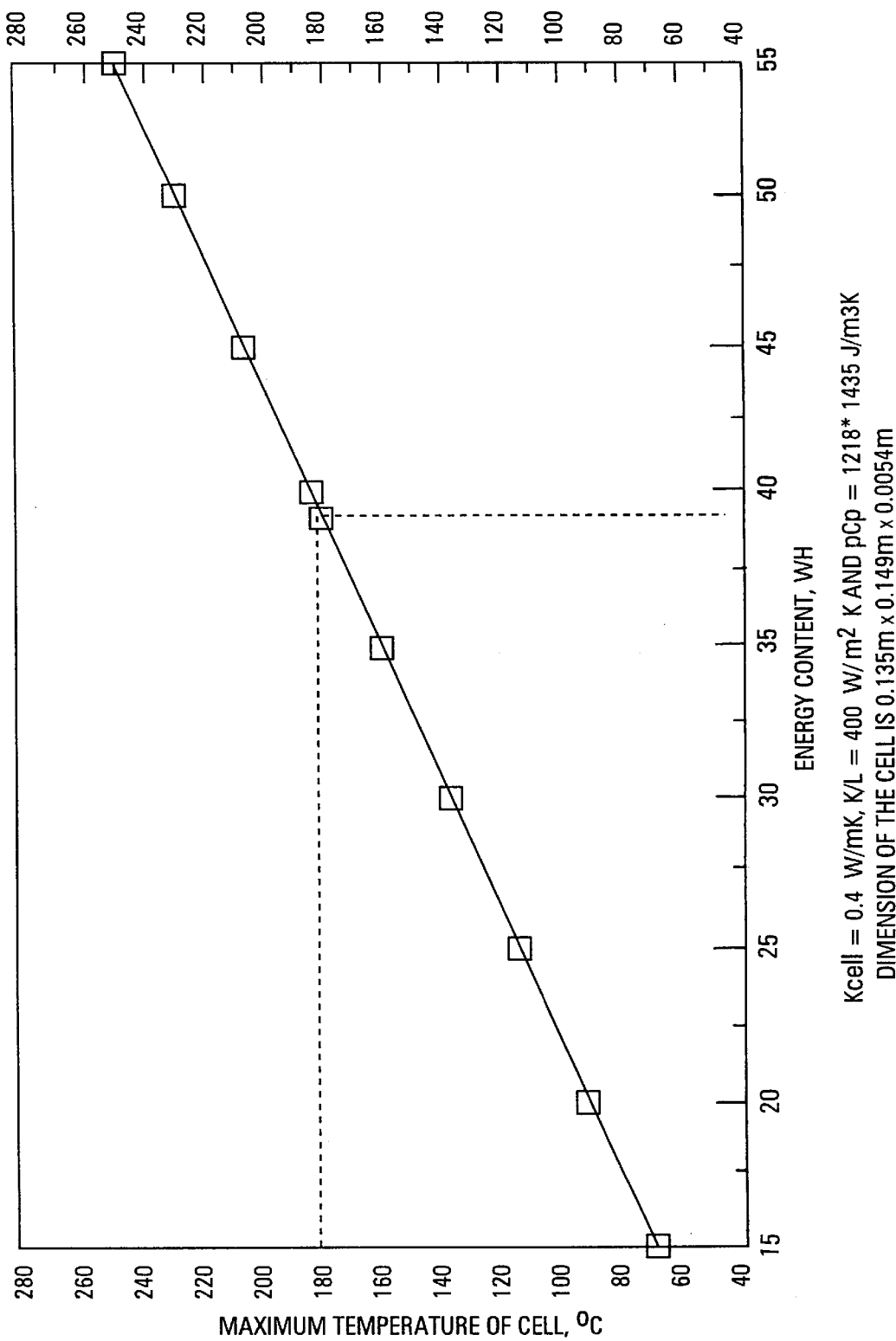
FIGS. 10B–10C illustrate in a graphical form a relationship between maximum cell temperature of an energy storing module and the energy content and thickness of the cell, respectively.

By way of example, and with reference to FIG. 10A, there is shown in graphical form a relationship between the maximum temperature of a cell of a given technology having a construction as shown in FIG. 1 under short-circuit conditions and a ratio of normalized energy content-to-contact surface area for the cell. It is to be understood that the graph of FIG. 10A characterizes a cell having a particular chemistry and having particular geometric and thermal/electrical properties. Similar graphs may be developed for cells of differing technologies and having characteristics that differ from those of the cell characterized in FIG. 10A. For example, FIG. 10B depicts a relationship between energy content and maximum cell temperature for a cell having a construction similar to the cell characterized in FIG. 10A but having a different cathode oxide.

Using the graph shown in FIG. 10A, the energy content of a cell and the physical dimensions of the cell may be selected so that the ratio of energy content-to-cell surface area is kept within a range such that the maximum cell temperature remains below a breakdown or safety temperature, even under short-circuit conditions. An energy content-to-contact surface area ratio of less than approximately 0.0050 Wh/cm$^2$ for a thin-film lithium polymer cell provided with an appropriate thermal conductor will ensure that a worst-case temperature resulting from a short-circuit in the cell does not exceed the melting point of the lithium elements within the cell (i.e., 180° C.).

If it desired to design the cell to ensure that a maximum short-circuited cell temperature does not exceed a safety temperature, such as 130° C., the energy content and contact surface area of the cell may be appropriately selected using the graph of FIG. 10A. It is understood that an in-situ thermal management design approach may be employed for energy storage cells having varying configurations. For example, the length (L), height (H), width (w), or radius (r) may be varied as needed for a given application, with the constraint that the ratio of energy content-to-contact surface area remain in a range that prevents the worst-case cell temperature from exceeding the cell breakdown temperature.

Figure 14:
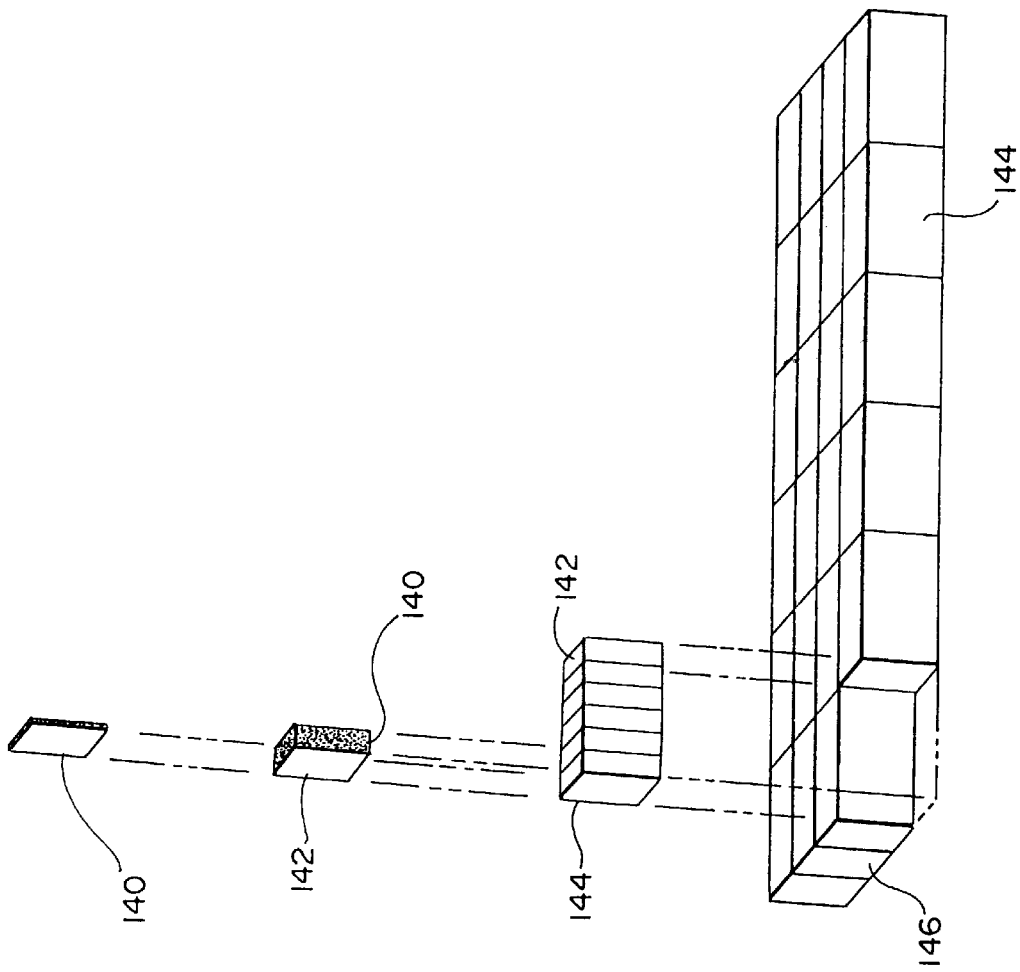
FIG. 14 illustrates various energy storing device configurations, including cell, cell pack, module, and battery configurations.

In order to facilitate the proper design and manufacture of thermally stable energy storing modules and devices which contain a number of closely situated electrochemical cells, it is useful to express the maximum temperature achievable by the cells under worst-case conditions (i.e., a short-circuit) as a function of several variables, including the ratio of energy content of the cell to cell volume, conductivity of the cells, thermal conductance, and cell thickness. The following equations characterize the maximum temperature, ($T_{max}$), of a short-circuited cell of a given technology when the cell is packaged in an energy storing module such as that depicted in FIGS. 14–15. It is noted that the equations below were developed by use of numerical simulations of a multiple-cell module at an initial operating temperature of 60° C. It is further noted that these equations were developed based on a cell technology similar to that implicated in FIG. 10B. Using the following equations, it is possible to calculate the conductance of a thermal conductor required to safely dissipate excess heat generated by a short-circuited cell.

Equation [3] below mathematically characterizes the maximum cell temperature of a thin-filmed electrochemical cell, which does not include a foam core element, as a function of various operative parameters. The dimensions of the cell characterized in Equation [3] are given as 0.135 m×0.149 m×0.054 m. The maximum cell temperature for the cell is given by:

$$T_{max}=1/1.1 \cdot 1/1.2 \cdot 0.037738 \cdot (1/(\rho_{cell} \cdot Cp_{cell}))^{0.3856} \cdot (Q/kcell) \cdot (\delta)^{0.6146} \cdot (K/L)^{-0.077} \quad [3]$$

where, $T_{max}$ represents the maximum temperature reached by a short-circuited cell in a module (° C.), $\rho_{cell}$ represents the density of the cell (kg/m$^3$), $Cp_{cell}$ represents the heat capacity of the cell (J/kgK), Q represents the energy content of one cell per unit volume (Wh/m$^3$), kcell represents the conductivity of the cell in the cell-to-cell axial direction (W/mK), $\delta$ represents cell thickness in the cell-to-cell axial direction (mm), and K/L represents the conductance of the thermal conductor (W/m$^2$K).

Using Equation [3] above, a relationship between maximum temperature of a short-circuited cell as a function of the cell's energy content for a given cell chemistry and configuration may be developed. A relationship between maximum cell temperature as a function of cell thickness may also be developed. By way of example, and with reference to FIGS. 10B–10C, there is depicted a relationship between maximum cell temperature as a function of energy content and cell thickness, respectively. The data reflected in FIGS. 10B–10C was developed with the following variables held constant: kcell=0.4 W/mK, K/L=400 W/m$^2$K, $\rho_{cell} \cdot Cp_{cell}$=1218·1435 J/m$^3$K.

Figure 10C:
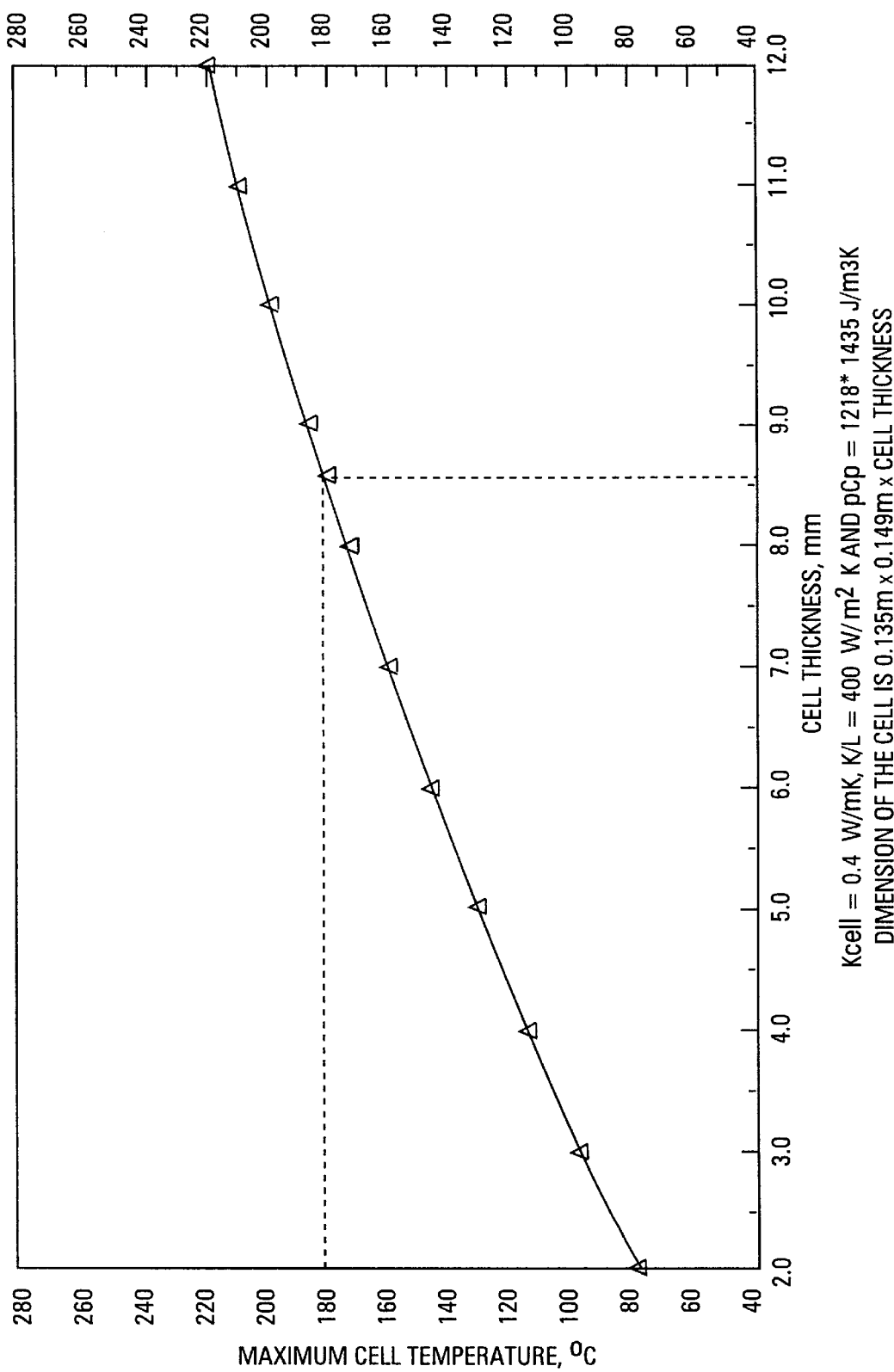

It can be seen from FIG. 10B that a thin-film electrochemical cell of the type characterized above should have an energy content which is limited to less than approximately 38 Wh to ensure that the maximum temperature of the cell will not exceed a breakdown temperature, such as the melting point of lithium (i.e., 180° C.). It is interesting to note the linearity of the maximum cell temperature-to-energy content relationship depicted in FIGS. 10A and 10C, given the difference in cell technology. It can be seen from FIG. 10C that the thickness of the cell should not exceed approximately 8.5 mm in order to ensure that the maximum temperature of the cell does not exceed the 180° C. breakdown temperature.

Equation [4] below characterizes maximum cell temperature for an energy storing module of the same cell technology as that implicated in Equation [3] in which some of the cells include a foam core element compressed to approximately 2 mm. More specifically, Equation [4] characterizes maximum cell temperature for a module design in which compressed foam core elements are provided in every two electrochemical cells. In this case, maximum cell temperature for such a module configuration is given by:

$$T_{max}=0.037738 \cdot (1/(\rho_{cell} \cdot Cp_{cell}))^{0.3856} \cdot (Q/kcell) \cdot (\delta)^{0.6146} \cdot (K/L)^{-0.077} \quad [4]$$

It is interesting to note that Equations [3] and [4] differ only by constants (i.e., the constants 1/1.1 and 1/1.2 in Equation [3]). conductance value, K/L, that varies between approximately 200 and 600 W/m$^2$K.

The in-situ thermal management approach described above with respect to FIGS. 3D and 9 is generally applicable for managing short-circuit temperature increases occurring in a single cell of a grouping of cells. In applications in which a significant number of parallel connected cells are configured in a stack or bundle, an enhanced in-situ short-circuit protection scheme may be implemented to prevent thermal runaway within the cell stack, and to isolate a particular cell from the parallel connection upon occurrence of a short-circuit in the cell.

Figure 11:
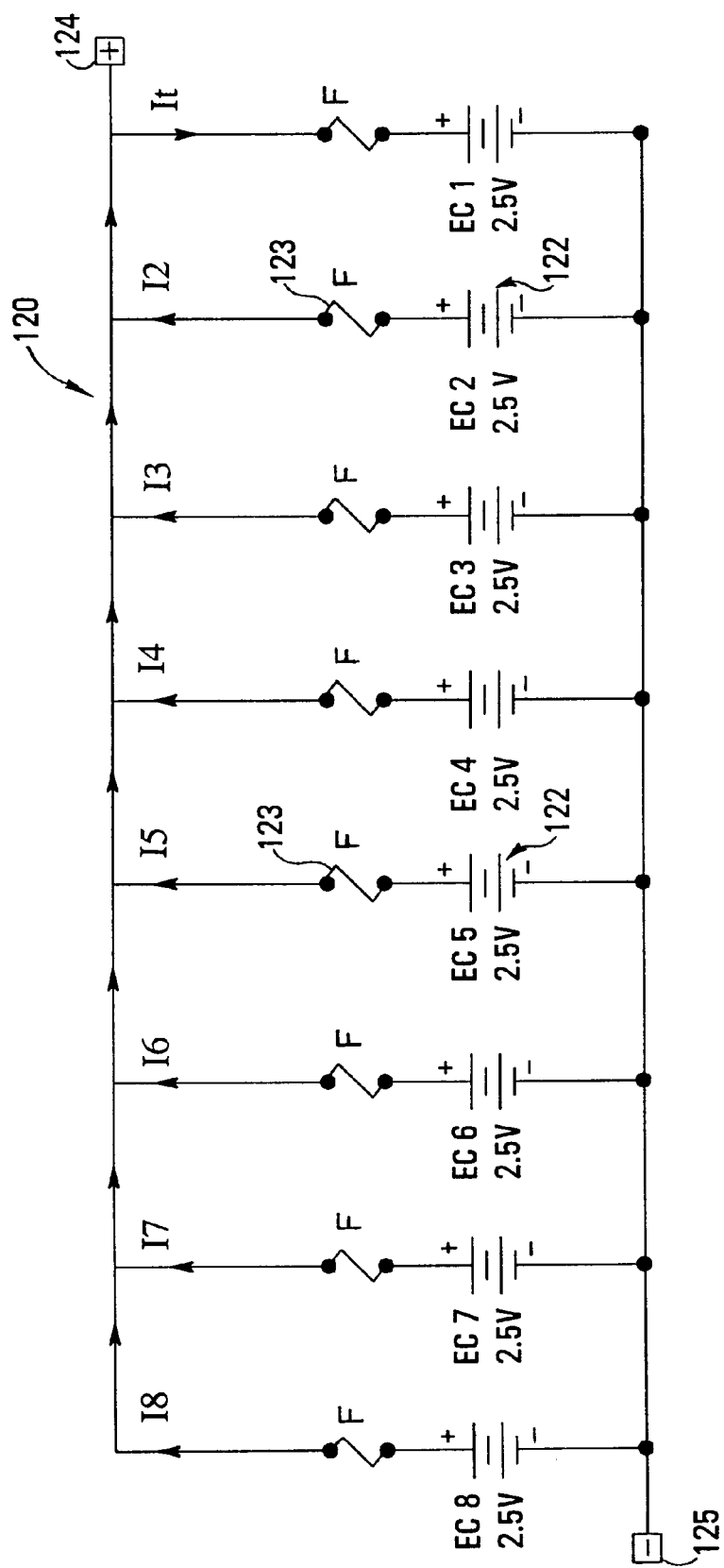
FIG. 11 illustrates an embodiment of a multiple-cell energy storage device in which one of the cells is subject to a short-circuit condition.

In the embodiment of an energy storage system illustrate in FIG. 11, the energy storage device 120 includes eight energy storage cells respectively connected in parallel to common positive and negative terminals 124, 125. The cell EC1 is shown as a short-circuit. Given this arrangement, and with reference to FIG. 7, it can be seen that only one short-circuited cell within a stack of eight cells can be managed using the above-described in-situ thermal management methodology without exceeding the breakdown temperature of the cell material. An in-situ short-circuit protection device may be incorporated into an energy storage system to prevent multiple short-circuited cell events from occurring.

In accordance with one embodiment of the present invention, and as shown in FIG. 11, a fuse 123 is connected in series with a respective cell 122 within the multiple-cell energy storage device 120. In the event that a short-circuit occurs in any of the parallel connected cells 122, the fuse 123 of the defective cell 122 blows so as to electrically isolate the short-circuited cell 122 from the parallel connection. The heat generated during development of the short-circuit in the cell 122 and after blowing of the fuse 123 is conducted to cells adjacent the defective cell 122 in a manner previously described. As such, the maximum temperature attainable by a cell under worst-case conditions is well below the breakdown temperature of the cell. More particularly, the data of FIG. 7 confirms that the temperature of a short-circuited cell within the cell stack never exceeds a safety temperature of approximately 130° C. when an in-situ short-circuit protection device is employed.

Figure 12:
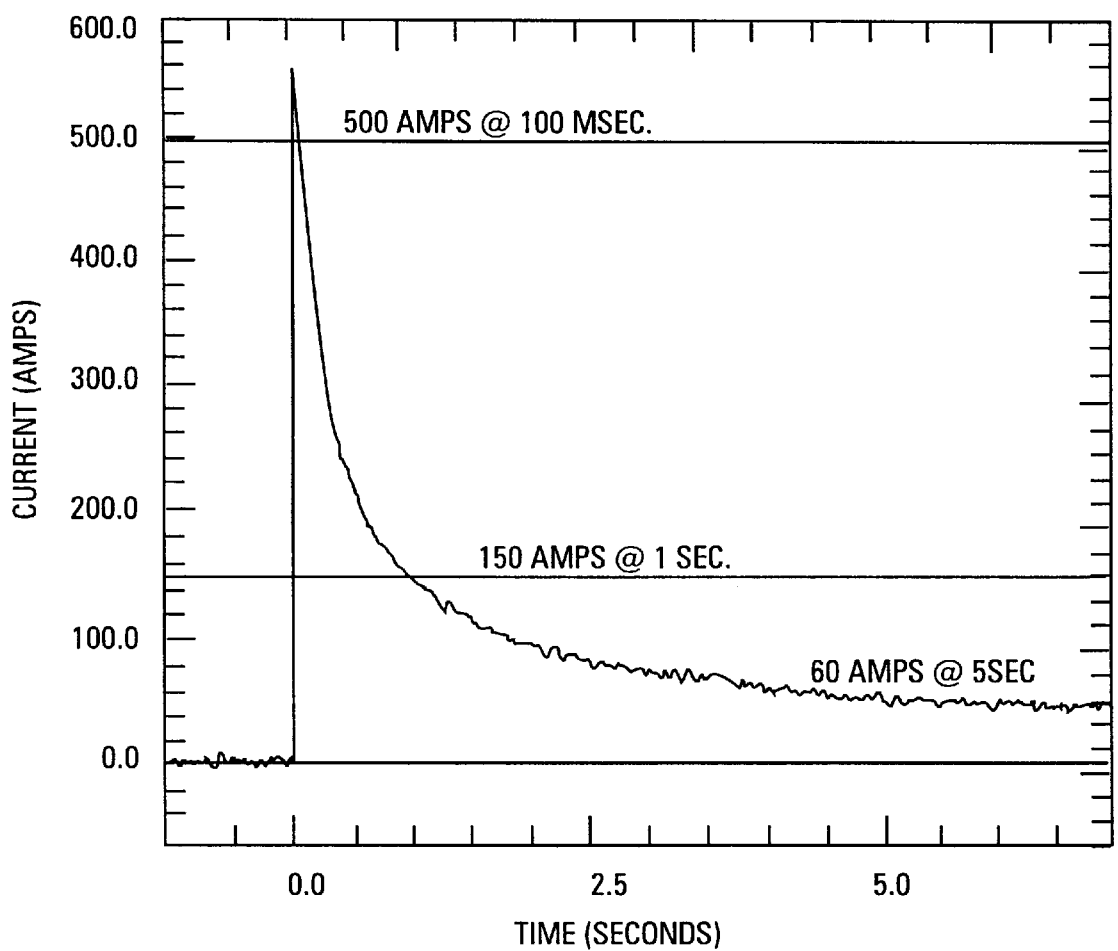
FIG. 12 illustrates a characteristic current waveform for an electrochemical cell upon occurrence of a short-circuit in the cell.

Referring now to FIG. 12, there is illustrated a graph which characterizes the effect on cell current upon the occurrence of a short-circuit in a thin-film electrochemical cell. A thin-film cell of the type shown in FIG. 1, as well as other types of high-energy cells, exhibit a significant short-term increase in cell current due to the capacitive characteristics of the cell. For example, the current in the cell characterized in FIG. 12 spikes at a value in excess of 500 A in less than approximately 100 milliseconds. Following the current spike, the current in the cell rapidly decays to approximately 150 A after 1 second, and gradually decays thereafter. At 5 seconds following the short-circuit event, the cell current reaches a value of approximately 60 A.

The characteristic current spike that occurs immediately after a short-circuit event in a high-energy cell is advantageously exploited by an in-situ short-circuit protection device implemented in accordance with the principles of the present invention. In the embodiment shown in FIG. 11, for example, each of the fuses 123 connected in series with a corresponding energy storage cell 122 are designed to activate in response to a current spike generated from a short-circuit in the cell 122. A fuse 123 typically has a current rating that prevents the fuse from activating during normal operation, yet permits the fuse to activate in response to a short-circuit condition. Exploiting the current spike as a triggering mechanism for the fuse 123 provides for a large current gap between the maximum operating current level of the cell 122 and the minimum activation current level of the fuse 123.

In accordance with one embodiment, the parallel connected cells of an energy storage device have a structure and behavior similar to those previously described with reference to FIGS. 3A–3D. In such a configuration, the fuses connected in series with the cells have a current rating of approximately 50 A. By utilizing the capacitive effect of the cell to trigger the 50 A fuse, unintentional activation of the fuse is avoided, providing for both safe and reliable short-circuit protection of the energy storage device.

In some applications, protection against accidental shorting of an energy storage device or cell, such as through a foreign conductive implement or material, may be of primary concern. It may be desirable, therefore, to employ a fuse that is activated more slowly than the fast acting fuse described above. For example, a fuse that activates after several hundred milliseconds or several seconds after occurrence of a short-circuit in the cell may be employed. Although excess heat is generated between the time the short occurs and the time the fuse blows, the in-situ thermal management methodology described previously provides for the safe dissipation of such excess heat.

Figure 13:
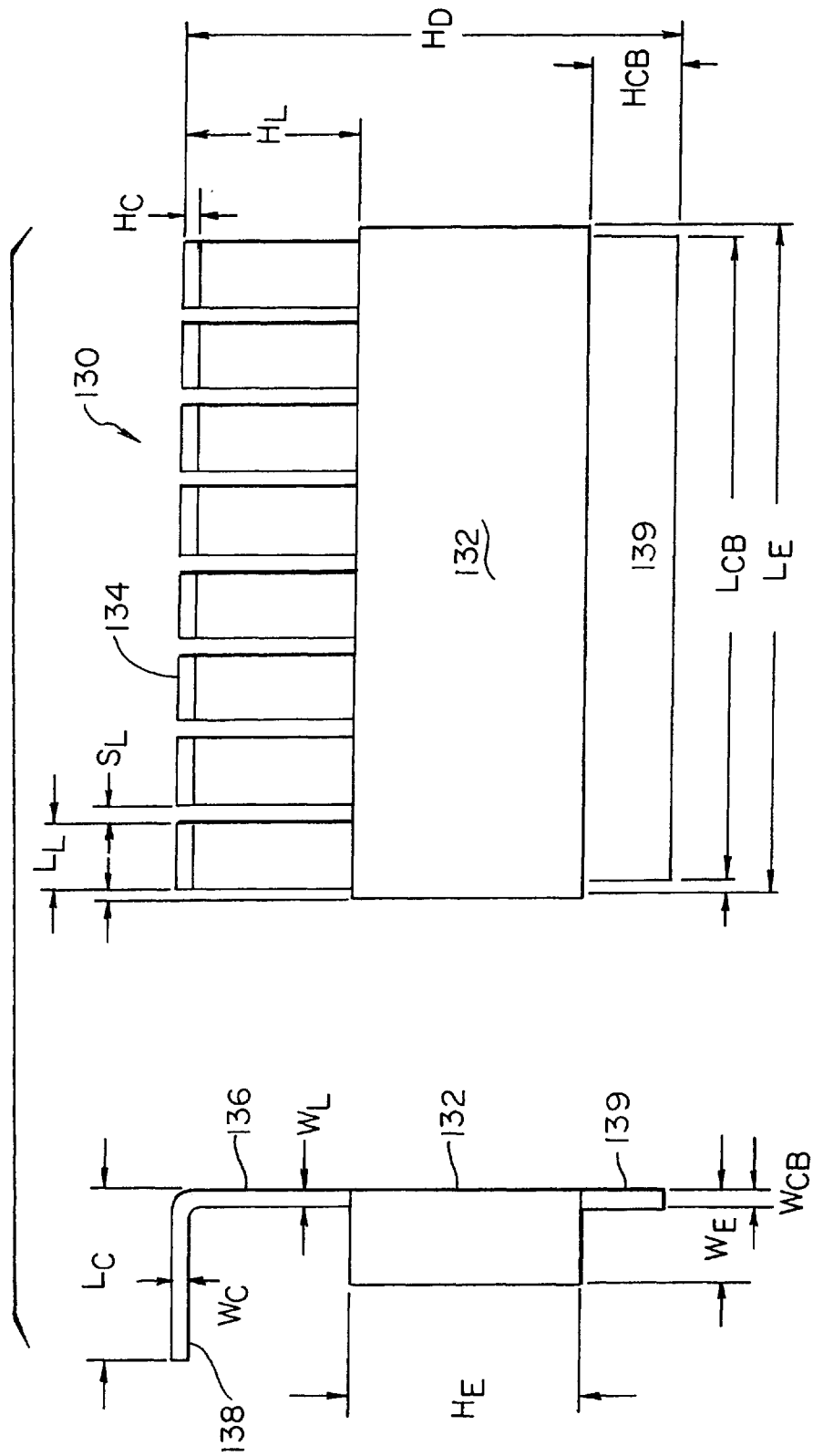
FIG. 13 is an embodiment of an integrated short-circuit protection device in accordance with an embodiment of the present invention.

In FIG. 13, there is illustrated an embodiment of a short-circuit protection device fabricated in an integrated package. The integrated device 130 includes an enclosure 132 within which eight fuses (not shown) are mounted. A first contact of each fuse is connected in series with a corresponding one of eight terminals 134, and a second contact of the each fuse is connected to a common bus 140. Each of the terminals 134 includes a lead 136 and a contact 138. When the short-circuit protection device 130 is connected to an array of cells, each of the contacts 138 engages a corresponding contact of one of eight cells in the array. The common bus 140 is typically coupled to one or more common busses of other short-circuit protection devices 130 connected to corresponding cell arrays to form a series connected energy storage device, such as a module.

In one embodiment, the enclosure 132 has a height, $H_E$, of 16.00 mm, a width, $W_E$, of 7.49 mm, and a length, $L_E$, of 50.80 mm. The lead portion 136 of the terminal 134 has a height, $H_L$, of 12.70 mm, a width, $W_L$, of 1.27 mm, and a length, $L_L$, of 5.00 mm. The contact portion 138 of the terminal 134 has a height, $H_C$, and a width, $W_C$, of 1.27 mm, and a length, $L_C$, of 13.03 mm. The common bus 140 has a height, $H_{CB}$, of 6.35 mm, a width, $W_{CB}$, of 1.27 mm, and a length, $L_{CB}$, of 49.02 mm.

An additional factor that further complicates the effort to provide an effective thermal and electrical conduction apparatus for high-energy electrochemical cells concerns cyclical changes in cell volume that occur in various types of thin-film electrochemical cells. By way of example, the volume of an electrochemical cell of the type described previously with regard to FIG. 1 varies during charge and discharge cycling due to the migration of lithium ions into and out of the lattice structure of the cathode material. This migration creates a corresponding increase and decrease in total cell volume on the order of approximately five to six percent during charging and discharging, respectively.

It has been determined that the performance and service-life of such an electrochemical cell is significantly increased by maintaining the layers of the cell in a state of compression. Improved cell performance may be realized by maintaining pressure on the two larger opposing surfaces of the cell during cell cycling. The thermal conduction characteristics of a stack of electrochemical cells are significantly improved when forced contact between adjacently situated cells is maintained. It is considered desirable that the compressive forces, whether produced internally or externally of the cell, be distributed fairly uniformly over the surface of application.

A number of electrochemical cells may be arranged in a stack configuration and interconnected to form larger power producing devices, such as modules and batteries for example. A grouping of electrochemical cells may be selectively interconnected in a parallel and/or series relationship to achieve a desired voltage and current rating. For example, and with reference to FIG. 14, a number of electrochemical cells 140 may be grouped together and connected in parallel to common positive and negative power buses or terminals to form a cell pack 142. A number of the electrochemical cell packs 142 may then be connected in series to form a module 144. Further, a number of individual modules 144 may be connected in series to constitute a battery 146.

Figure 15:
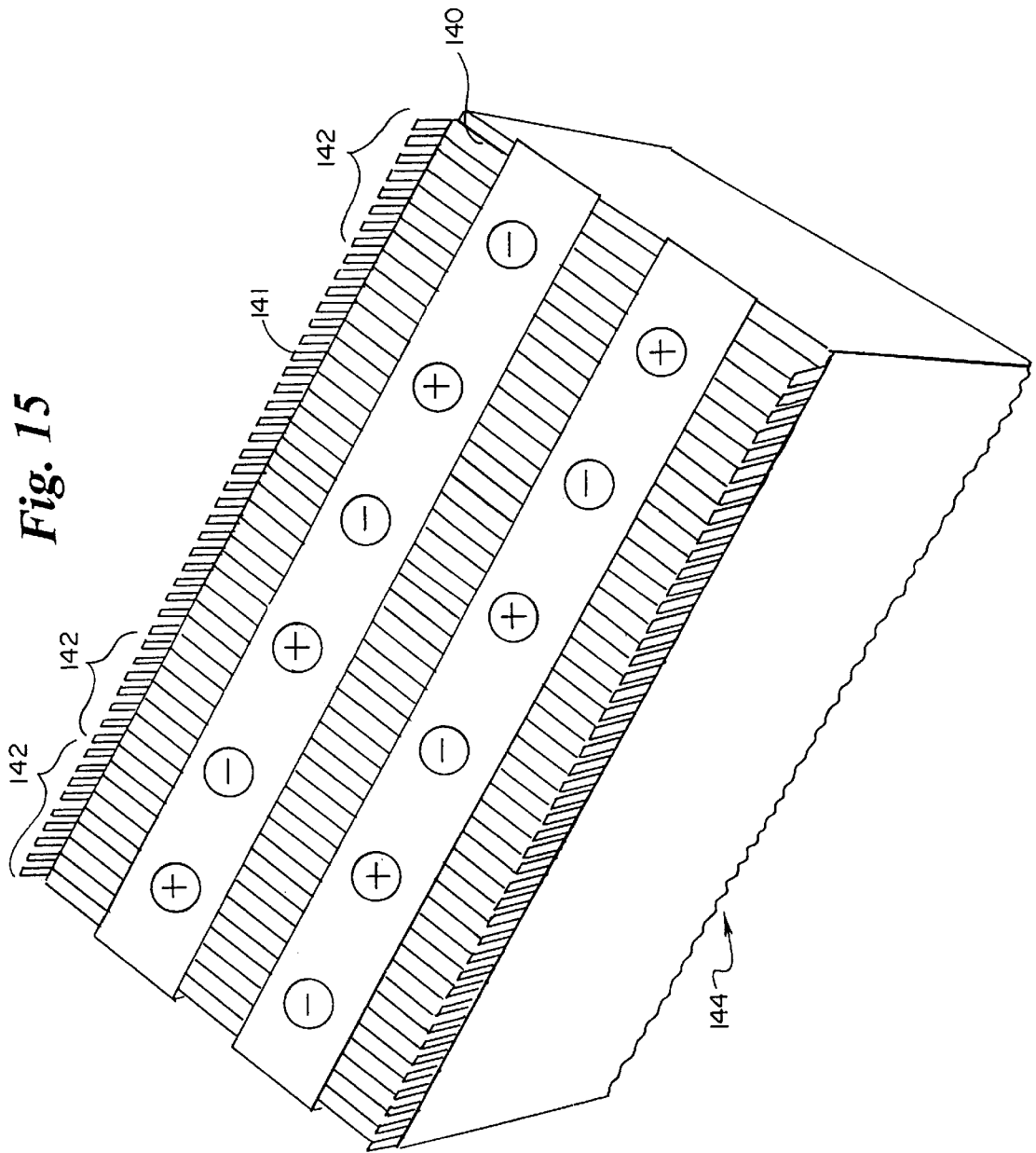
FIG. 15 is a perspective view of an energy storage module containing a number of interconnected thin-film electrochemical cells.

For purposes of illustration, the embodiment shown in FIG. 15 depicts an arrangement of electrochemical cells in accordance with a modular packaging approach which provides an efficient means of achieving desired power requirements for a broad range of high-power applications. In this illustrative embodiment, eight electrochemical cells 140 are grouped together and connected in parallel to form a cell pack 142. A module 144 is constituted by grouping six cell packs 142 together and connecting the packs 142 in series. A battery 146, such as that depicted in FIG. 14, may be constructed using 24 modules 144 connected in series.

Figure 16:
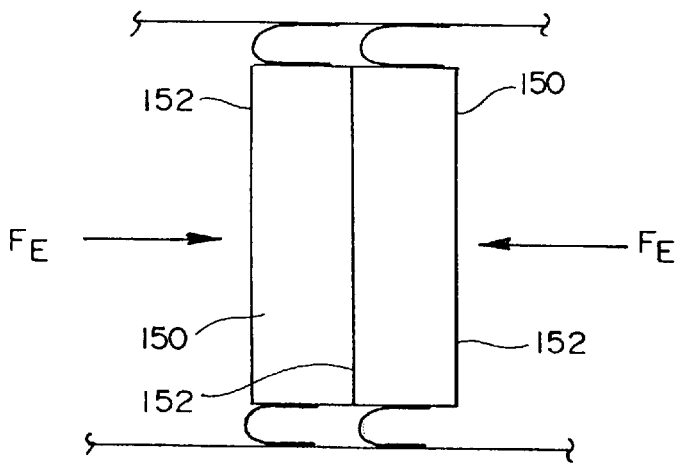
FIG. 16 illustrates an embodiment of a grouping of electrochemical cells subjected to externally produced forces for placing the electrochemical cells in compression.

In order to accommodate variations in cell volume resulting from charge and discharge cycling of a grouping of cells, a pressure producing apparatus is employed to maintain the cells in a continuous state of compression. With reference to FIG. 16, a number of electrochemical cells 150, two of which are shown in FIG. 16, may be arranged in a stack configuration and subjected to an external force, $F_E$, sufficient to maintain the cells 150 at the desired level of compression. Each of the cells 150 includes two opposing surfaces 152 having a large surface area relative to the surface area of the four edges of the cell 150. The magnitude of the external force, $F_E$, ranges between 5 and 100 psi for individual cells 150.

For a stack of 48 cells, for example, an external force $F_E$, sufficient to maintain the cell stack in a state of compression during charge/discharge cycling ranges from between approximately 5 and 100 psi. It is understood that the external force, $F_E$, may be maintained at a constant magnitude, such as 20 psi for example, or may vary between a minimum and a maximum value during cell cycling. Further, the external force, $F_E$, may be produced by contact between an end cell of the cell stack and an active pressure generating mechanism while the opposing end cell of the cell stack is restricted from movement by a stationary structure. Alternatively, an active pressure generating mechanism may be employed at opposing end cells of the cell stack.

Figure 17:
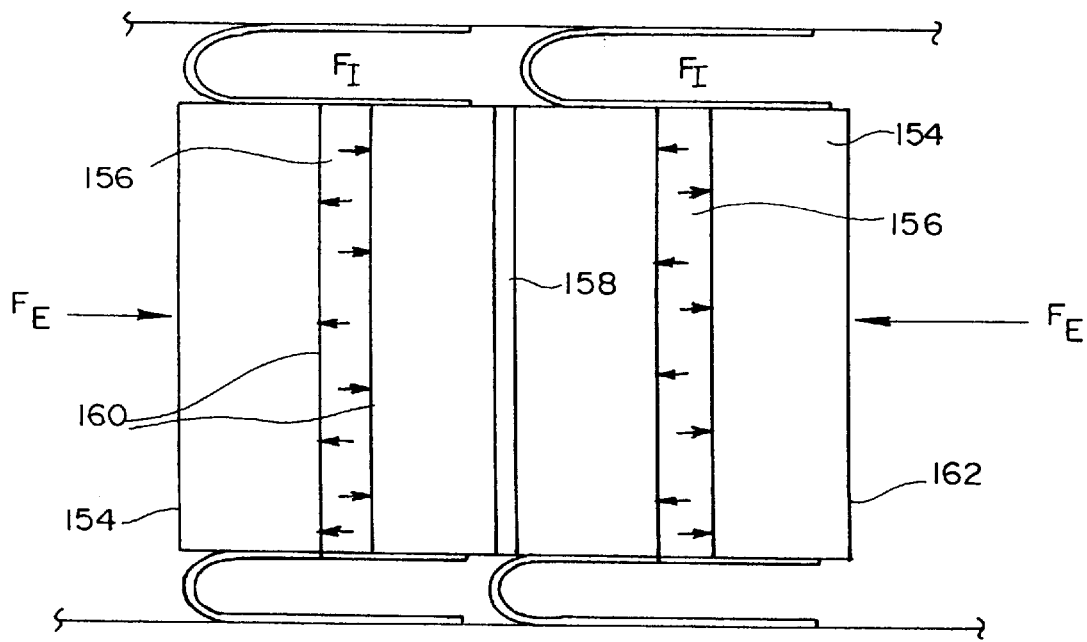
FIG. 17 illustrates another embodiment of a grouping of electrochemical cells subjected to internally and externally produced forces for placing the electrochemical cells in compression.

Referring to the embodiment illustrated in FIG. 17, one or more of the electrochemical cells 154 constituting a cell stack may be configured to include a central core element 156 which produces a force, $F_I$, within the cell 154. The core element 156, which may include a foam or spring mechanism, exerts a force, $F_I$, along internal surfaces 160 of the cell 154. Counteracting external forces, $F_E$, produced along the exterior surfaces 162 of the cell 154 result in generation of compressive forces distributed fairly evenly across the large surfaces 162, 160 of the cells 154.

It is noted that the externally produced force, $F_E$, exerted on the exterior surfaces 162 of the two end cells 154 of the cell stack may be produced by a stationary structure, such as a wall of a containment vessel, or by use of an active pressure generating mechanism, such as a foam element or a spring-type apparatus adjacent the walls of containment vessel. The internal pressure generating apparatus should maintain an evenly distributed pressure along the inner surfaces 160 of the cells 154 ranging between approximately 5 and 100 psi during charge/discharge cycling. This force, $F_I$, may be maintained at a constant magnitude or may vary in magnitude within the above-stated range. Additionally, the stack of cells may include one or more spring inserts 158 situated between adjacent cells 154. The spring insert 158, which may include a foam, metal spring, or gas-charged pressure element, may be included within the cell stack to enhance distribution of compressive forces within the cell stack.

Figure 18A:
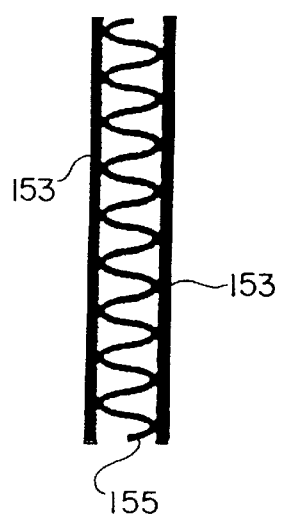
FIGS. 18A–18C illustrate various embodiments of a spring-like core element for use within or between prismatic electrochemical cells.
Figure 18B:
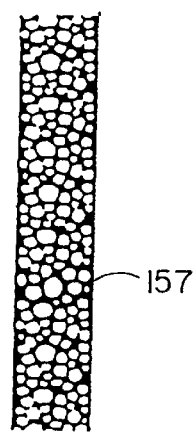
Figure 18C:
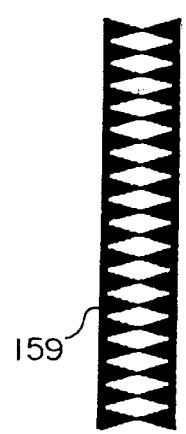

In FIGS. 18A–18C, there is illustrated in cross-section various embodiments of a spring element which may be employed to produce internal or external compressive forces within an electrochemical cell. In one embodiment, a thin-film electrochemical cell, such as that illustrated in FIG. 1, may be wound about a core element which includes a flexible metal member 155 constrained between two thin metal plates 153, as is shown in FIG. 18A. The use of a metal core element 156 provides for consistency in shape and performance over time, since such a structure is substantially immune to mechanical creep.

Use of an elastomeric core element, in accordance with another embodiment, offers advantages of simplicity in fabrication, efficiency in cell packaging configuration, improved pressure distribution, and relatively low material costs. An elastomeric foam spring 157, such as that illustrated in FIG. 18B, provides for a relatively large deflection as a percentage of the spring's original size, which provides for volume and weight conservation. A foam core element 157 is initially maintained at approximately 10 to 40 percent compression with respect to its original thickness prior to winding the thin-film cell material about the core element 157 during cell fabrication. This initial state of compression produces compressive pressure within the cell that typically ranges between approximately 10 and 35 psi during volumetric variations in the cell resulting from charge/discharge cycling.

In accordance with the embodiment illustrated FIG. 18C, a micro-structured elastomeric extrusion 159 or molded element may be employed as the core element in or between electrochemical cells which may provide enhanced control of forces produced within the electrochemical cells. It is understood that other internal and external force producing mechanisms may be employed to maintain the electrochemical cell in a state of compression during charge and discharge cycling. For example, the spring elements shown in FIGS. 18A–18C may be configured as a flat spring which may be disposed between adjacent or selected cells within a cell stack, and/or between an end cell of the cell stack and a stationary wall structure.

In an embodiment in which a silicone foam element having a thickness of approximately 0.8 mm is inserted in the core of a thin-film electrochemical cell, the overall thickness of the electrochemical cell including the foam insert is approximately 5.86 mm. The foam core element is subject to between approximately 10 to 40 percent compression with respect to its original thickness as the state of charge of the cell is varied between 0% and 100%, respectively. The foam core element produces corresponding internal compressive forces varying between approximately 10 to 35 psi.

In FIGS. 19A–19B, there is illustrated one approach to maintaining a stack of electrochemical cells 164 in a state of compression during cell charge/discharge cycling. In the configuration shown in FIG. 19A, a spring mechanism 166 is disposed adjacent one of two thrust plates 168 or containment vessel walls between which the cell stack 164 is constrained. The spring mechanism 166 exerts a compressive force on the charged cells of the cell stack 164 as is shown in FIG. 19A. During discharge, the thickness of the cells reduces by up to approximately 6 percent when transitioning from a fully charged state to a normal discharge state.

The spring mechanism 166, in response to the overall reduction in cell stack thickness during discharge, expands in size to apply continuous pressure on the cell stack 164. It can be appreciated that the magnitude of cell stack displacement, $X_D$, between the thrust plates 168 during charge/discharge cycling can be significant. By way of example, a cell stack 164 which includes 64 prismatic electrochemical cells, such as that shown in FIG. 3A, may be subject to a cumulative displacement, $X_D$, of approximately 18 to 20 mm between charged and discharged states. In view of the significant positional shifting of individual cells within the cell stack during cell cycling, a single spring mechanism 166, such as that shown in FIG. 19A, although providing the requisite level of compressive forces, subjects cells of the cell stack 164 to a significant degree of positional movement within a containment vessel.

In the embodiment illustrated in FIGS. 20A–20B, multiple spring mechanisms are employed within the cell stack 163 to minimize displacement of the cells 161 during charge/discharge cycling. In one embodiment, a spring mechanism is incorporated into all of the cells 161 of the cell stack 163 which advantageously minimizes the positional shifting of individual cells 161 during cell cycling. Integrating a spring element within a cell 161 helps to fix the center location of the cell 161 with respect to the thrust plates 165. It is believed that incorporating a spring within each of the cells 161 will likely reduce relative cell movement within the stack 163 to near zero. In general, minimizing the magnitude of cell displacement during cycling minimizes the complexity of the electrical and thermal interconnections within the cell stack 163 and increases the reliability and useful-life of the cell stack 163 over time.

Figure 21:
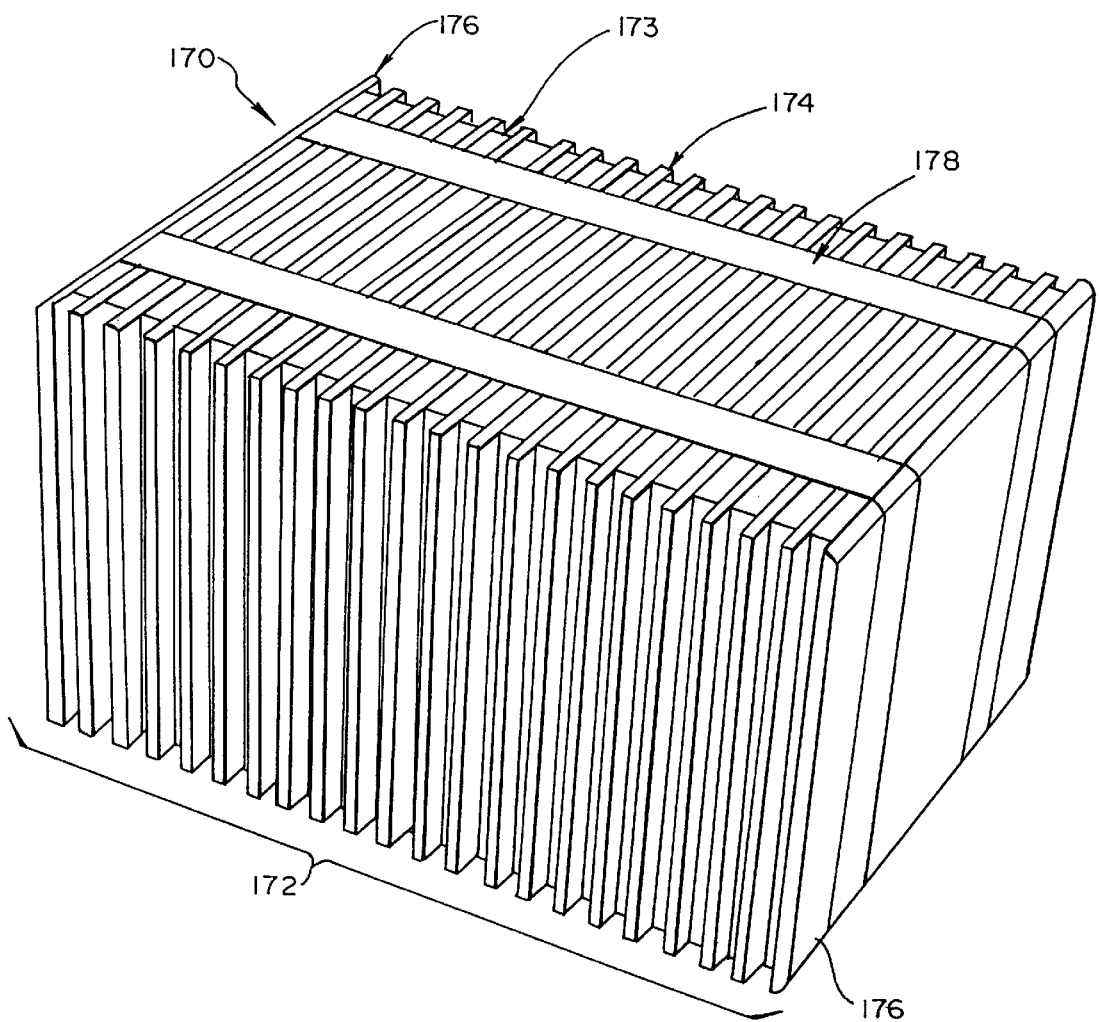
FIG. 21 illustrates an embodiment of a force generating apparatus for maintaining a stack of electrochemical cells in a state of compression.

Referring to FIG. 21, there is illustrated an embodiment of a pressure apparatus for maintaining a stack 172 of electrochemical cells 174 having a prismatic configuration in a state of compression within a module housing or other containment vessel. In accordance with this embodiment, pressure is distributed fairly evenly throughout the cell stack 172 by cooperative use of one or more straps 178, opposing thrust plates 176, and flat springs 173 disposed between adjacent electrochemical cells 174. The thrust plates 176, which are retained by the straps 178, maintain compression of the flat springs 173 distributed within the stack of cells 172. It is noted that the flat springs 173 may be situated between each of the cells as is shown in FIG. 21, or may alternatively be selectively placed between non-adjacent cells, such as between every second or third cell for example. Reducing the number of flat springs 173 within the cell stack 172, however, will result in increased cell displacement during charge/discharge cycling.

The pressure system illustrated in FIG. 21 provides for the continuous application of compressive forces within the cell stack 172 during cell cycling. It is considered desirable that the magnitude of the compressive forces within the cell stack 172 be maintained at varying or constant levels ranging between approximately 5 and 100 psi. Further, overall module performance is improved by distributing the requisite pressure fairly evenly across the large side surfaces of the cells with no greater variation than approximately 10 psi over the surface of application. It is noted that the cell stack portion of the module 170 shown in FIG. 21 may be constrained by supporting walls of a containment vessel, such as an inner shell of a module housing. In a configuration in which the thrust plates 176 abut the walls of a containment vessel, the straps 178 need not be included for purposes of limiting the displacement of the opposing thrust plates 170 resulting from increases in cell volume during charging.

Figure 23:
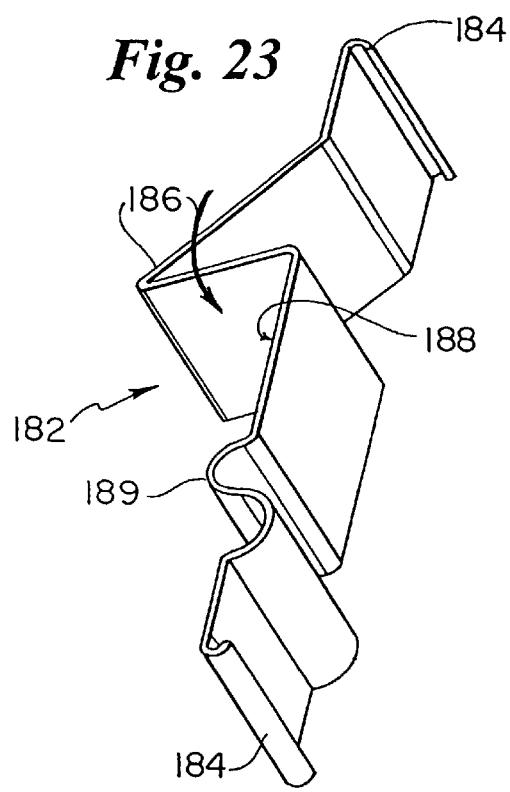
FIG. 23 is a perspective view of the tension producing clamp shown in FIG. 22.
Figure 22:
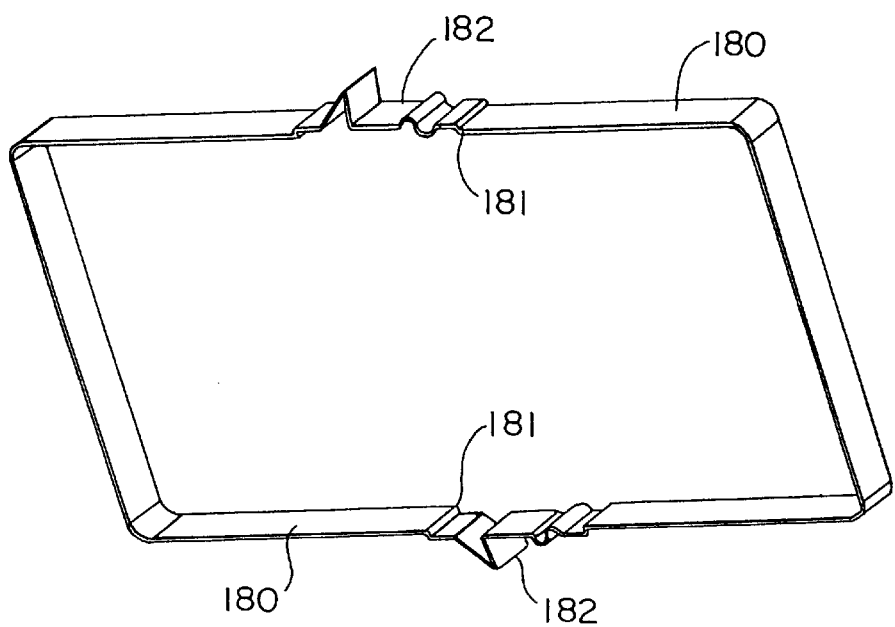
FIG. 22 is an illustration of a band or strap including a tension producing clamp for use in a pressure generating apparatus for maintaining a stack of electrochemical cells in compression during charge and discharge cycling.

FIGS. 22–23 illustrate an embodiment of a strap apparatus 180 which is particularly useful in constraining a number of electrochemical cells configured as a stack or bundle. In contrast to a strap apparatus which is substantially inelastic with respect to its length, the strap apparatus shown in FIGS. 22–23 incorporates a unique clamp 182 which significantly enhances the efficacy of a cell stack pressure system. The strap apparatus includes two bands 180 each having C-shaped ends 181. A clamp 182 is attached to a band 180 by coupling the C-shaped ends 181 of the band 180 with corresponding C-shaped ends 184 of the clamp 182. It is assumed that the bands 180 are disposed around the stack of cells in a manner as shown in FIG. 21. The clamp 182 includes a hinge 186 integral to the clamp 182 which is collapsible onto a contact surface 188 of the clamp 182 when subjected to sufficient force.

When the hinge 186 is collapsed onto the contact surface 188, the C-shaped ends 184 of the clamp 182 are pulled towards each other which, in turn, produces a force in the C-shaped ends of the bands 180. The magnitude of the force induced in the bands 180 by actuation of the clamps 182 is moderated by a sine wave-shaped spring 189 integral to the clamps 182. The sine wave-shaped spring 189 may be configured, in terms of shape, thickness, and material, to provide for a desired amount of expansion and retraction of the strap apparatus during charge/discharge cycling of the cells.

In a configuration in which a cell stack retained by use of the strap apparatus shown in FIGS. 22–23 is placed within a containment vessel, such as the inner shell of an energy storage module housing, contact between the hinge 186 of the clamp 182 and a wall of the containment vessel ensures that the hinge 186 is maintained in the collapsed configuration.

In general, an effective pressure system for producing compressive forces within a stack of electrochemical cells must continuously induce pressure on the cells during charge/discharge cycling. Ideally, it would be desirable that the compressive forces developed within the cell stack remain at a constant level during cell cycling. It is understood, however, that the force required to compress a spring mechanism increases as a function of increasing strain. Notwithstanding this physical precept, the rate at which the strain of a spring mechanism increases in response to increasing force can be altered.

By way of example, lengthening a spring results in reducing the relative strain induced in the spring. In a configuration in which it is desirable to employ foam spring elements and inserts within a cell stack or within individual cells, increasing the relative size of the foam spring elements has the adverse effect of increasing the overall length or size of the cell stack which, in turn, increases the volume of the module or system within which the cell stack is situated.

A pressure system which employs a strap or band surrounding the electrochemical cell stack, however, may incorporate a relatively long spring mechanism within the strap or band which advantageously reduces the relative deflection of the spring. In the embodiment illustrated in FIG. 24, a metal strap 194 includes a wave-like spring 198 which, when placed in tension, causes the thrust plates 194 to exert compressive forces on the cell stack 192. In accordance with this configuration, the mechanism that generates compressive forces within the cell stack 192 is situated outside, rather than within, the cell stack 192. The length of the wave-like spring portion 198 of the strap 194 may be greater than, less than, or equivalent to the length of the cell stack 192.

Figure 24:
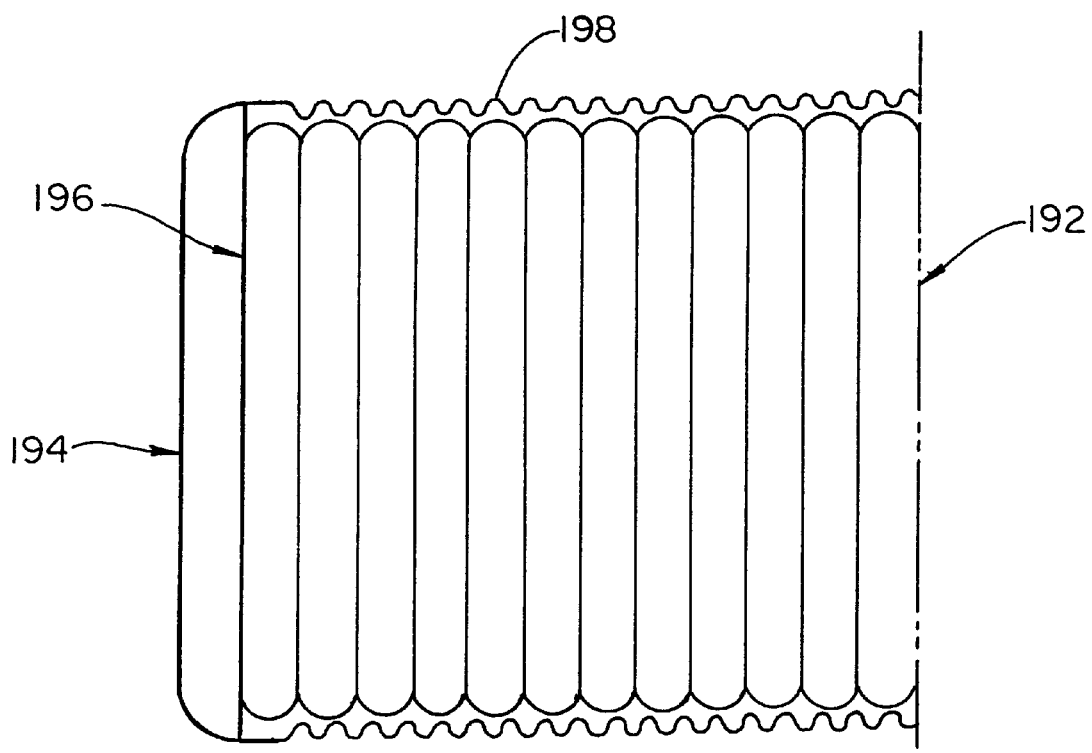
FIG. 24 is a cross-sectional illustration of an embodiment of a pressure generating apparatus including an elongated spring for maintaining a stack of electrochemical cells in a state of compression.

The relatively long spring length of the strap apparatus illustrated in FIG. 24 results in a significant reduction in the relative deflection of the spring. Accordingly, the relative strain of the spring 198 is reduced, as is the undesirable pressure buildup in the spring mechanism as the cell stack expands in size while charging. It is understood that the tension spring apparatus illustrated in FIG. 24 may be implemented using a number of coil springs or using elastomeric material, and that a combination of metallic and elastomeric spring materials may also be advantageously employed. Further, it will be appreciated that foam or other spring elements may be incorporated within the cell stack and/or within individual cells in combination with a tension spring apparatus external to the cell stack.

Figure 25:
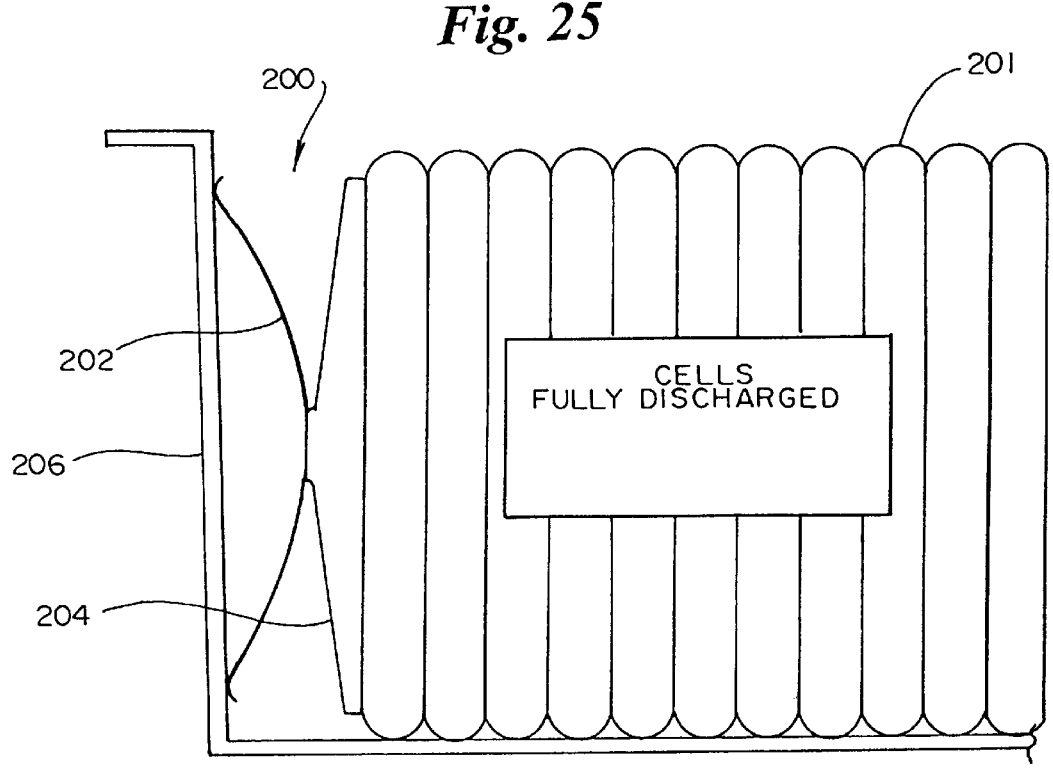
FIGS. 25–26 is a cross-sectional illustration of another embodiment of a pressure generating apparatus for maintaining a stack of electrochemical cells in a state of compression.
Figure 26:
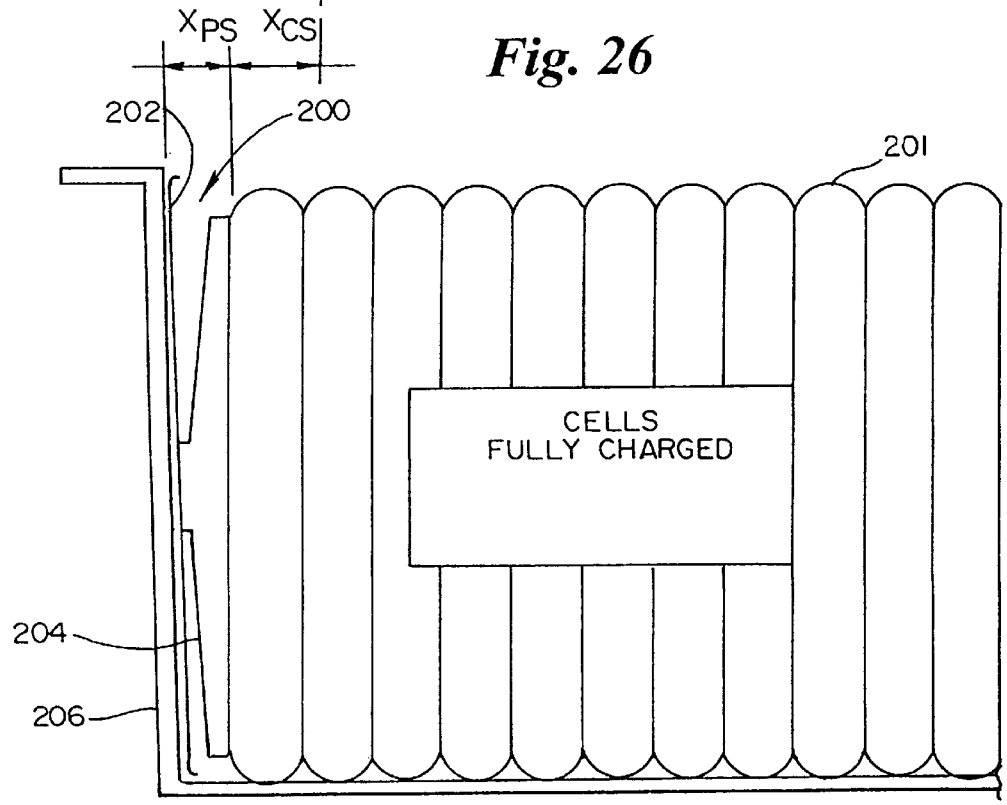

In some applications, the effects or presence of cell displacement during cell cycling may be tolerated. In such cases, a simplified pressure system having fewer or less complex spring mechanisms would appear to be advantageous from an assembly, cost, and reliability perspective. In FIGS. 25–26, there is illustrated an embodiment of a pressure system that includes a leaf spring mechanism 200 which provides the requisite level of compressive force on an electrochemical cell stack 201. The leaf spring mechanism 200 includes a thrust plate 204 adjacent an end cell of the cell stack 201 and a spring element 202 in contact with the thrust plate 204. The ends of the spring element 202 abut a wall 206 of a containment vessel such that the leaf spring mechanism 200 is situated between the containment vessel wall 206 and the cell stack 201.

In one embodiment, the thrust plate 204 includes a contact plate having a surface area of approximately 130 mm×130 mm, which is approximately the surface area of the large side surface of the cells of the cell stack 201 shown in FIGS. 25–26. The illustration of FIG. 25 depicts the cell stack 201 in a fully discharged state, with the leaf spring mechanism 200 exerting approximately 65 psi of pressure over an active surface area of approximately 26.2 in$^2$. It is noted that the cell stack 201 as illustrated includes 64 individual electrochemical cells, such as that shown in FIG. 3A, and that the cell stack 201 is subject to overall displacement of approximately 18 to 20 mm during cell cycling. This displacement may be reduced by approximately 50% by deploying a leaf spring mechanism 200 at each end of the cell stack 201.

The depiction of FIG. 26 shows the electrochemical cell stack 201 in a fully charged state which, while charging, causes the spring element 202 to collapse into the containment vessel wall 206. In this configuration, the leaf spring mechanism 200 exerts approximately 85 psi of pressure on the cell stack 201. It is noted that the spring element 202 of the leaf spring mechanism 200 may include a single spring, multiple nested springs, or a braided spring, for example. Further, the thrust plate 204 need not be a solid member, but may include a number of perforations to reduce the mass of the thrust plate 204. Further, an elastic band or metal wave-type spring may be incorporated so as to encompass the cell stack 201 and the thrust plate 204.

Figure 27A:
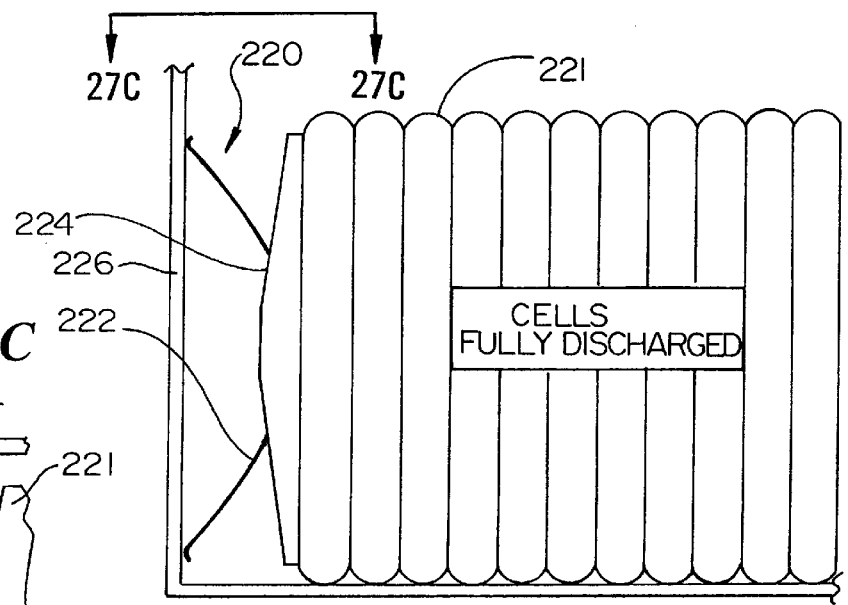
FIGS. 27A–27C illustrate in cross-section yet another embodiment of a pressure generating apparatus for maintaining a stack of electrochemical cells in a state of compression.
Figure 27C:
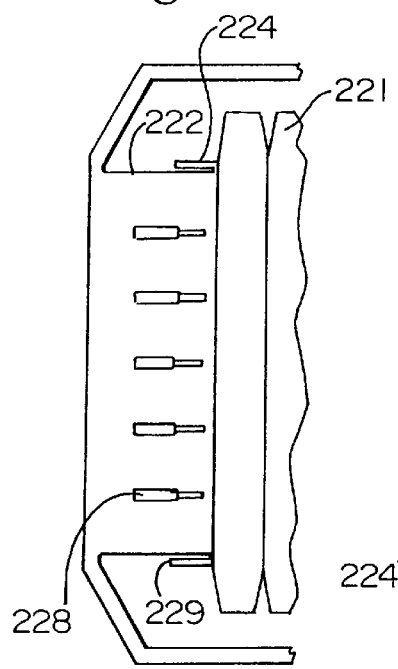
Figure 27B:
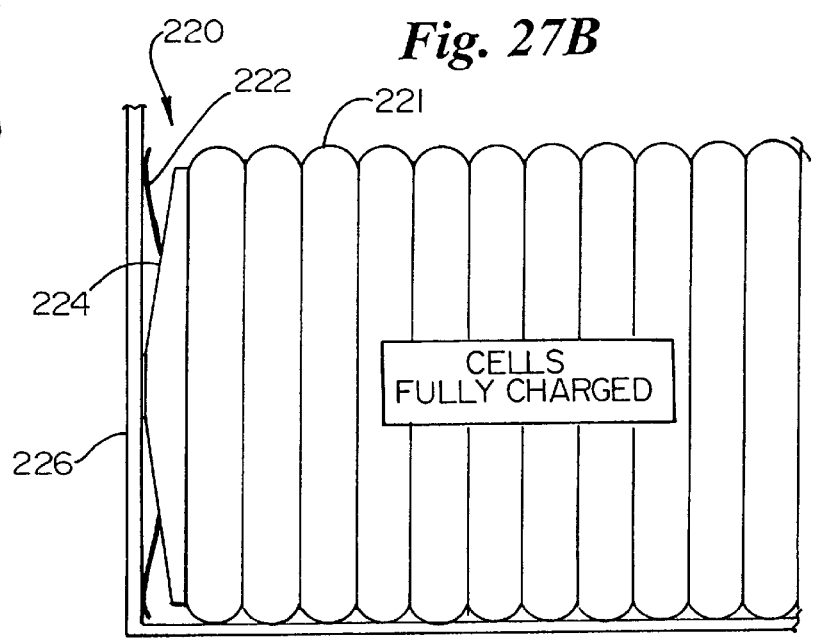

Referring to FIGS. 27A–27C, there is illustrated another embodiment of a pressure system including a leaf spring mechanism 220 which employs a nested spring 222. The leaf spring mechanism 220 further includes a thrust plate 224 which, as is best shown in FIG. 27C, includes a number of ribs 229, wherein a channel is defined between adjacently disposed ribs 229. The nested spring 222 is formed to include a number of slots 228, each of which is associated with one of the ribs 229 provided on the thrust plate 224.

The nested leaf spring mechanism 220 generates a continuous force which is exerted on the electrochemical cell stack 221 during cell charge/discharge cycling. Volumetric changes in the cell stack 221 are accommodated by slidable engagement between the slotted nested spring 222 and the ribbed and/or channeled surfaces of the thrust plate 224. It is appreciated that this slot and rib arrangement provides for reliable slidable engagement between the nested spring 222 and the thrust plate 224 in response to positional shifting of the cells constituting the electrochemical cell stack 221.

Figure 27D:
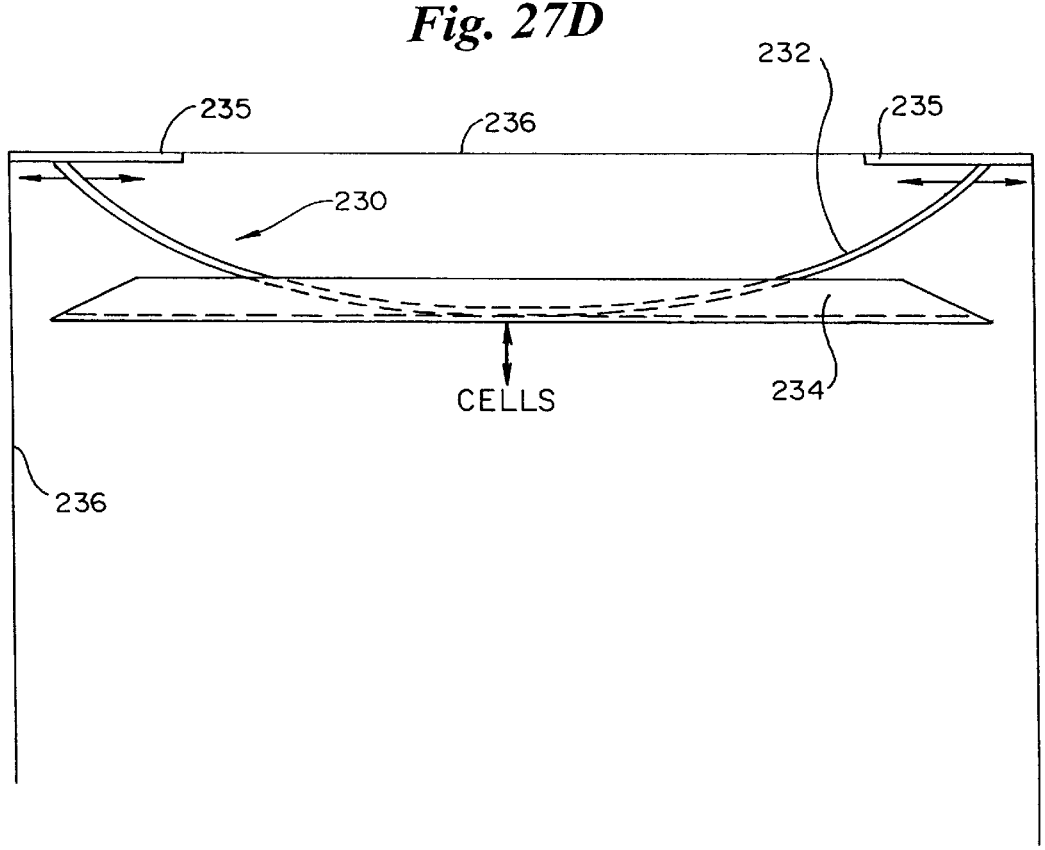
FIGS. 27D–27F are illustrations of other pressure generating apparatuses for maintaining a grouping of electrochemical cells in a state of compression.

In FIG. 27D, there is illustrated another embodiment of a leaf spring mechanism 230 which produces a continuous compressive force on a grouping of electrochemical cells. In accordance with this embodiment, a leaf spring 232 engages a thrust plate 234 and a pair of slidable pads 235 adjacent opposing ends of the leaf spring 232. The slidable pads 235 are attached to the opposing ends of the leaf spring 232 and are free to move along a surface of a shell or housing 236. Alternatively, the pads 235 may be permanently affixed to the housing wall 236, and the opposing ends of the leaf spring 232 may be formed to include a curl to facilitate sliding of the lead spring ends across the surface of the affixed pads 235. In these configurations, the leaf spring mechanism 230 generates the requisite compressive forces on the cell stack without the use of elastic or spring-type straps. It is, however, understood that elastic or otherwise resilient straps may be employed in combination with the leaf spring mechanism 230 shown in FIG. 27D.

Figure 27E:
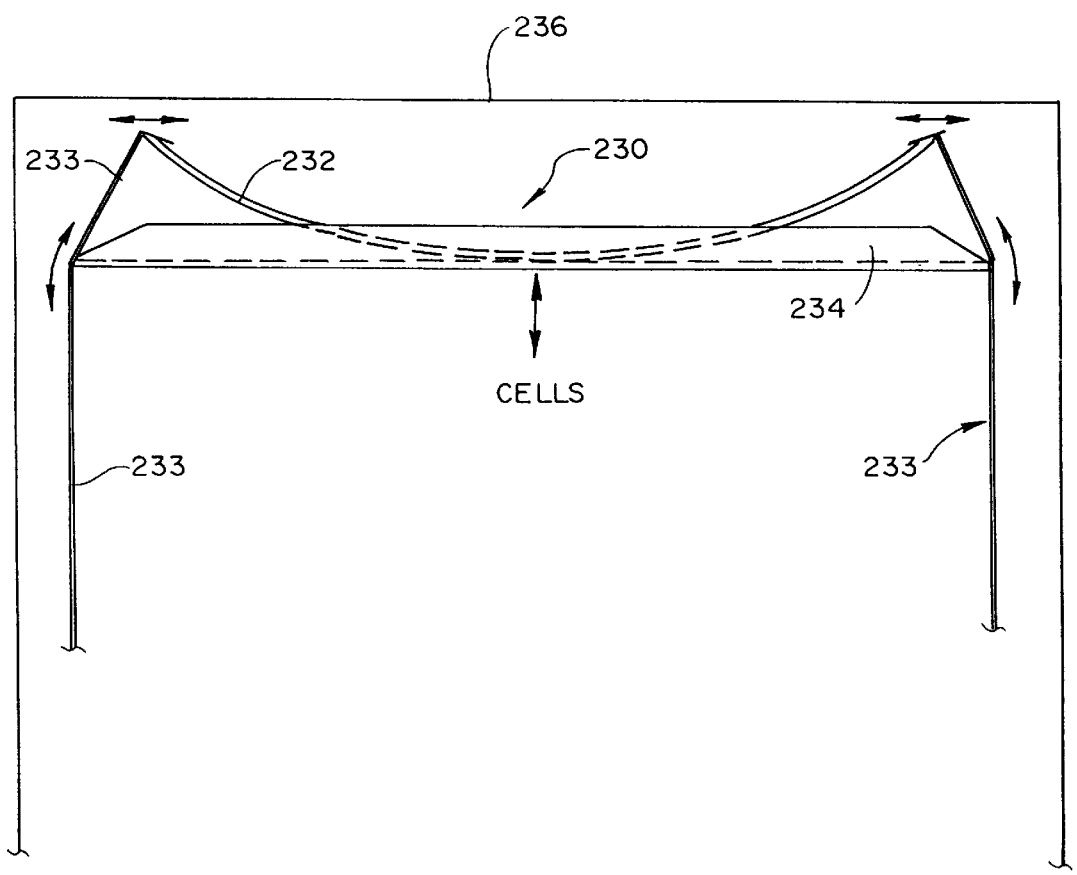

In the embodiment of the leaf spring mechanism 230 shown in FIG. 27E, a pair of straps 233 extend from opposing ends of a leaf spring 232 and encompass a thrust plate 234 and a stack of electrochemical cells. In this configuration, the opposing ends of the leaf spring 232 need not contact a surface of the shell or housing 236. The leaf spring 232 places the straps 233 in tension, which causes the pair of opposing thrust plates 234 to exert compressive forces on the cell stack. The curvature or bowing of the leaf spring 232 changes in response to volumetric changes within the cell stack, resulting in a concomitant alteration in spring force produced by the leaf spring 232.

Figure 27F:
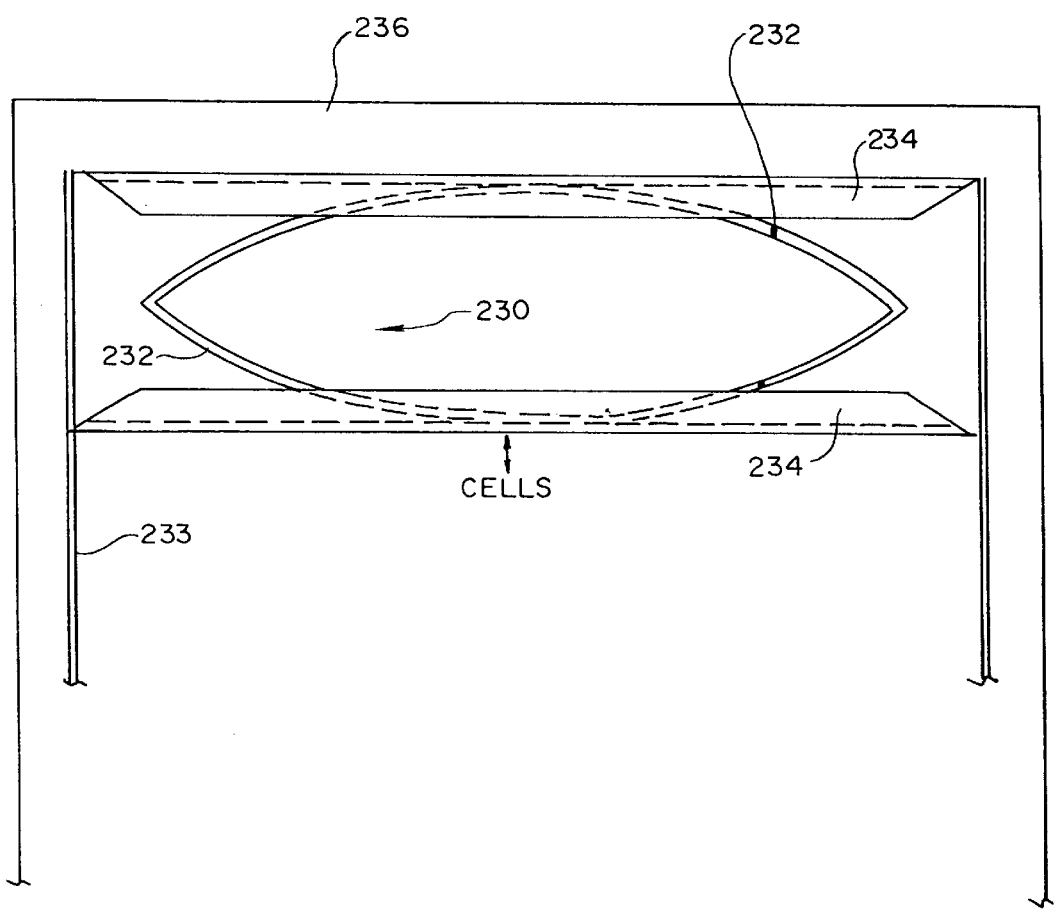

In FIG. 27F, there is illustrated an embodiment of a dual leaf spring mechanism 230 which is typically disposed on one or both ends of a cell stack, but may additionally or alternatively be disposed within the stack of electrochemical cells. In accordance with this embodiment, the opposing ends of two leaf springs 232 are coupled together, and the center-point of each leaf spring 232 contacts a respective thrust plate 234. One of the thrust plates 234 contacts the stack of electrochemical cells, while the other thrust plate 234 is connected to a pair of straps 233 which encompass the cell stack. In this configuration, the pair of leaf springs 232 cooperate in tandem to maintain the stack of electrochemical cells in a continuous state of compression. It is understood that the dual leaf spring mechanism 230 may be employed exclusive of the straps 233.

Turning now to FIGS. 27G–27H, there is shown an embodiment of a force-generating apparatus which includes a thrust plate 231 to which a number of Belleville springs or washers are affixed. The Belleville springs 233 may be affixed to the thrust plate 231 by use of an adhesive, such as an epoxy adhesive. The thrust plate 231 may be inserted between a wall structure of a containment vessel and a contact plate which engages the stack of electrochemical cells. One or more Belleville spring-loaded thrust plates 231 may be installed with a contact plate disposed on either side of the thrust plate 231 at various locations within the cell stack.

Figure 27J:
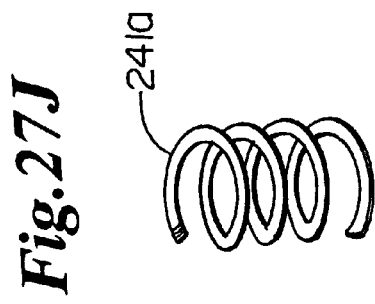
FIGS. 27I–27K illustrate an embodiment of a pressure generating apparatus which employs a number of wave springs or coil springs.
Figure 27K:
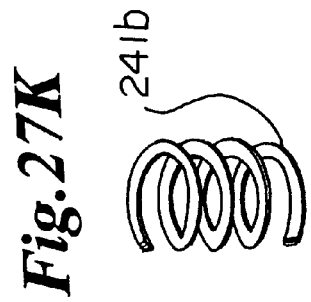
Figure 27I:
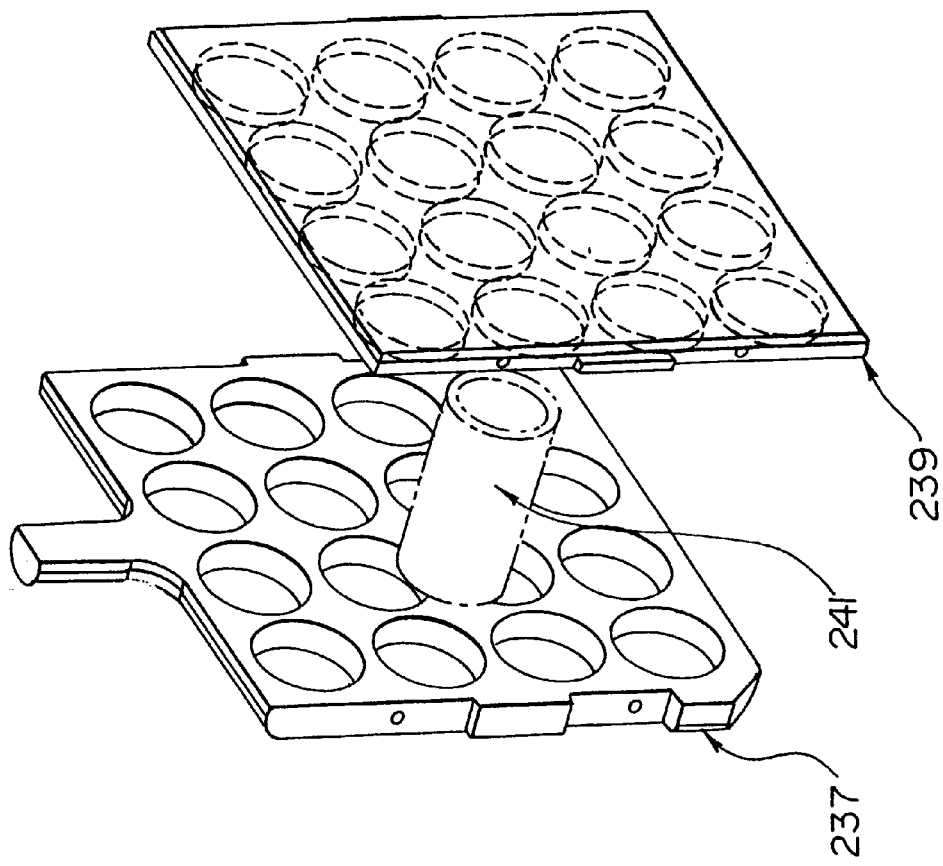

In the embodiment illustrated in FIGS. 27I–27K, a number of helical or coil springs 241 may be installed on a thrust plate 237. Various types of springs 241 may be employed, including a wave spring 241a, which is shown in FIG. 27J and typically fabricated from steel ribbon, and a coil spring 241b, which is shown in FIG. 27K and typically fabricated from steel wire. A contact plate 239 engages a stack of thin-film cells on a first surface, and also engages the spring-loaded thrust plate 237 on an opposing second surface. Continuous compressive forces are generated by cooperative operation between the individual springs 241 and the thrust plate 237/contact plate 239 in the presence of positional shifting of the cell stack.

Figure 27L:
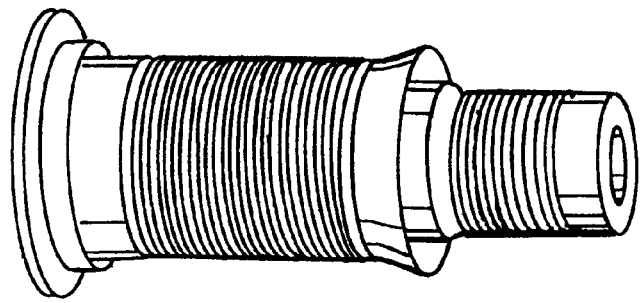
FIGS. 27L–27M illustrate various types of bellow mechanisms which may be employed in a pressure generating apparatus for maintaining electrochemical cells in a state of compression.
Figure 27M:
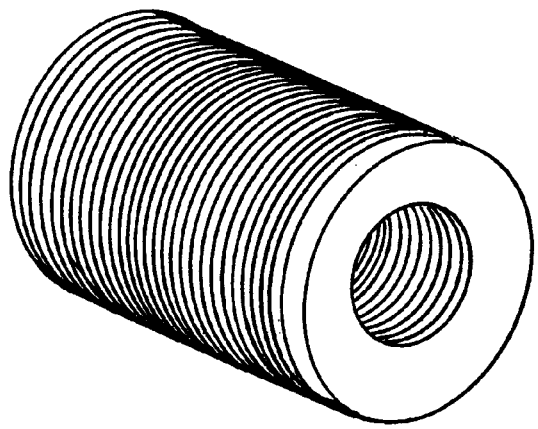
Figure 27N:
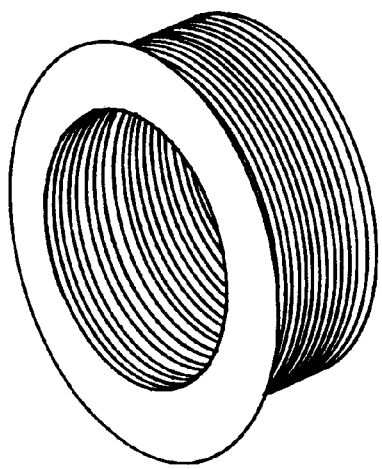
FIGS. 27G–27H illustrate an embodiment of a pressure generating apparatus which employs a number of Belleville springs.

FIGS. 27L–27N illustrate various embodiments of a bellows-type mechanism which may be employed to produce continuous and constant compressive forces for maintaining a stack of electrochemical cells in a state of compression. The bellows shown in FIGS. 27L–27N are typically filled with a gas or a liquid that changes phase in response to variations in pressure and/or temperature. A liquid-type bellows mechanism generates a force when the fluid contained within the bellows changes from a liquid phase to a gas phase. This type of bellows mechanism may be employed to generate a relatively constant pressure on the stack of cells over the entire range of cell volume variation during charge/discharge cycling. The fluid inside the bellows condenses and evaporates as the bellows is compressed and relaxed, respectively.

In accordance with another embodiment, the stack of electrochemical cells contained within a sealed shell or housing may be placed in a state of compression by pressurizing the housing. The housing, or one or more sealed chambers within the housing, may be pressurized with an inert gas, such as nitrogen or argon, for the purpose of placing the cells in compression. The pressure of the gas-filled housing may be held constant or varied during cell cycling.

In accordance with another embodiment of the present invention, and as discussed previously, a thermal conductor is employed as an enhancement to an in-situ thermal management apparatus for moderating thermal energy within an energy storing device containing high-energy prismatic electrochemical cells. A thermal conductor or bus constructed in accordance with the principles of the present invention advantageously provides for the effective transfer of thermal and electrical energy to and from a grouping of thin-film electrochemical cells which are subject to cyclical volumetric variations over time or positional shifting during use. It can be appreciated that providing continuous contact between a resilient thermal conductor and an adjacently disposed thermally conductive surface or material is imperative to achieving good thermal conductance between the electrochemical cell and an external thermal management system.

Figure 28:
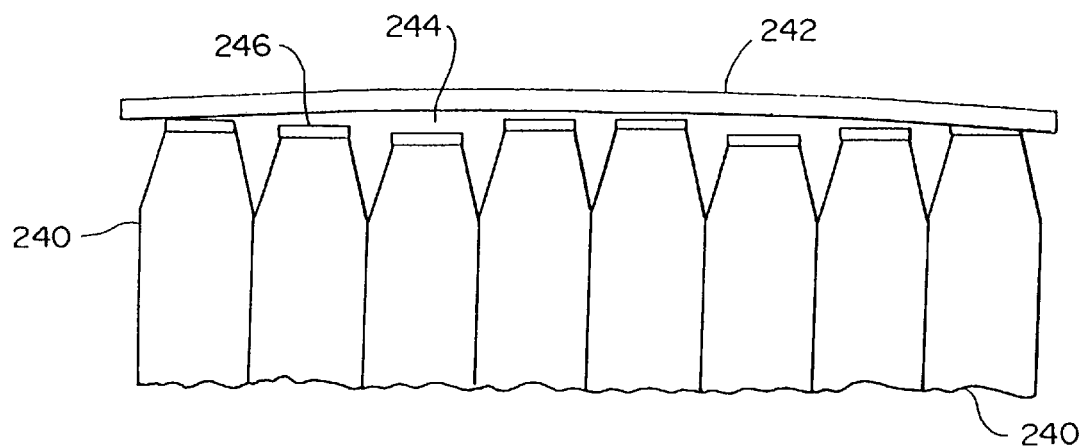
FIG. 28 is a top view illustration of a grouping of electrochemical cells aligned such that the cell contacts are situated adjacent a wall of a containment vessel, a number of gaps being developed between some of the cell contacts and the wall due to variations in cell length and wall warpage.
Figure 29:
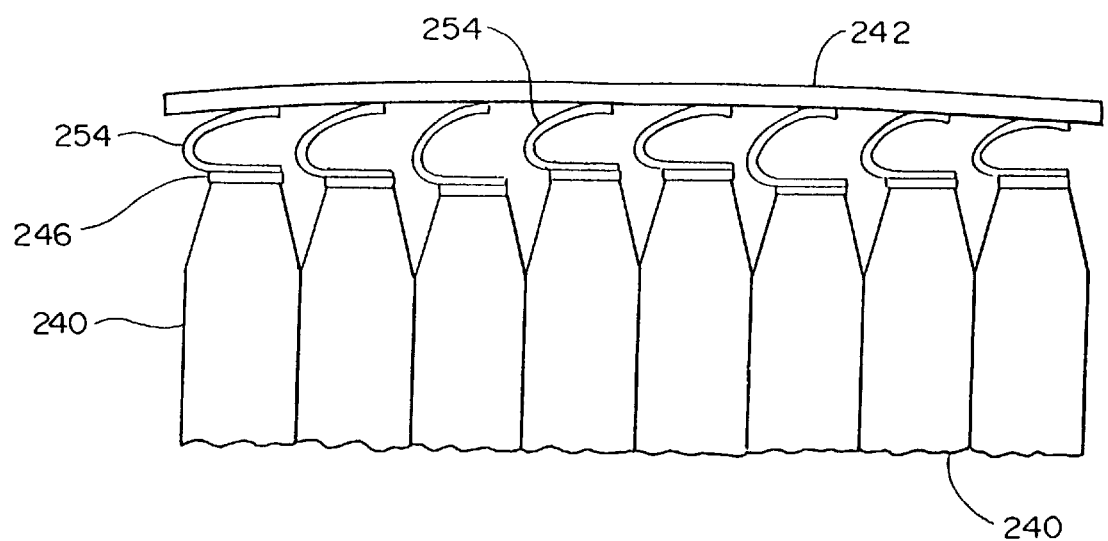

As is illustrated in the embodiments of FIGS. 28–29, an electrochemical cell is provided with a thermal conductor, such as a C-shaped conductor 254 shown in FIG. 29, which is spot welded or otherwise attached to the cell 240 at one or both of the anode and cathode contacts 246. A thermal conductor 254 is typically disposed along the length of the contact 246, and typically includes an electrical connection lead which provides for external electrical connectivity with the cell 240. In general, electrical current is conducted along the length of the contact 246 and through a connection lead, an embodiment of which is shown in FIG. 3C. In addition, the thermal conductor 254 includes a resilient portion which provides a thermal flux path for transferring thermal energy between the cell 240 and a thermally conductive material or structure disposed adjacent the cell 240.

In FIGS. 28–29, there is depicted an aggregation of electrochemical cells 240 which typically vary in dimension depending on allowable manufacturing and assembly tolerances. Because of such variations and warpage that typically develops along a wall 242 of a containment vessel, or other imperfections inherent or induced in the wall 242, a number of gaps 244 will typically develop between the vessel wall 242 and a number of the electrochemical cells 240. It can be appreciated that thermal conductance is severely reduced upon the occurrence of a gap 244 forming between a cell contact 246 and a wall structure 242, as is illustrated in FIG. 28. Although a compliant thermal compound may improve thermal conductance in the presence of small gaps 244, such compounds are generally ineffective for maintaining thermal conductance across large gaps 244.

A thermal conductor 254 in accordance with one embodiment of the present invention includes a resilient portion which exhibits a spring-like character. The resilient portion of the thermal conductor 254 advantageously provides for continuous contact between the cell 240 and a stationary structure 242, such as a metallic wall surface, disposed adjacent the cell 240 in the presence of relative movement between the cell 240 and the wall structure 242. The spring-like character of the thermal conductor 254 permits the conductor 254 to expand and contract in response to changes in a separation distance between the cell 240 and vessel wall structure 242 and to preclude gaps from forming between the cell 240 and wall structure 242. It is noted that the thermal conductor 254 or other thermal conductor that effects the transfer of heat between the cell 240 and a thermally conductive structure or material 242 adjacent the cell 240 may be utilized along only one or both of the anode and cathode contacts 246.

In general, the thermal conductor 254 is formed to provide a relatively high degree of dimensional take-up in order to accommodate assembly tolerances when installing the electrochemical cells 240 between substantially stationary support structures 242 of a containment vessel. The thermal conductor 254 also exhibits a relatively high degree of spring-back to accommodate possible wall deflections and variations in the separation distance between the cells 240 and a wall structure 242 over time.

A thermal conductor that provides the above-described thermal, electrical, and mechanical advantages should be fabricated from a material which has a relatively high thermal and electrical conductivity. The material should have good surface characteristics for establishing contacts with both a separate planar support surface and an integral metallization layer formed on the anode or cathode contacts of the electrochemical cell. Further, the material used to fabricate the spring contacts of the thermal conductor should have a relatively low force of compression so as to avoid damaging the edges of the cell or the surface of the wall structures adjacent the cell. Also, the thermal conductor contacts should be configured to minimize the length of the thermal flux path, yet maximize the cross-sectional area in order to optimize the heat transfer characteristics of the thermal conductor contacts.

A suitable material for use in the fabrication of a thermal conductor having the above-described characteristics is pure copper, although other metals and alloys may be employed. It is understood that the thermal conductor described herein may be considered a two-part conductor apparatus constituted by a metallization layer disposed on the anode or cathode contact in combination with the spring portion of the conductor. Alternatively, the thermal conductor may be viewed as a single spring conductor that facilitates the conduction of both thermal and electrical energy to and from the electrochemical cell. In yet another embodiment of a thermal conductor, and as best shown in FIG. 4, the thermal conductor comprises a number of laterally offset anode and cathode film layers 73, 75 and the anode and cathode contacts 72, 74. In this embodiment, one or both of the anode and cathode contacts 72, 74 may directly engage the thermally conductive, electrically resistive material disposed on the wall of a containment vessel. The resilient portion of the thermal conductor constitutes the laterally offset anode and cathode film layer 73, 75 which flex in response to relative movement between the cell and the vessel wall.

In the embodiment shown in FIGS. 30A–30D, a thermal conductor 254 is formed to include a substantially C-shaped portion which exhibits good dimensional take-up and spring-back properties. In FIG. 30A, the thermal conductor 254 is shown in a relaxed state prior to attachment to a contact 252 of an electrochemical cell 250. The relaxed state of the thermal conductor 254 aids in the process of attaching the thermal conductor 254 to the cell 250. After the thermal conductor 254 is attached to the cell contact 252, a wiping procedure is typically performed on the thermal conductor 254 to ensure that the thermal conductor 254 will collapse properly when installed in a compressed state between the walls of a constraining structure.

A pre-installation configuration of the thermal conductor 254 is shown in FIG. 30B. In FIG. 30C, the thermal conductor 254 is shown in a compressed state which would typically arise when the cell 250 is installed between the walls of a constraining structure. The take-up range, $R_T$, represents the total distance in which the thermal conductor 254 may be compressed without significantly reducing its spring-back properties. FIG. 30D illustrates the spring-back property of the thermal conductor 254 that would be implicated in response to relative movement between the cell 250 and the walls of a constraining structure abutting the thermal conductor 254. The magnitude of the spring-back displacement in this illustrative example is depicted as the dimension $R_S$.

The thermal conductor 254 shown in FIGS. 30A–30D provides for spring-back in the range of approximately 1–3 mm, which is sufficiently large to compensate for relative movement of approximately 1–3 mm between the electrochemical cell and an adjacent wall structure. It is noted that a thermal conductor having a substantially C-shaped cross-section and a nominal height value of approximately 3 mm varies in thermal conductance as a function of height variation resulting from changes in area of contact between the thermal conductor and the adjacent wall.

For example, it has been demonstrated that a height variation of +/−0.5 mm results in a corresponding conductance change ranging between 450–575 W/m$^2$C. The conductance of a non-compressed thermal conductor having a nominal height of 3 mm, without introduction of a thermally conductive compound, is approximately 200 W/m$^2$C. Introducing a compliant thermal compound may improve the conductance characteristics of the thermal conductor during compression and extension of the conductor.

Figure 31A:
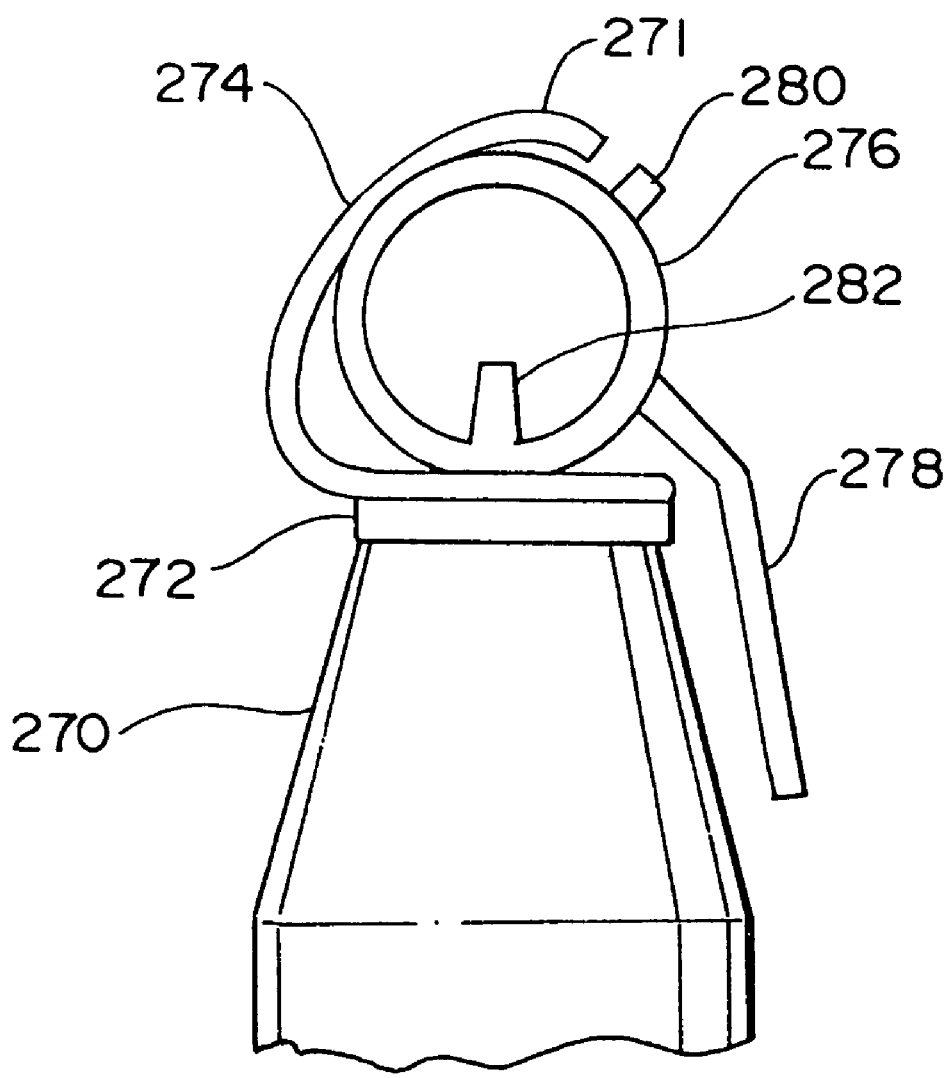
FIG. 31A is an illustration of a spring insulator captured within a thermal conductor that enhances the spring-like properties of the thermal conductor.

Concerning FIGS. 31A and 32, there is illustrated another embodiment of a thermal conductor having a substantially C-shaped cross-section and including an elastomeric spring element retained within the thermal conductor. The elastomeric spring element generally improves the spring-back characteristics of the thermal conductor, and may be fabricated using stock materials, such as cylindrical elastomeric tubing. An elastomeric spring element, such as the spring element 277 shown in FIG. 32, may be simple in configuration. Alternatively, a more complex spring element may be fashioned from elastomeric material, such as the spring element 276 shown in FIG. 31A. The thermal conductor 274 includes a hooked-tip 271 which retains the elastomeric spring element 276/277 within the thermal conductor structure.

The elastomeric spring 276 may include an insulating protrusion 278 and an insulating stub 280 which provides electrical isolation for the thermal conductor 274 and contact 272 with respect to the conductors and contacts of adjacent cells 270. Additionally, a stop 282 may be included to prevent over-collapsing or possible crushing of the thermal conductor 274. FIG. 32 illustrates the dynamic insulating capability of the elastomeric spring 276 when transitioning between uncompressed and compressed states.

In this embodiment, the thermal conductor 274 has a height, $H_1$, of approximately 4 mm at an initial compressed state. Under moderate compression, the thermal conductor 274 has a height, $H_2$, of approximately 3 mm. When the thermal conductor 274 is at a fully compressed state such that the stop 282 contacts the inner surface of the upper portion of the spring 276, the conductor 274 has a height of approximately 2 mm. The spring elements 276/277 each have a diameter, $D_1$, of approximately 3.8 mm.

It is understood that a thermal conductor which exhibits the mechanical, thermal, and electrical characteristics described herein may be formed to include spring-like portions having configurations that differ from those illustrated in the figures. By way of example, a thermal conductor may be formed to include a spring mechanism having a substantially C-shaped, double C-shaped, Z-shaped, O-shaped, S-shaped, V-shaped, or finger-shaped cross-section, which permits the thermal conductor to expand and collapse to accommodate dimensional variations and positional shifting between the cell and the walls of a structure constraining the cell.

Figure 31B:
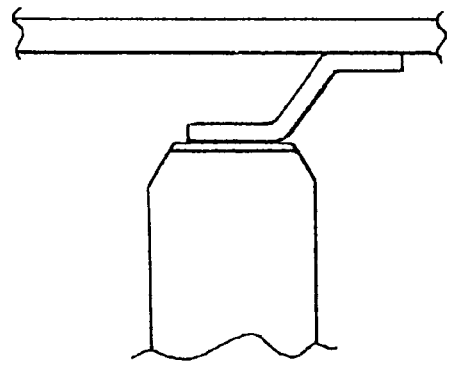
FIGS. 31B–31D illustrate other embodiments of a thermal conductor having varying configurations.
Figure 31C:
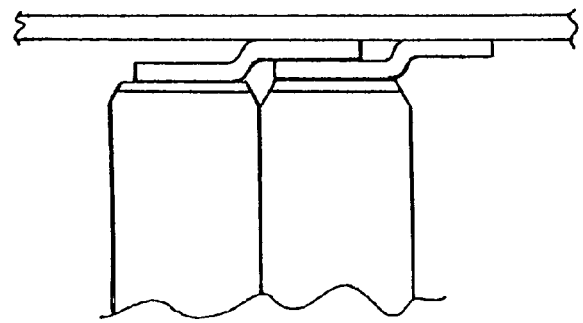
Figure 31D:
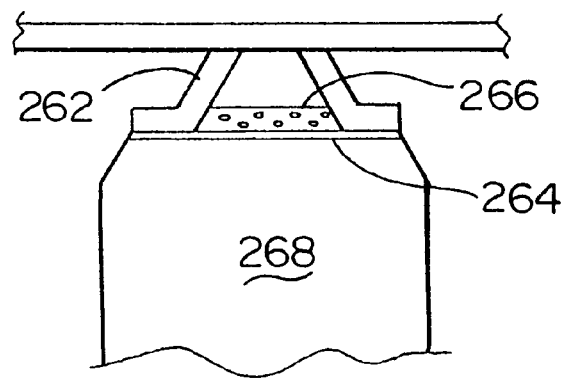

For example, an S-shaped thermal conductor, such as that shown in FIG. 31B, may be further modified as shown in FIG. 31C. The stacked S-shaped thermal conductor configuration shown in FIG. 31C advantageously increases the number of thermal conduction paths between the cell and an adjacent heat sink. FIG. 31D illustrates another embodiment of a thermal conductor which includes two finger-shaped or bent L-shaped resilient conductors 262 affixed to the sprayed metal contact 264 of the cell 268. An elastomeric element 266 is situated between the collapsible finger-shaped conductors 262 to prevent over-collapsing of the conductors 262.

Figure 31E:
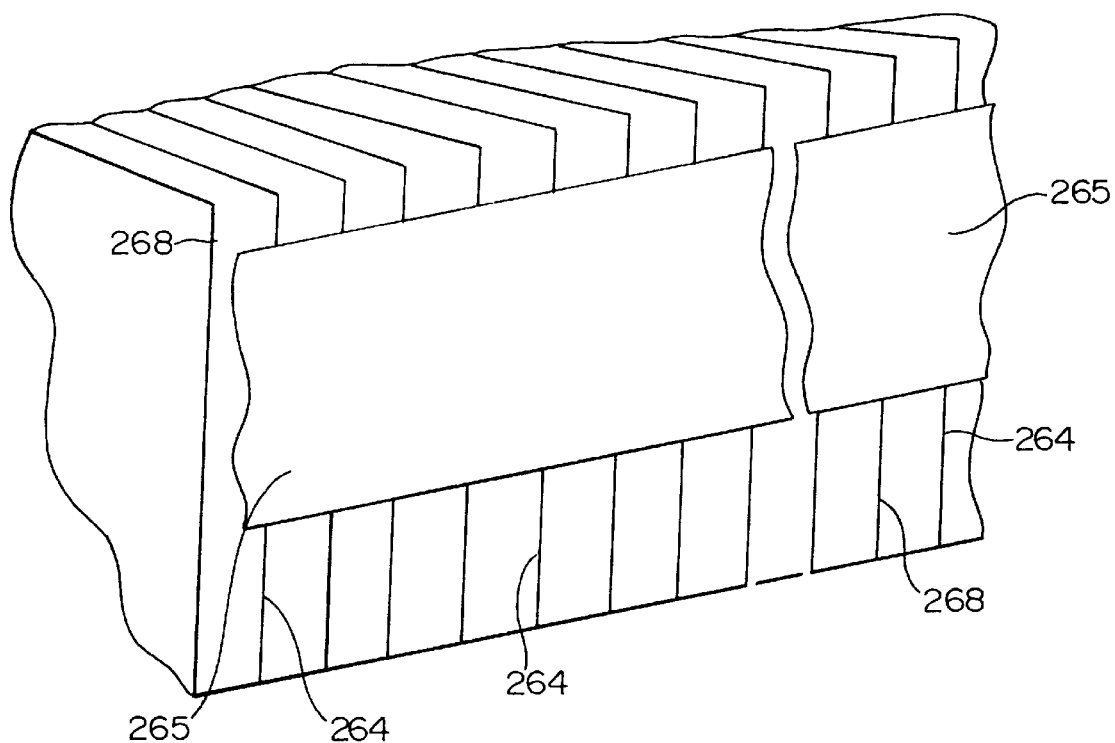
FIG. 31E is an illustration of a thermal conductor that spans across a number of electrochemical cell contacts.

FIG. 31E illustrates another embodiment of a thermal conductor which may be applied to a number of electrochemical cells 268. The thermal conductor 265 is configured as a flat sheet of metallic or other electrically conductive material. In this embodiment, the thermal conductor 265 spans across the anode and/or cathode current collecting contacts 264 of a number of cells 268. It can be seen that the thermal conductor 265 connects a number of the cells 268 in parallel, such as eight cells 268 that form a cell pack for example. Current is conducted along the thermal conductor 265 and transferred into and out of the parallel connected cells via an electrical contact or lead (not shown) attached to the thermal conductor 265. Heat is transferred through the thermal conductor 265 and to a heat sink, such as the wall of a metallic enclosure, disposed adjacent the thermal conductor 265. A thin sheet of plastic or mica, for example, may be situated between the thermal conductor 265 and the heat sink. Alternatively, the heat sink may be treated to include an anodized surface or other electrically resistive, thermally conductive material.

Figure 33:
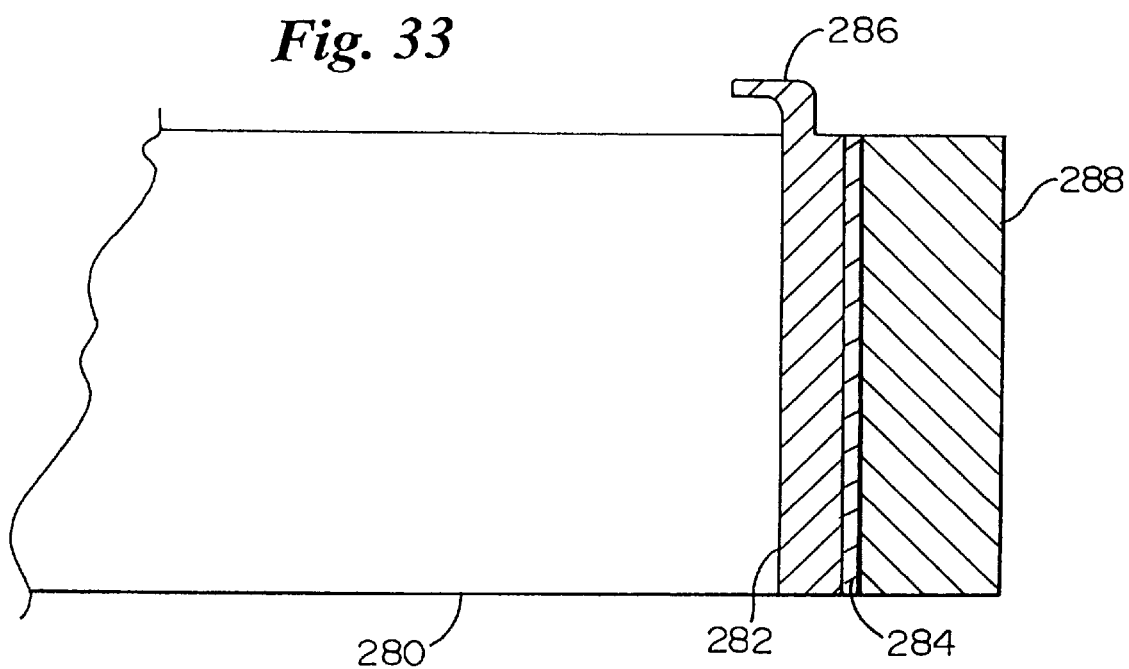
FIG. 33 is a cross-sectional view of an electrochemical cell having a thermal conductor disposed adjacent a planar structure exhibiting good thermal conductance and poor electrical conductivity characteristics.

In FIG. 33, there is shown a side cross-sectional view of an electrochemical cell 280 including a thermal conductor 282 situated adjacent a wall 288 of a containment vessel having a coating or film of thermally conductive, electrically resistive material 284. In this configuration, the thermal conductor 282 conducts current into and out of the electrochemical cell 280, and includes a lead portion 286 which provides for convenient connectivity to an external energy consuming element and to a charging unit. In general, current is conducted along the relatively low electrical resistivity path defined by the thermal conductor 282 and the lead 286 in preference to the relatively high electrical resistivity path defined by the thermal conductor 282 and the material or film 284 disposed on the wall 288 of the containment vessel. Thermal energy is efficiently transferred between the cell 280 and the wall 288 of the containment vessel coated with a thermally conductive material or film 284 over a thermal flux path established between the thermal conductor 282 and the adjacent wall structure.

In one embodiment, the thermally conductive coating 284 may constitute an anodized aluminum coating developed on the surface of an aluminum casing or other structure 288. The thermally conductive coating 284, which may alternatively constitute a compliant thermal compound or material such as an epoxy material, typically exhibits good electrical resistivity and good thermal conductance characteristics. A thin plastic sheet material, for example, may be disposed between the cell 280 and the wall 288. As such, thermal energy produced by, or introduced into, the cell 280 is efficiently transferred between the thermally conductive material 284, the thermal conductor 282, and the cell 280, while current is conducted preferentially along the metal-sprayed contact of the thermal conductor 282 and lead 286.

In accordance with another embodiment of the present invention, an active heat exchange apparatus may be employed to enhance thermal management of a grouping of high-energy electrochemical cells disposed in an encased power generating system. Thermal energy may be transferred into or out of the stack of cells through use of an external active heat transfer system in combination with a thermal conductor provided on either one or both of the anode and cathode contacts of the cells. Employing an in-situ heat transfer apparatus of the type previously described in combination with an external active heat exchange apparatus is particularly effective in managing the thermal environment within a hermetically sealed power generating system.

Figure 34:
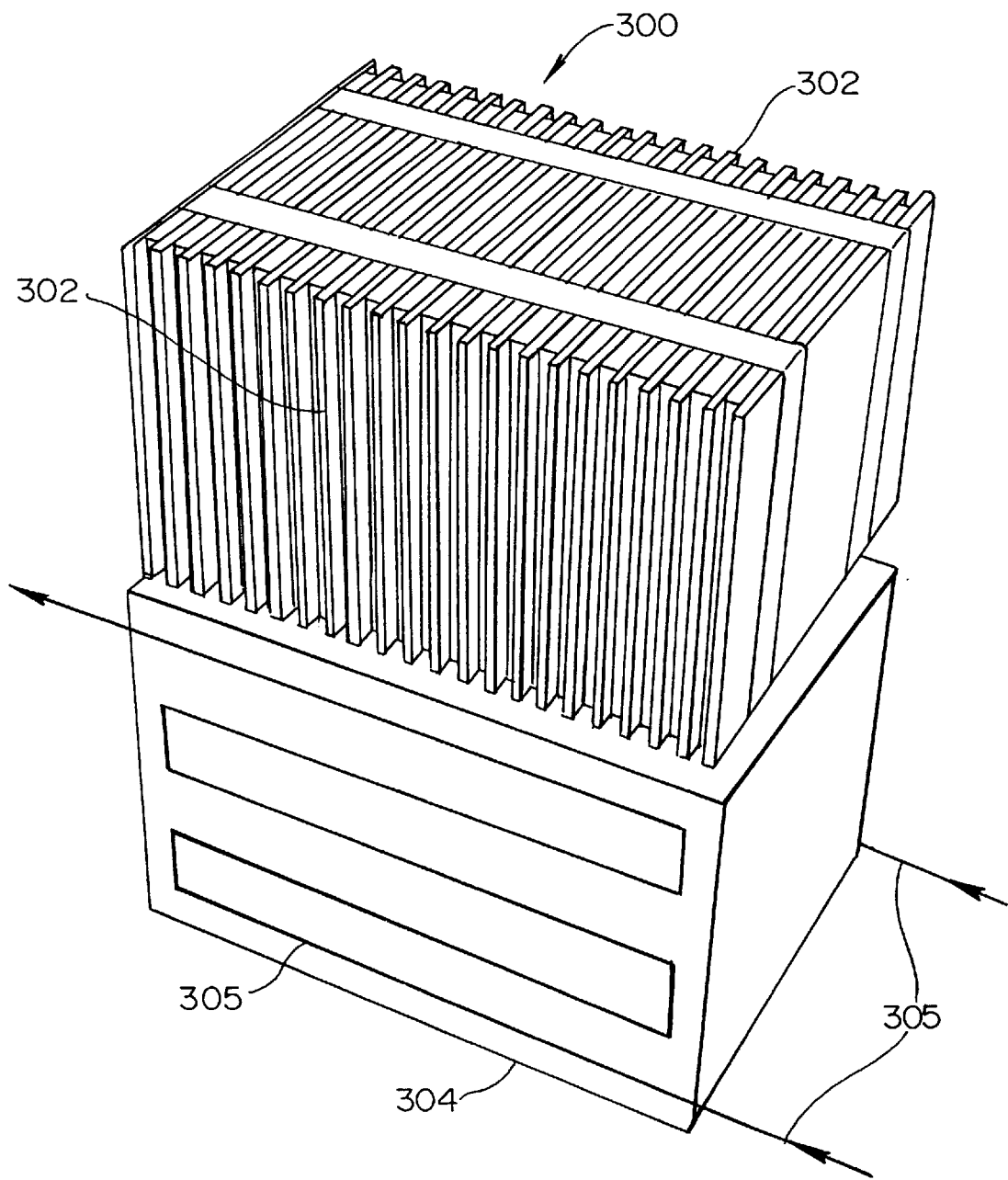
FIG. 34 illustrates a module housing including an active cooling apparatus for facilitating the efficient transfer of heat into and out of a stack of thin-film electrochemical cells encased in the module housing.

The power generating module 300 shown in FIG. 34, for example, includes a stack of thin-film electrochemical cells 302 which may be enclosed within a hermetically sealed containment vessel 304 (vessel cover not shown). The containment vessel 304 is shown as including a serpentine fluid channel 305 through which a heat transfer fluid passes. It has been determined that an external thermal management system of the type shown in FIG. 34 may be employed in combination with thermal conductors constructed in accordance with the principles of the present invention to effectively regulate the internal temperatures of hermetically sealed thin-film energy storing devices, such as a module 300 or grouping of modules 300 constituting a battery.

The thermal management of the electrochemical cells 302 disposed in the module 300 is accomplished by circulating a heat transfer fluid through a 2 mm jacket formed between two inside walls of the module 300. Thermal energy is transferred between the electrochemical cells and the module walls through thermal conductors of the type described hereinabove which are attached to the cells and in thermal contact with the module walls. The rate at which heat is removed from or introduced into the cells is dependent in part on the temperature and flow rate of the heat transfer fluid circulating through the jacket. The average heat transfer coefficient in the jacket is typically on the order of 620 $W/m^2$-K.

Figure 35:
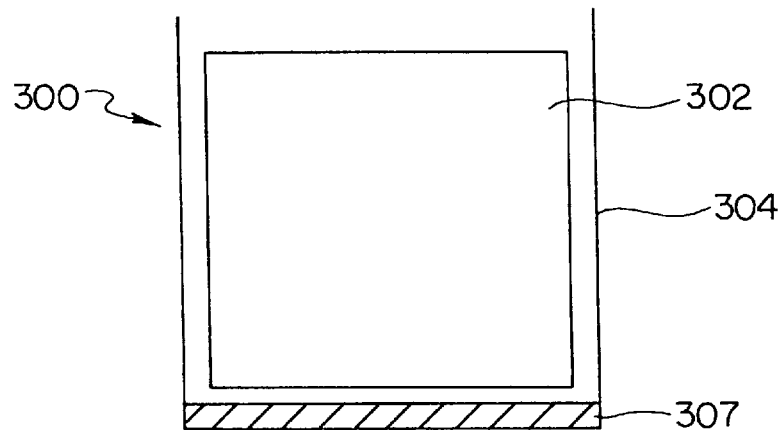
FIGS. 35–36 illustrate two embodiments of an active cooling apparatus including plate heat exchangers.
Figure 36:
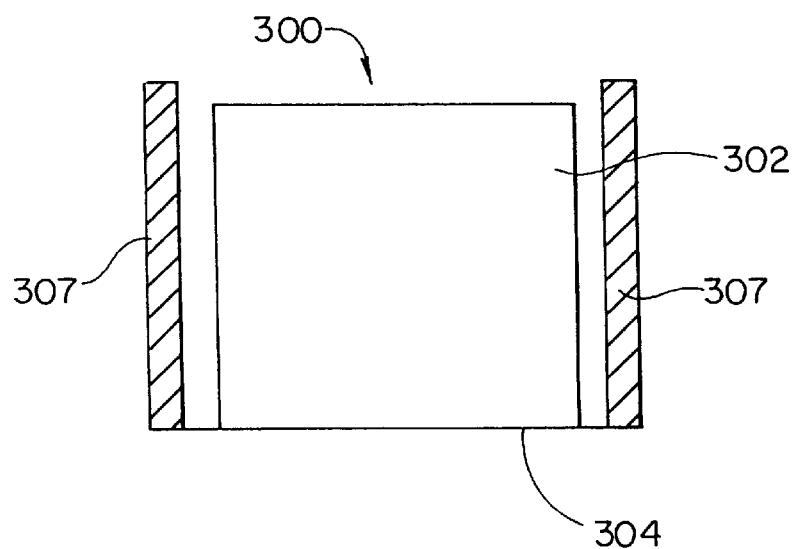

Two embodiments of an external active heat exchange apparatus for use in a power generating module are respectively shown in FIGS. 35–36. It is understood that FIGS. 35–36 illustrate structures of the module which are contained within a sealed enclosure. As is depicted in FIGS. 35–36, one or more external heat exchangers 307 may be integrated as part of the module housing 304 at various locations and at various orientations as is required given the particular configuration of the module 300. In the embodiment illustrated in FIG. 35, a module 300 includes a stack of electrochemical cells 302 encased in a housing 304. The housing 304 includes a heat exchanger 307 configured as a substantially flat plate having a gap through which a heat transfer fluid passes. A plate heat exchanger 307 may be applied to one or more side surfaces of the module 300 and/or to the bottom surface of the module 300 by use of an epoxy bonding material. The length and width of the heat exchanger 307 may be adjusted so that a single plate heat exchanger 307 can be used to provide thermal management for multiple modules constituting a battery.

A heat transfer fluid may be permitted to circulate through heat exchangers 307 integral with the bottom and one or more sides of the module housing 304. The module housing 304 typically includes four horizontally oriented baffles provided in the jacket for each side and bottom of the module housing 304. A nominal fluid flow rate through the module jacket is given as approximately 1 liter per minute, with a nominal pressure drop of approximately 2 psi. The jacket may be placed under a negative pressure of approximately 5 psi. The maximum difference between the inlet fluid temperature and the outlet fluid temperature should deviate by no greater than 8° C. The module housing 304 typically has a nominal heat exchange capacity on the order of 400 watts.

In one embodiment, the heat exchanger 307 is fabricated using a known brazing technique applied to an aluminum sheet to include a 2 mm gap that functions as a fluid channel. The heat exchanger 307 may alternatively be fabricated as a laminated structure which incorporates a cooling fluid channel. The dimensions of the heat exchanger 307 are selected such that the heat exchanger 307 registers with either a bottom or a side surface of the module 300. The module housing 304 may be fabricated from aluminum, and include an anodized surface having a thickness of approximately 1.05 mm which is in thermal contact with one or both of the anode and cathode contacts of the cells.

The heat transfer fluid is typically a mixture of water and ethylene glycol, such as a 50% mixture. Alternatively, a refrigerant coolant may be circulated through the fluid channel. A system that employs a refrigerant coolant instead of a glycol based fluid can typically employ a smaller and lower-weight radiator than a glycol based system.

Each module 300 may be monitored by use of a number of temperature sensors positioned at various locations within the module housing 304 to determine the average temperature of the module 300 at the various locations. This information, as well as fluid flow rate and other pertinent information, may be used by an external pumping/heating system which modifies the temperature and flow rate of the thermal fluid circulated through the module housing 304 in order to maintain the module 300 at an optimal operating temperature.

Figure 37:
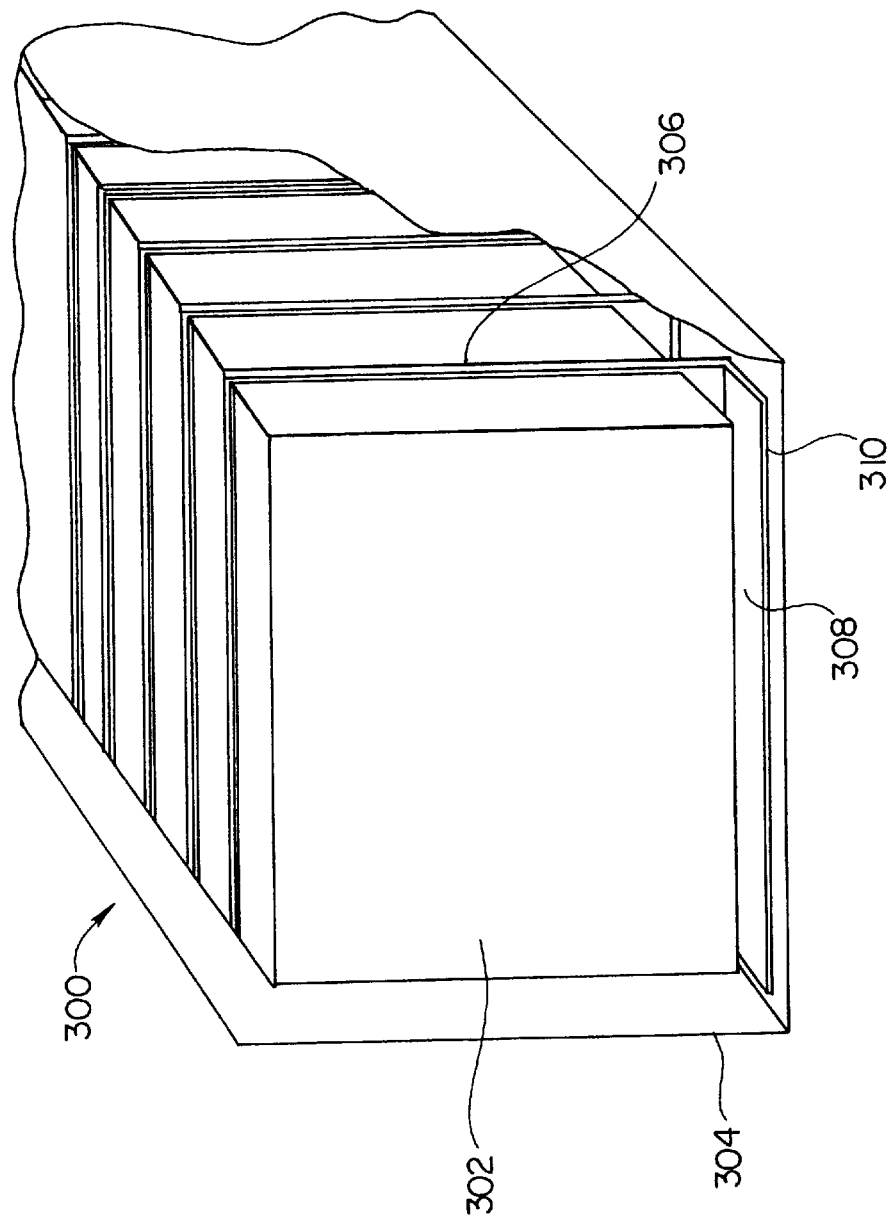
FIGS. 37–38 illustrate another embodiment of a thermal management apparatus which includes thin metal heat conductors disposed within a stack of electrochemical cells.
Figure 38:
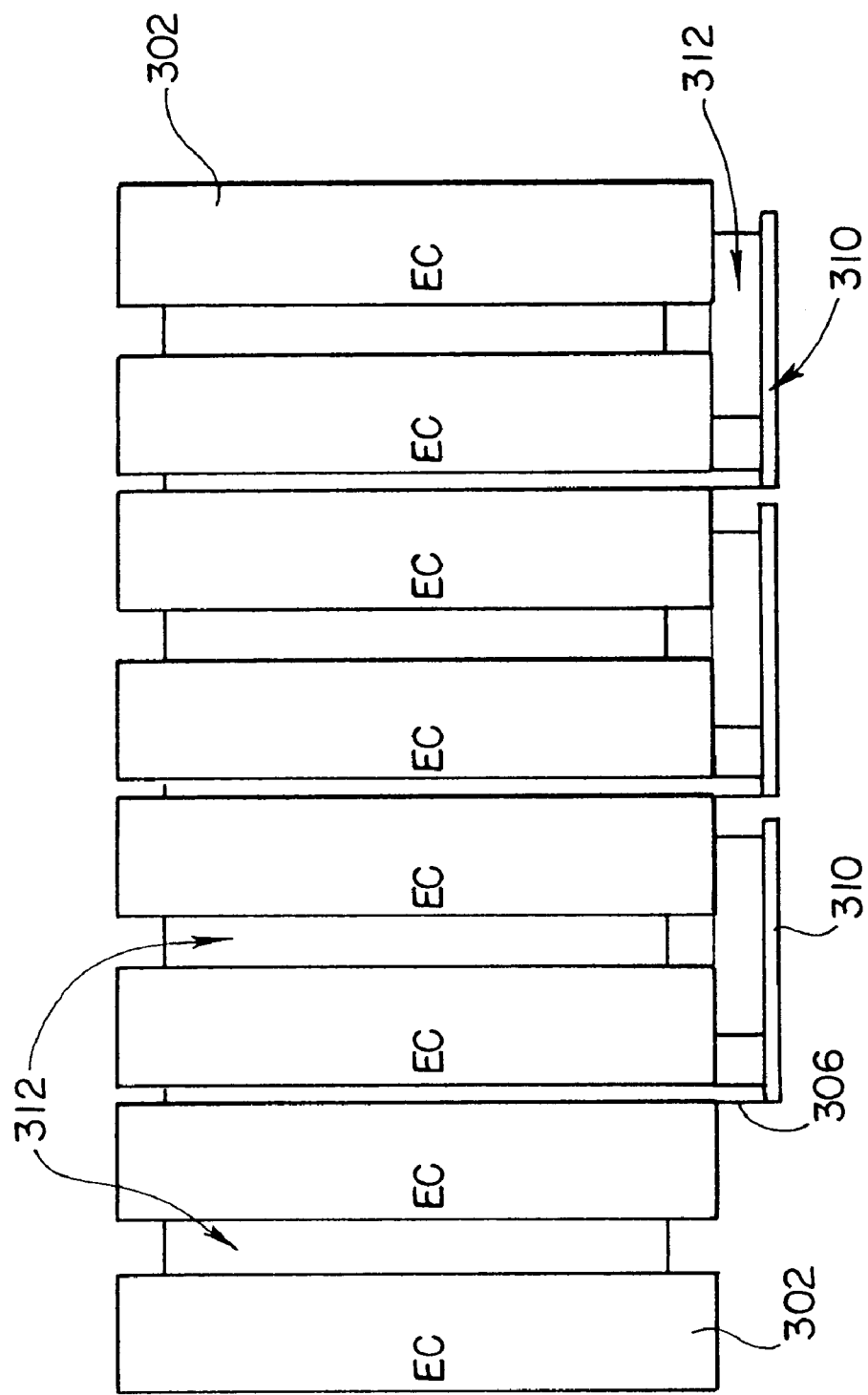

In FIGS. 37–38, there is illustrated an embodiment of a power generating module 300 in which a foil heat conductor 306 is disposed between opposing side surfaces of adjacently situated cells 302. The foil heat conductor 306 is typically fabricated from a sheet of thin metal foil, such as a sheet of aluminum foil having a thickness of approximately 1 mm or stainless steel foil having a thickness of approximately 0.5 mm. It is noted that the thickness and other dimensions of the foil heat conductor 306 may be selected based on the thermal management requirement of a particular arrangement of stacked electrochemical cells 302.

A portion 308 of the foil heat conductor 306 is affixed to a surface 310 of the module housing 304 to provide a thermal flux path between the side surfaces of the electrochemical cells 302 and the thermally conductive housing 304. Foam or metal spring elements 312 may be situated at selected positions within the cell stack, and between a lower portion of a cell and the portion 308 of the foil heat conductor 306 affixed to the module surface 310. It is appreciated that the complimentary use of a thermal conductor apparatus of the type previously described and foil heat conductors 306 provides for enhanced control of thermal energy conducted into and out of a stack of electrochemical cells 302. It is also appreciated with use of an active cooling system, such as that shown in FIG. 34, may further enhance the efficacy of the thermal management system.

Figure 39:
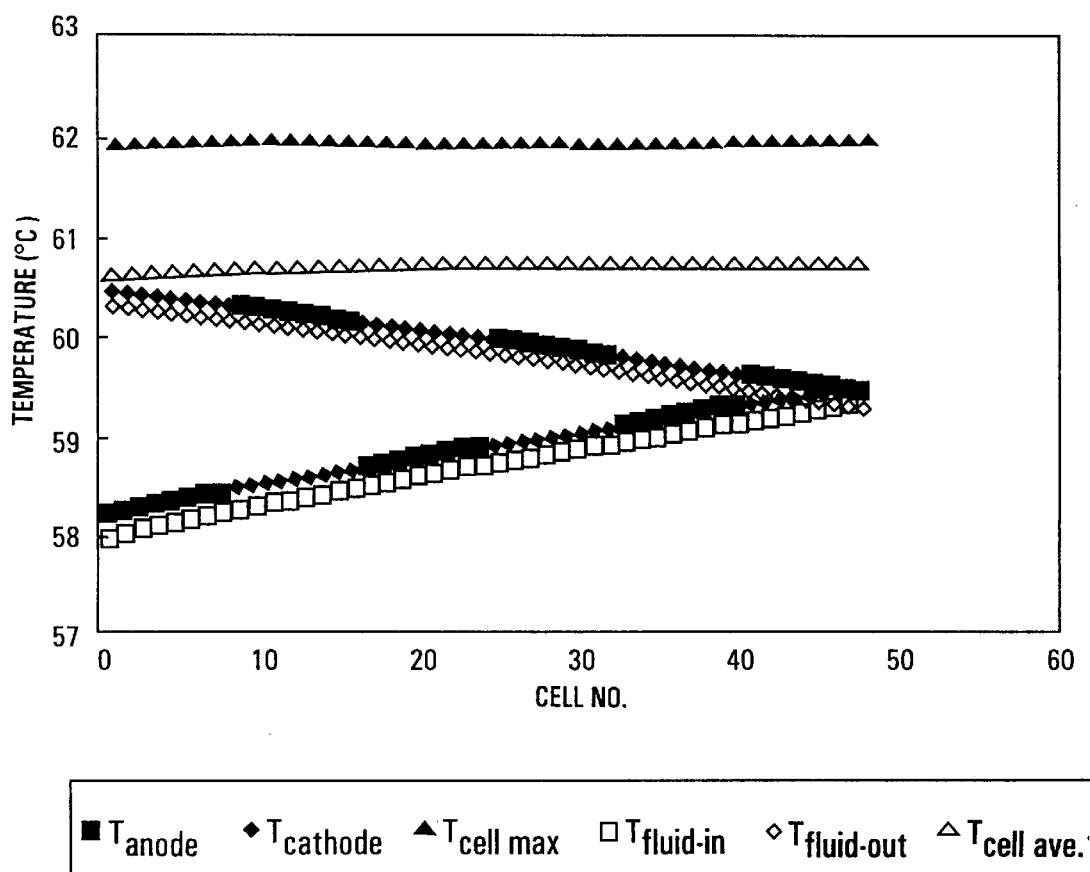
FIG. 39 is a graph showing a relationship between temperature and cell position when employing an external active cooling apparatus in a module housing in combination with an in-situ thermal management apparatus =internal to the module.

In FIG. 39, there is illustrated a temperature profile of a module under a sustained power condition resulting in a heat load of approximately 3 W per cell. The data reflected in FIG. 39 was obtained through simulation of a module containing a stack of 60 thin-film electrochemical cells. It is generally desirable that the temperature distribution within a module be substantially uniform within a reasonably tight temperature range. For example, a given specification may require that a maximum allowable temperature may deviate by no greater than 5° C. within the module. The data represented in the graph includes temperature data obtained for the anode and cathode of the cells, and the temperature of the heat transfer fluid passing into and out of the module. Average cell temperature and maximum cell temperature data are also graphically depicted. It can be seen that an external active thermal management system using a forced fluid apparatus, when employed to compliment an in-situ heat transfer apparatus provided within a module containing a stack of electrochemical cells, maintains maximum cell temperatures within a safe temperature range that deviates by no greater than 5° C.

Figure 40A:
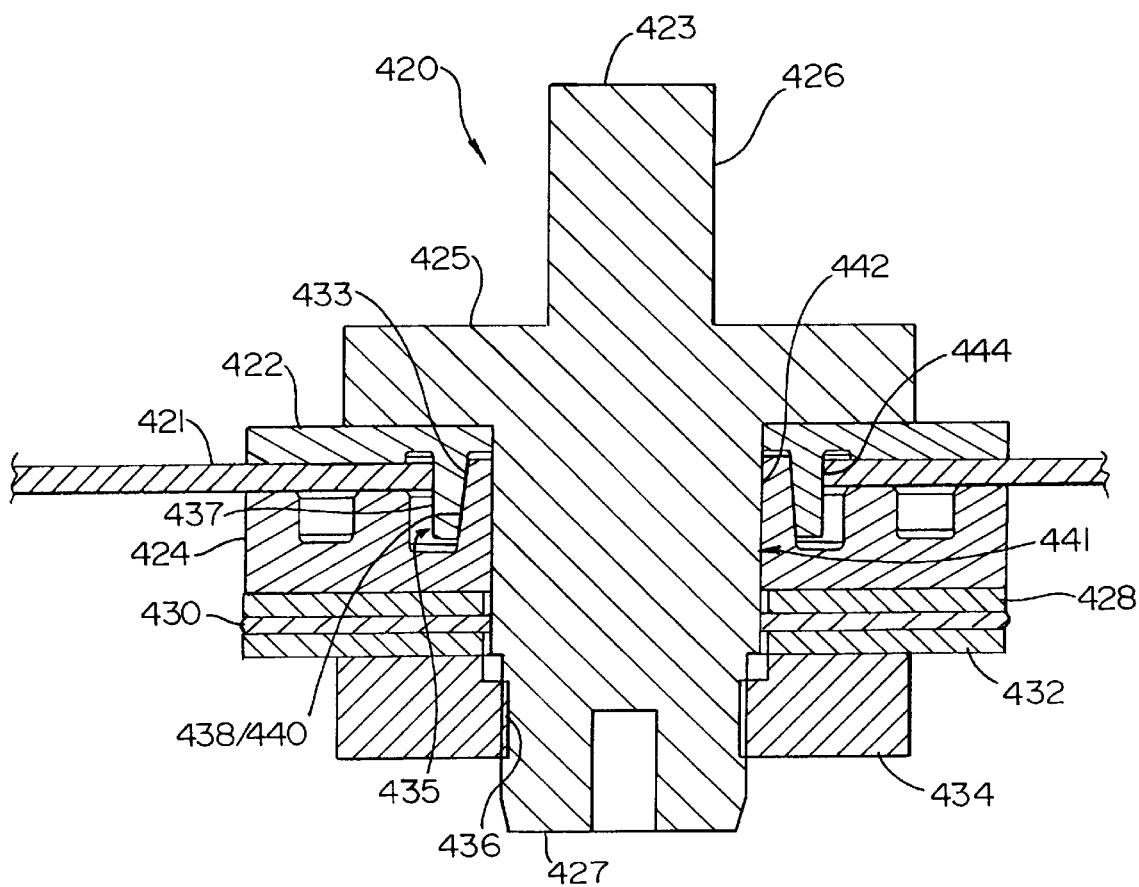
FIG. 40A is a depiction of an embodiment of a hermetic sealing apparatus for sealing a passage provided in a cover of a module housing.
Figure 41:
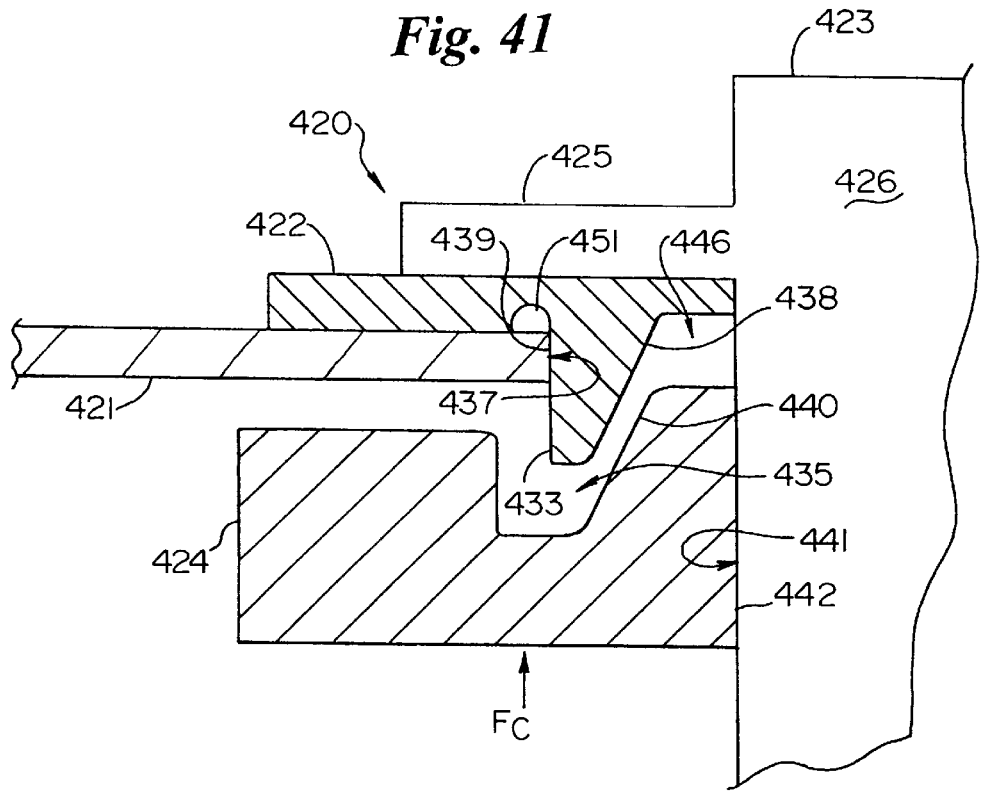
FIGS. 41–42 illustrate a pre-sealed configuration and a post-sealed configuration of the hermetic sealing apparatus shown in FIG. 40A, respectively.
Figure 42:
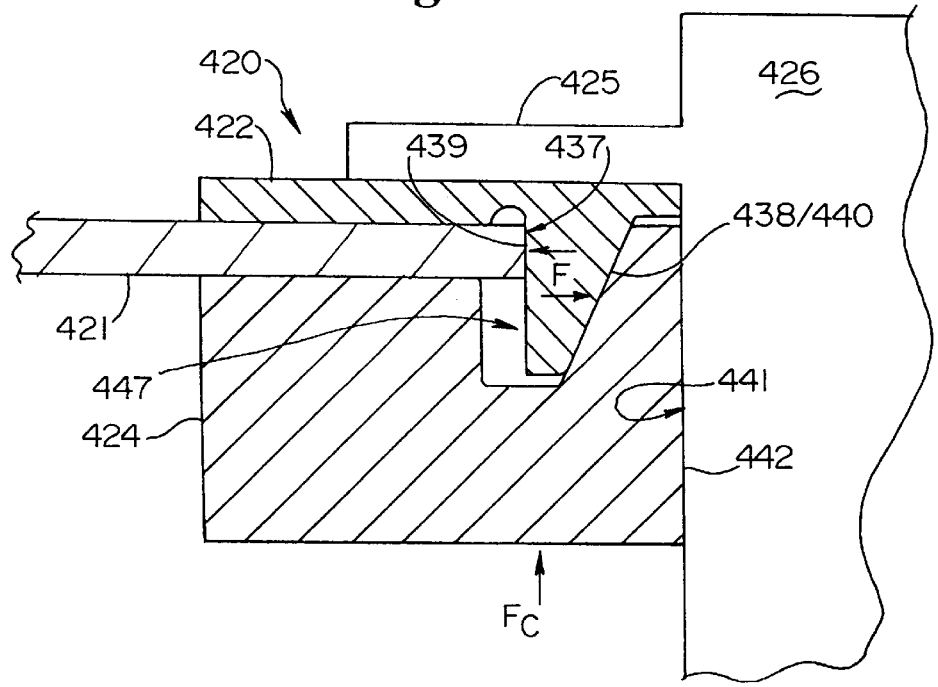

The use of an external active heat exchange apparatus in combination with an in-situ heat transfer apparatus of the type previously described is particularly effective when managing the thermal environment within a hermetically sealed power generating system. Referring now to FIGS. 40A and 41–42, there is illustrated a hermetic seal apparatus in accordance with an embodiment of the present invention. A seal of this type may be employed to provide hermetic sealing between a conduit, such as an electrical feed-through provided in a housing cover of a power generating module, and a passage in the housing. Power and communication lines, for example, may be passed through the conduit to provide external connectivity with electronic components contained within the hermetic environment of an encased module.

The hermetic seal 420 shown in FIGS. 40A and 41–42 includes a first seal body 422 having a central passage which is in general alignment with a hole provided through a substantially planar plate 421, such as a cover of an energy storing module housing. A second seal body 424 of the seal 420 also includes a central passage which is in general alignment with the hole of the cover 421 and the central passage of the first seal body 422. The first seal body 422 is disposed on an upper surface of the cover 421, and the second seal body 424 is disposed on a lower surface of the cover 421.

In one embodiment, the first seal body 422 includes a collar 433 which extends through the hole of the cover 421 and bears against an inner surface 439 of the hole. The collar 433 includes a tapered inner surface 438 which tapers away from the central passage of the first seal body 422. The second seal body 424 includes a groove 435 having an inner tapered surface 440 which tapers toward the central passage of the second seal body 424.

As is best illustrated in the pre-sealed and post-sealed depictions provided in FIGS. 41 and 42, respectively, the collar 433 of the first seal body 422 is received by the groove 435 provided in the second seal body 424 such that the tapered surfaces 438, 440 of the first and second seal bodies 422, 424 slidably engage one another as the collar 433 is forced into the groove 435. Engagement of the opposing tapered surfaces 438, 440 of the first and second seal bodies 422, 424 in a fully installed configuration forces a portion 437 of the outer surface of the collar 433 to cold flow against the inner surface 439 of the hole provided in the cover 421. Those skilled in the art will appreciate that cold flowing one material against another material forms an extremely tight seal between the two materials. As such, a hermetic seal is provided between the inner surface 439 of the hole and the collar 433 through slidable engagement between the collar 433 of the first seal body 422 and the groove 435 provided in the second seal body 424.

As is further shown in FIGS. 40A, 41–42, a conduit 426, having a first end 423 and an opposing second end 427, passes through the hole in the cover 421 and the central passages of the first and second seal bodies 422, 424. The conduit 426 includes a central passage through which electrical and communication lines may pass into the internal hermetic environment of a module housing to which the cover 421 is mounted. The conduit 426 includes a flange 425 which extends outwardly from the first end 423 of the conduit 426 and contacts a surface of the first seal body 422. The conduit 426 has a diameter which is substantially equivalent to the diameter of the central passages of the first and second seal bodies 422, 424, such that an outer surface 442 of the conduit 426 forms a tight, smooth fit with the inner diameter surfaces of the first and second seal body central passages.

A portion of the second end 427 of the conduit 426 is threaded so that a nut 434 may be secured thereon. The seal 420 also includes a thrust washer 428 that abuts a lower surface of the second seal body 424. A wave washer 430 is disposed between the thrust washer 428 and a second thrust washer 432. A nut 434, in abutment with the second thrust washer 432, exerts an axially directed compressive force on the elements of the hermetic seal 420 as the nut 434 is tightened on the threaded second end 427 of the conduit 426.

As is best seen in FIG. 42, a compressive force, $F_C$, produced by the tightened nut 434 causes the wave washer 430 to compress which, in turn, forces the inwardly tapered inner surface 440 of the second seal body 424 into slidable engagement with the outwardly tapered inner surface 438 of the first seal body 422. Application of the compressive force, $F_C$, drives the inner diameter surface 431 of the second seal body 424 inwardly against the outer surface 442 of the conduit 426. Slidable engagement between the two tapered surfaces 438, 440 also drives a portion 437 of the collar 433 into tight engagement with the inner surface 439 of the hole provided in the cover 421. After tightening the nut 434 to generate an appropriate level of compressive force, $F_C$, the wave washer 430 continues to apply the compressive force, $F_C$, so as to maintain the integrity of the hermetic seal 420 over the service life of the seal.

It is understood that the compressive force, $F_C$, may be produced by a fastener apparatus other than that shown in FIG. 40A. By way of example, a spring-loaded metal keeper may be used as an alternative to the threaded nut 434. Other retention devices which are capable of maintaining a continuous compressive force, $F_C$, may also be employed.

In one embodiment, the hole provided in the cover 421 is circular and the first and second seal bodies 422, 424, as well as the conduit 426, each have a geometry that complements the geometry of the hole provided through the cover 421. It is understood that a hermetic seal constructed in accordance with the principles of the present invention may have a configuration other than that illustrated in the Figures, and that the configuration of the seal may be modified to complement the geometry of the passage provided in the cover 421.

In one embodiment, the cover 421 is constructed from a metallic material, such as aluminum, and the first and second seal bodies 422, 424 are fabricated from a plastic material, such as polypropylene plastic. The conduit 426 may be fabricated from a metallic or a plastic material. It is noted that gaps 446, 447 may be provided in the first and second seal bodies 422, 424, respectively, to accommodate positional shifting between the first and second seal bodies 422, 424 occurring from forced engagement of the two tapered surfaces 438, 440. Also, a notch 451 may be provided in the first seal body 422 to facilitate movement of the collar 433 in a direction toward the inner surface of the hole of the cover 421 in response to slidable engagement between the two tapered surfaces 438, 440.

Figure 40B:
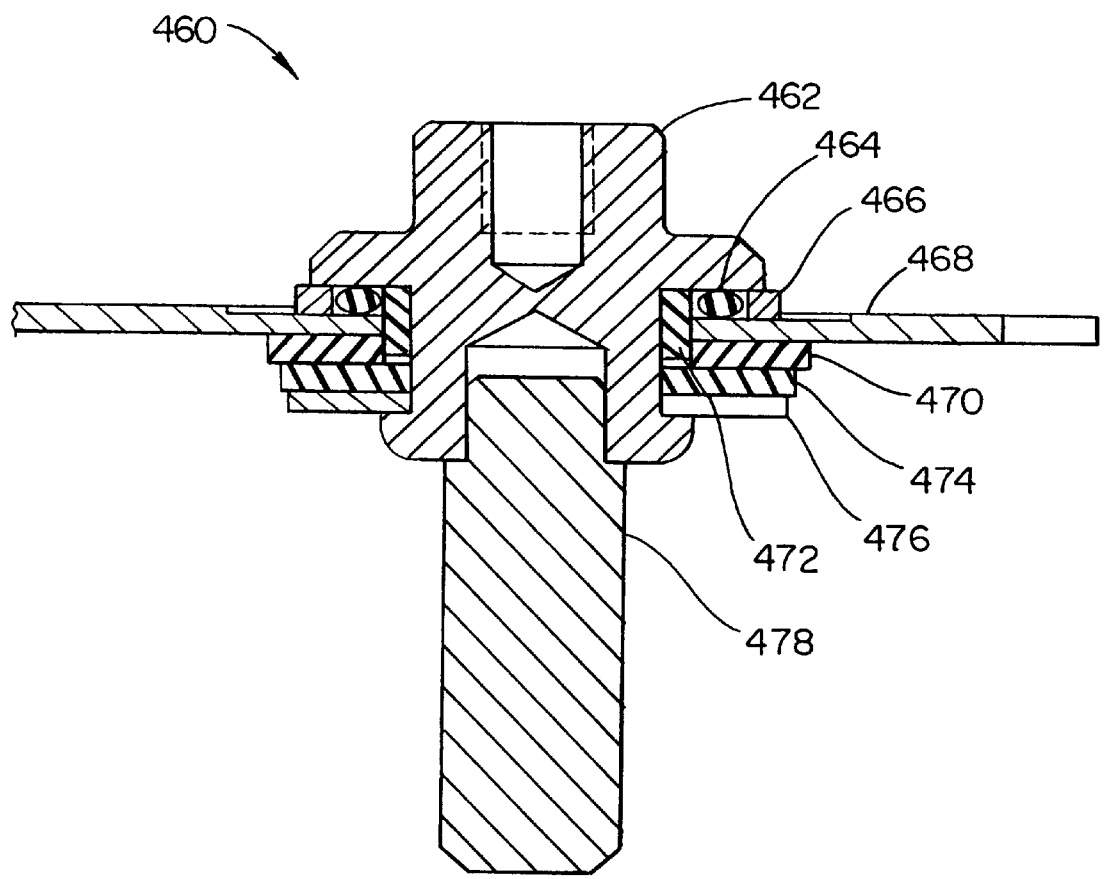
FIGS. 40B–40C illustrate another embodiment of a hermetic sealing apparatus for sealing a passage provided in a cover of a module housing.
Figure 40C:
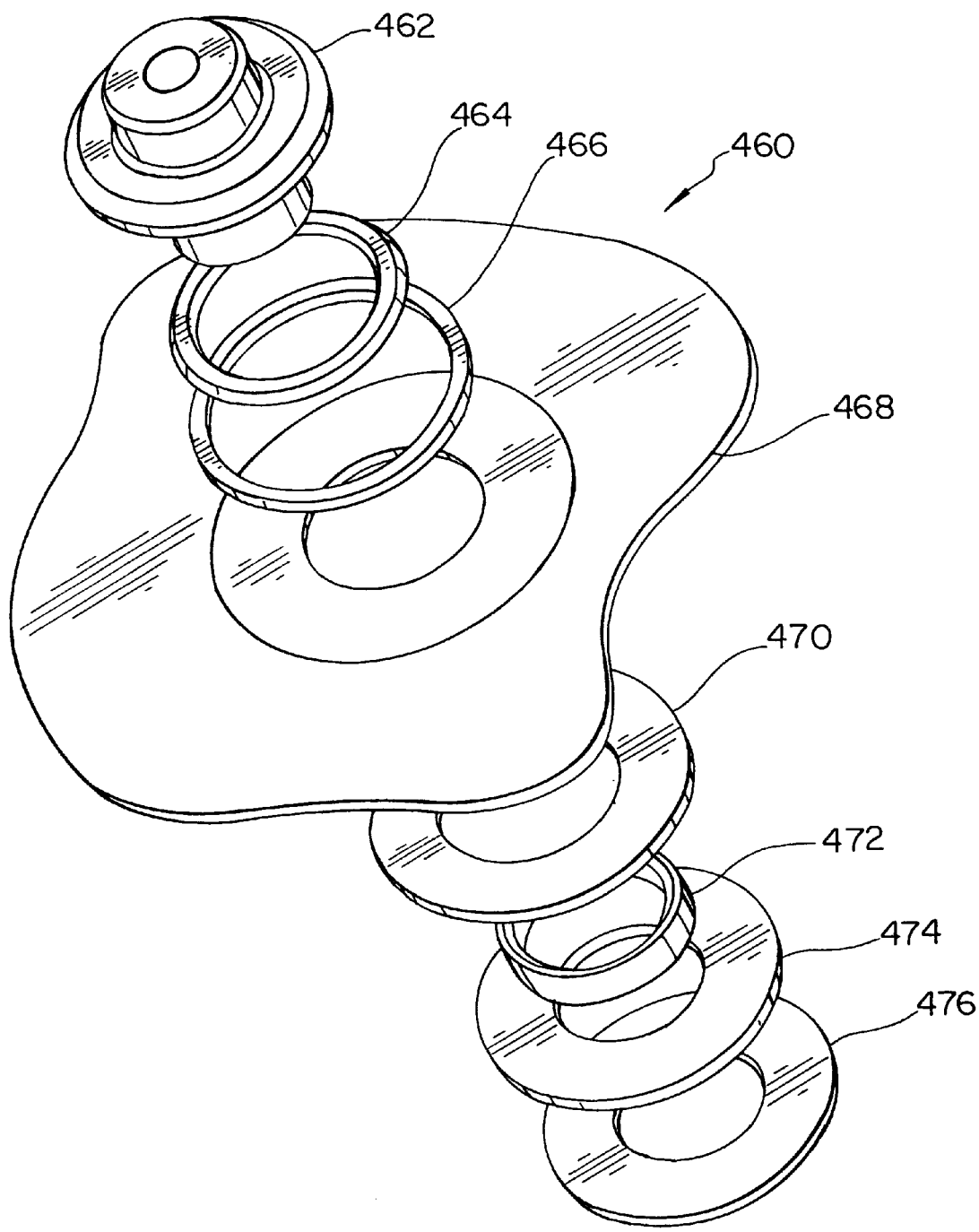

An alternative hermetic sealing apparatus or feed-through is shown in FIGS. 40B–40C. In accordance with this embodiment, hermetic sealing is provided primarily by an o-ring 464 which is compressed between a flanged conductor or terminal 462 and a wall or cover 468 of the module housing. A phenolic support 466 keeps the flanged conductor 462 at a constant distance from the cover 468, thus creating a cavity whose dimensions are stable over time. This arrangement prevents flowing of the o-ring material with time and high temperature.

A polypropylene ring 470 and sleeve 472 electrically insulate the bottom portion of the feed-through from the cover 468. In contrast to the phenolic ring material, polypropylene maintains its high dielectric strength even after being subjected to arcing. It is noted that arcing typically occurs, if at all, between the o-ring 464 and the polypropylene sleeve 472. Another advantage of using polypropylene material for the ring 470 and sleeve 472 material is that it provides a coefficient of friction that is sufficient to prevent the assembly from turning when subjected to the torque generated when wires are connected to the flanged conductors 462. The Belleville spring 474 is flattened when the feed-through is crimped. The Belleville spring 474 ensures that the assembly will be kept under pressure even if the polypropylene flows over time. The metal washer 476 helps to distribute pressure evenly across the surface of the polypropylene ring 470.

In general, the above-described hermetic sealing apparatuses exhibit a high dielectric strength between the housing cover or wall and a power conductor passing through the cover. Power terminal voltages on the order of 2,000 V can be accommodated without occurrences of arcing. Tight sealing (e.g., $10^{-8}$ cc-atm/sec) is maintained even when subjected to mechanical stresses. The hermetic seals also exhibit good torque resistance and good overall mechanical resistance.

Figure 43:
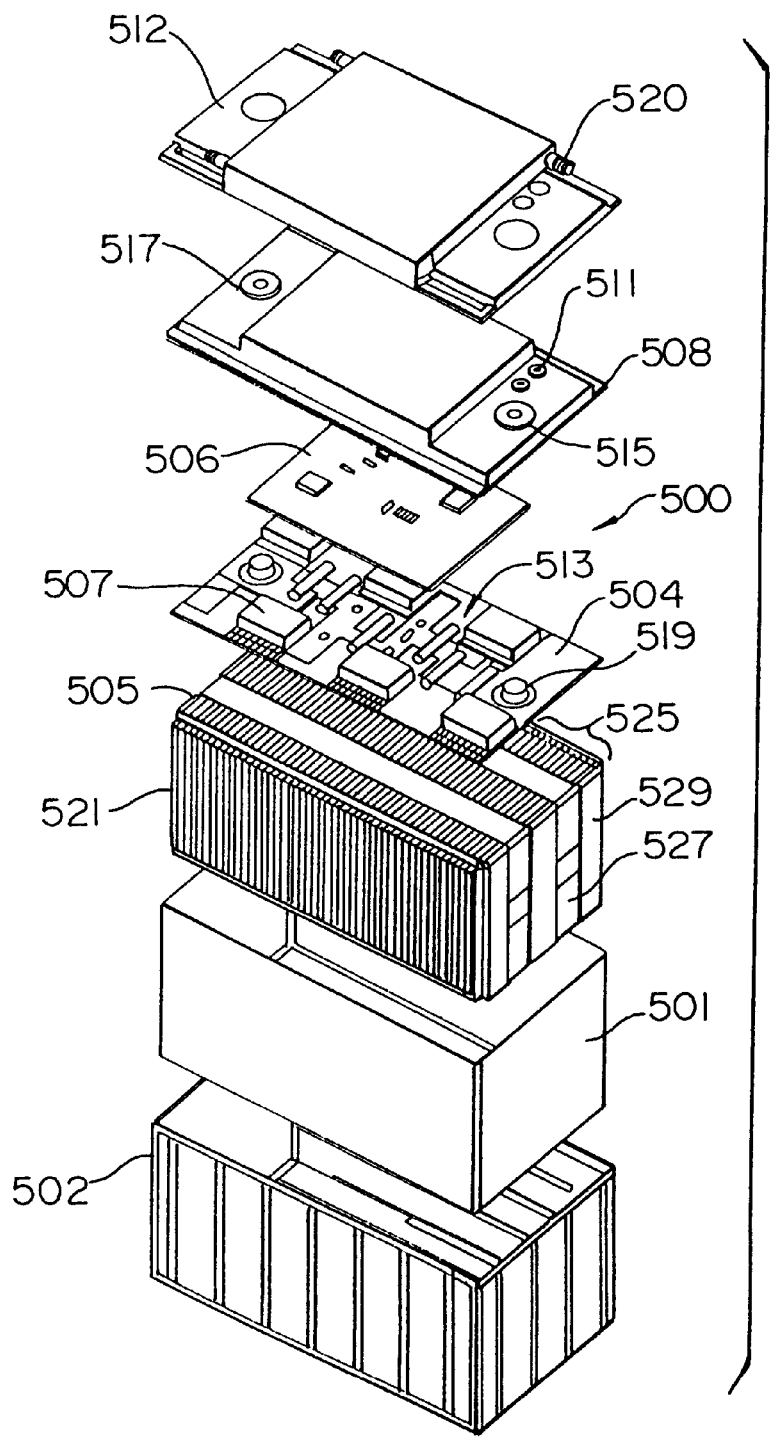
FIG. 43 is an exploded view of a power generating module disposed in a housing that incorporates a hermetic seal in accordance with an embodiment of the present invention.

In FIG. 43, there is illustrated an exploded view of a power generating module 500 that incorporates many of the advantageous features previously described hereinabove. The module 500 includes an inner shell 501 which contains a stack 505 of electrochemical cells 521 and various electronic boards. An inner shell cover 508 incorporates a hermetic seal 515, such as that described previously with respect to FIGS. 40–42, that seals various feed-throughs provided in the inner shell cover 508.

In accordance with one embodiment, the module 500 includes a stack 505 of electrochemical cells 521 which are interconnected through use of a interconnect board 504. The stack 505 of electrochemical cells 521 are segregated into six cell packs 525, all of which are banded together by use of two bands 527 and two opposing end plates 529. The 48 electrochemical cells 521 are subjected to a continuous compressive force generated by use of the bands 527/end plates 529 and a foam or spring-type element disposed within or adjacent each of the cells 521. Each electrochemical cell 521 includes a thermal conductor which is spot welded or otherwise attached respectively to one or both of the positive and negative cells contacts.

The positive and negative contacts of the thermal conductors carry current from the cells 521 to the interconnect board 504. The thermal conductors also conduct heat from the cells to a metallic inner shell 501 which serves as a heat sink. The thermal conductors include a spring portion which deforms when the cell 521 is inserted into the inner shell 501, accommodating tolerances in cell length and changes in separation distances between the cells 521 and the inner shell 501.

The inner shell 501 has a thickness of approximately 1 mm and is fabricated from deep drawn aluminum. The interior sides of the inner aluminum shell 501 include an anodized coating having a thickness of approximately 0.64 mm. The anodized surface of the inner shell 501 provides electrical insulation between adjacent cells 521, yet provides for the efficient transfer of heat generated from the cells 521 through contact with the resilient cell conductors. In the case of a stainless steel shell, a thin sheet of plastic or mineral-based material may be disposed adjacent the shell wall.

The interconnect board 504 is situated above the cell stack 505 and includes control circuitry for each of the respective six cell packs 525 constituting the cell stack 505. Each cell pack control unit 513 includes a short circuit protection device 507, a by-pass device, and an equalizer circuit which cooperate to control the operation of the cell pack 525 while charging and discharging. Accordingly, each of the cell packs 525 is monitored and controlled by a respective cell pack control unit 513. A control board 506, situated above the interconnect board 504, includes a processor that monitors and controls each of the six cell pack control units 513.

As such, the control board 506 provides for cell pack and module level monitoring and control during charging and discharging operations.

A pair of quick connectors 517 pass through corresponding holes provided in an inner shell cover 508 and serve as the main power terminals of the module 500. The quick connectors 517 are hermetically sealed to the inner shell cover 508 using a sealing apparatus 515 in accordance with the principles of the present invention. When an outer shell cover 512 is positioned onto the inner shell cover 508, the quick connectors 517 are received into mating sockets 519 provided on the interconnect board 504. Communication connectors 511, which pass through the inner shell cover 508 and are similarly hermetically sealed thereto, provide external access to the control board 506 and other electronic boards of the module 500.

A hermetic seal is provided between the inner shell 501 and inner shell cover 508 by welding the inner shell cover 508 to the top of the inner shell 501. The sealed inner shell 501 is then inserted into an outer shell 502. The outer shell 502 is fabricated from glass filled polypropylene through use of an injection or compression molding process, and has a thickness of approximately 2 mm. The outer shell 502 includes ribs on three sides of the inner surface which form flow channels when the inner shell 501 is installed in the outer shell 502 for the purpose of transporting a heat transfer fluid between the inner and outer shells 501, 502. Cooling lines may alternatively be placed in contact with the inner shell 501 without the need for an outer shell 502. The outer shell cover 512 is vibration welded to the top of the outer shell 502. Fluid connectors 520 are disposed on the outer shell cover 512 and provide for the flow of heat transfer fluid into and out of the module 500.

Referring now to FIGS. 44–48, and in accordance with another embodiment of the present invention, an energy storing module may include an interconnect board 630 which is disposed in a hermetically sealed housing of the type described above. It is understood that hermetic sealing of the module is not always necessary depending on the service environment of the module, and as such, the interconnect board may be installed in a non-hermetically sealed housing.

Figure 44:
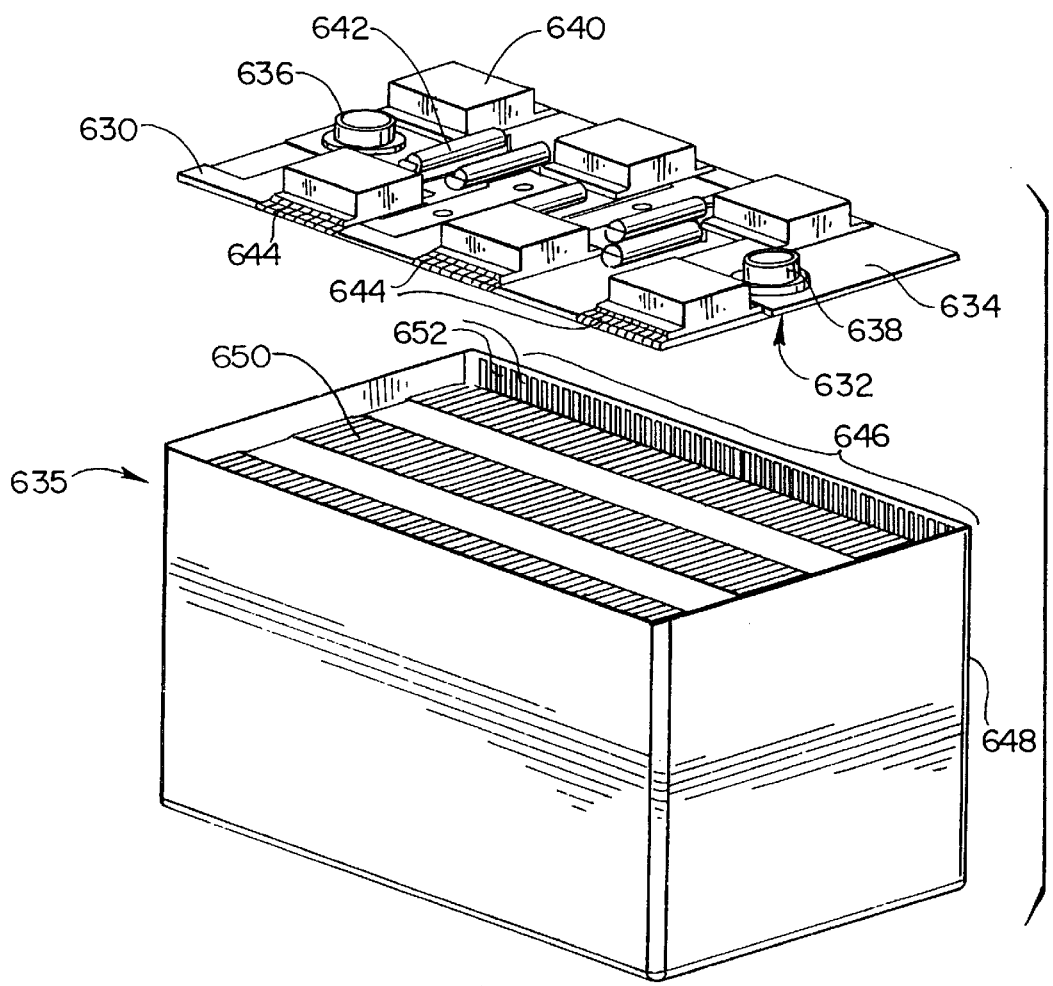
FIG. 44 illustrates an embodiment of a solid-state energy storage device which includes a stack of thin-film electrochemical cells selectively interconnected in a series and/or parallel relationship by use of an interconnect board.

As is shown in FIG. 44, the energy storage module 635 includes a number of individual electrochemical cells 650 which are arranged in a stack configuration 646 and situated in a housing 648. Each of the electrochemical cells 650 includes a pair of electrical leads 652 disposed on opposing edges of the cells 650. It will be appreciated that a generic stack 646 of electrochemical cells 650 may be interconnected in various parallel and series relationships to achieve desired current and voltage ratings. To facilitate selective series or parallel connectivity within the stack 646 of electrochemical cells 650, an interconnect board 630 is situated within the housing 648.

The interconnect board 630 includes a connection pattern or conductivity grid 632 which, when the board 630 is installed within the housing 648, interconnects the electrochemical cells 650 in accordance with a pre-established connection configuration. The connection pattern or grid 632 is typically affixed or otherwise bonded to a sheet of insulating material 634, such as a substantially rigid plastic or laminate material. A number of electrical and electromechanical components may also be mounted on the interconnect board 630.

As is shown in FIG. 44, for example, the interconnect board 630 includes a number of fuse packs 640, equalizer and bypass devices 642, and positive and negative power terminals 638, 636. It is understood that any or all of the components populating the interconnect board 630 may be mounted on boards or platforms other than the interconnect board 630, and situated internal to or externally of the module housing 648. In one embodiment, the interconnect board 630 shown in FIG. 44 and the electrochemical cells 650 are disposed in a hermetically sealed housing 648, such as that previously described with respect to FIGS. 40–43.

Figure 45:
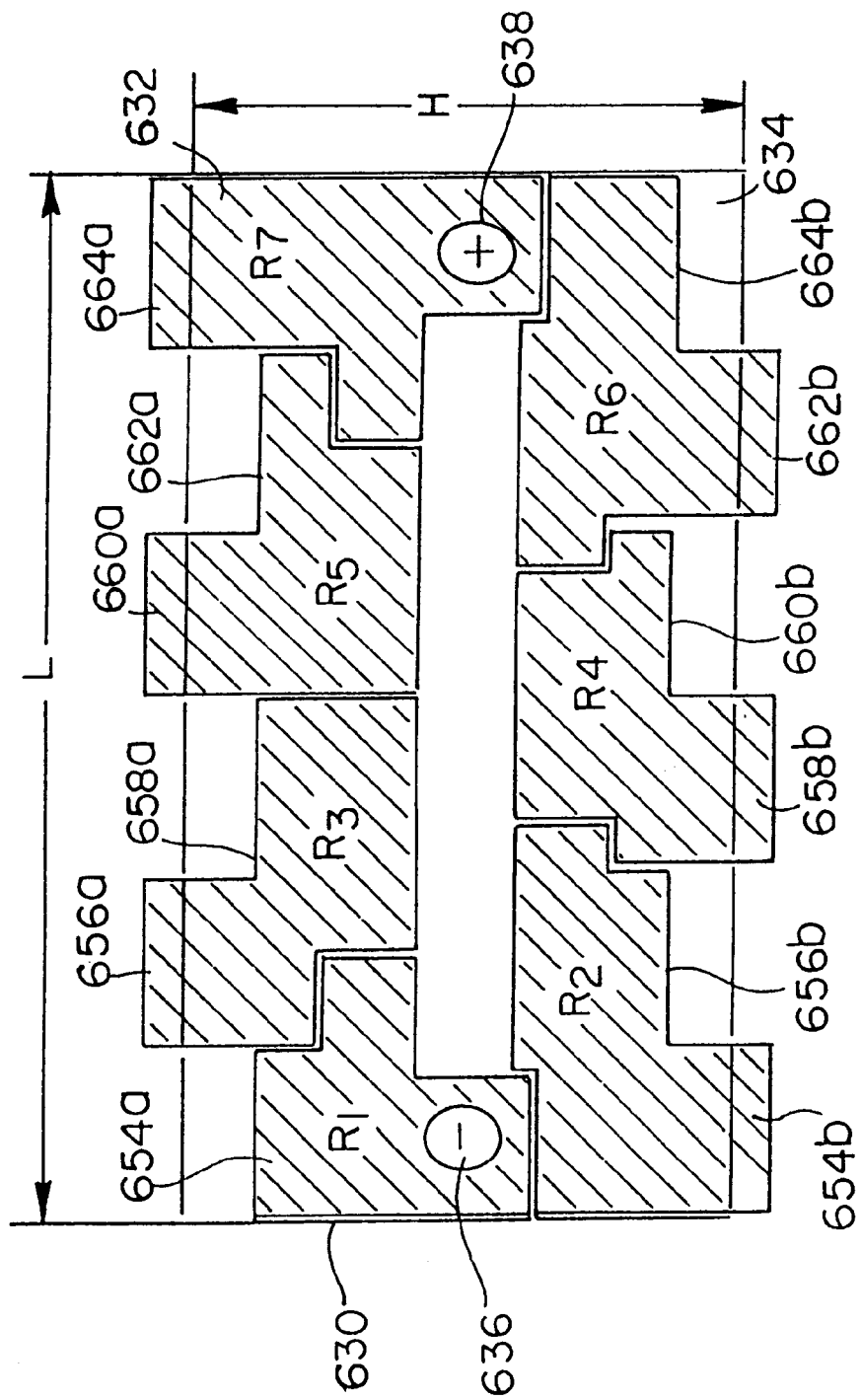
FIG. 45 illustrates a surface of an interconnect board having a connection pattern disposed thereon for providing selective series and/or parallel connectivity with a number of electrochemical cells.

As is best illustrated in FIG. 45, the interconnect board 630 typically includes a patterned conductive surface 632 which advantageously provides for the interconnecting of autonomous electrochemical cells 650 in accordance with a pre-designed connection layout. A significant advantage realized by employing an interconnect board 630 having a patterned interconnection surface 632 concerns the flexibility by which a desired current and voltage rating may be achieved irrespective of, and without disrupting, the position of individual electrochemical cells 650 relative to one another within the housing 648.

Figure 46:
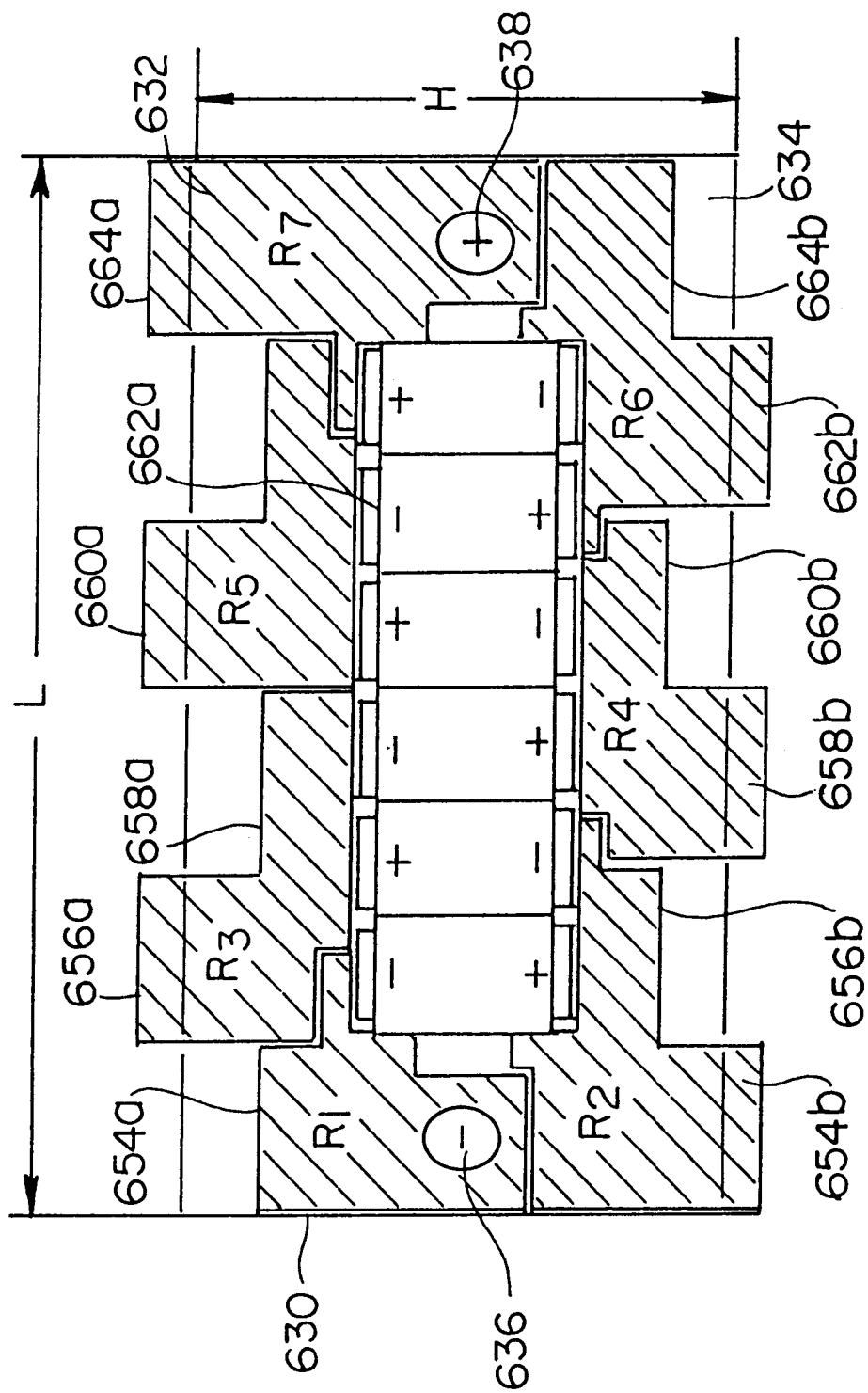
FIG. 46 is another illustration of an interconnect board which includes a sheet of conductive material including a connection pattern for selectively connecting a number of electrochemical cells in a series or parallel relationship.

By way of example, and with particular reference to FIGS. 45–46, the interconnect surface 632 of the interconnect board 630 is selectively patterned to achieve a desired cell connection configuration. In this embodiment, the interconnect surface 632 includes a number of electrically isolated connection regions which are pre-designed to electrically connect with the positive and negative contacts 652 of a particular number of electrochemical cells 650. In accordance with this illustrative embodiment, seven isolated connection regions, $R_1$–$R_7$, are shown as constituting the patterned interconnect surface 632 of the interconnect board 630.

When the interconnect board 630 is installed within the housing 648 and adjacent the electrochemical cell stack 646, the electrical contacts 652 of a first group of electrochemical cells 650 contact the connection region $R_1$ at a location 654a. The opposing set of electrical contacts 652 of the first group of electrochemical cells 650 electrically contact the connection region $R_2$ at a location 654b. In this configuration, the connection region $R_1$ is electrically connected to the negative power terminal 636.

A second group of electrochemical cells 650 have their respective opposing set of electrical contacts 652 connected to connection regions $R_3$ and $R_2$ at locations 656a and 656b, respectively. A third group of electrochemical cells 650 have their respective opposing electrical contacts 652 connected to connection regions $R_3$ and $R_4$ at locations 658a and 658b, respectively. Subsequent groupings of electrochemical cells 650 have their respective opposing electrical contacts 652 connected to connection regions $R_5$, $R_6$, and $R_7$ in a similar manner. It is noted that the connection region $R_7$ is electrically connected to the positive power terminal 638.

It is to be understood that any number of connection regions of varying configuration may be provided on the interconnect surface 632 of the interconnect board 630. Although each of the connection regions $R_1$–$R_7$ shown in FIGS. 45–46 electrically communicate with a group of electrochemical cells 650, it is understood that a connection region may be designated to electrically communicate with only a single electrochemical cell 650. It can be seen that the first group of electrochemical cells 650 are connected in a parallel relationship with respect to connection regions $R_1$ and $R_2$. Similarly, the second group of electrochemical cells 650 are connected in parallel with respect to connection regions $R_3$ and $R_2$.

Having established electrical connectivity with selected electrochemical cells 650 at selected isolated connection regions, the connection regions are then interconnected in a series or parallel manner through the use of electrical conductors and/or components. Bridging selected isolated connection regions in this manner defines a current path the permits current to flow through, for example, the positive power terminal 638, each of the connection regions $R_1$–$R_7$, and through the negative power terminal 636.

In one embodiment, a simple short-circuit bridge or connector may be used to selectively interconnect the connection regions $R_1$–$R_7$ in a desired manner to permit current to flow through the module 630. In another embodiment, various electrical or electro-mechanical components may be disposed on the interconnect board 630 which control the flow of current between isolated connection regions.

Those skilled in the art will appreciate that an interconnect board 630 implemented in accordance with the principles of the present invention permits flexible and selective connecting of any number of electrochemical cells 650 in any desired series or parallel relationship. The interconnect board 630 further permits easy integration of various control and monitoring devices in series or parallel with respect to the electrochemical cells. The interconnect surface 632 may be patterned according to various pre-designed connection layouts to achieve desired voltage and current ratings. The manufacturability of energy storage modules that satisfy a wide range of power requirements is significantly improved by, for example, selecting among a number of interconnect boards 630 having varying interconnect surface configurations, and installing a selected interconnect board 630 in a selected module housing. A number of different module housing configurations may be designed and fabricated to house a particular number of electrochemical cells based on the energy production requirements of a particular application.

Figure 47:
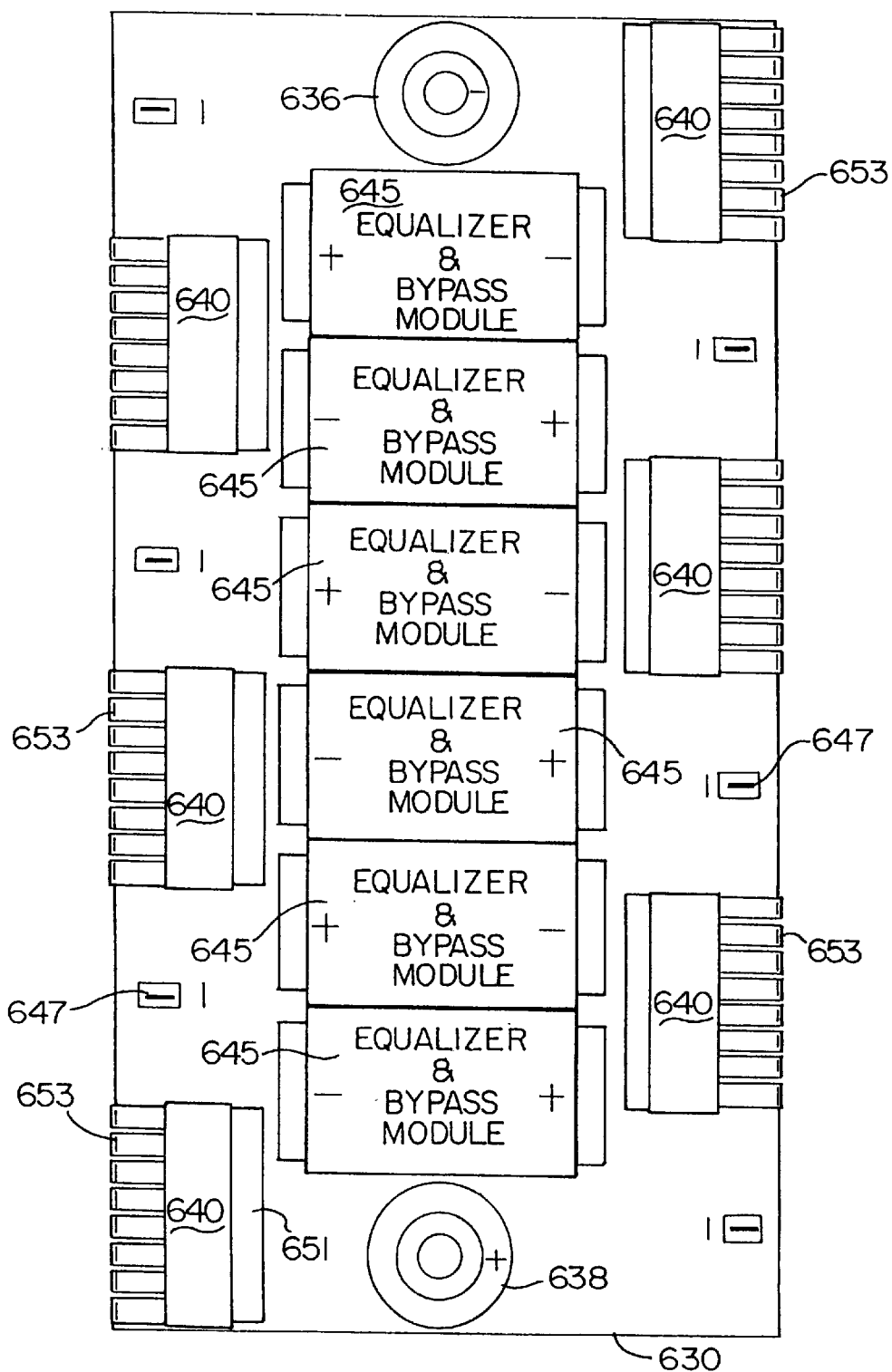
FIG. 47 illustrates another embodiment of an interconnect board which includes a number of components mounted thereon.

Turning now to FIG. 47, there is provided a top view illustration of an integrated interconnect board 630 onto which a number of control devices are mounted. In the embodiment shown in FIG. 47, the bottom of the interconnect board includes an interconnect surface similar in configuration to that shown in FIGS. 45–46. In this configuration, the energy storage module includes 64 individual electrochemical cells 650 grouped into six cell packs each comprising eight parallel connected electrochemical cells 650. Associated with each of the six cell packs is a fuse pack 640 which includes eight fuses (not shown), with one fuse being connected in series with one of the eight parallel connected electrochemical cells 650 of the cell pack. The fuses within the fuse pack 640, when activated, provide for the electrical isolation of a defective cell from the remaining cells of the cell pack. A fuse is typically activated, for example, upon the development of a short-circuit within a particular cell of the cell pack. Various types of suitable fuse devices are disclosed in co-pending application Ser. No. 08/900,929 entitled "In-Situ Short-Circuit Protection System and Method for High-Energy Electrochemical Cells" (Gauthier et al.), the contents of which are incorporated herein by reference.

A current bypass device may also be affixed to the interconnect board 630 and connected in series with a cell pack which, when activated, isolates a cell pack from the series connection and bypasses current around the defective cell pack. A number of suitable current bypass devices are disclosed in co-pending application Ser. No. 08/900,325 entitled "Bypass Apparatus and Method for Series Connected Energy Storage Devices" (Rouillard et al.), the contents of which are incorporated herein by reference.

An equalizer device may further be connected in parallel with a cell pack which provides overvoltage protection and balancing of cell pack potentials during charging and discharging operations. A number of suitable equalizer devices are disclosed in co-pending application Ser. No. 08/900,607 entitled "Equalizer System and Method for Series Connected Energy Storing Devices" (Rouillard et al.), the contents of which are incorporated herein by reference.

In one embodiment, the equalizer device and bypass device are incorporated into a single integrated component package, such as the equalizer/bypass module 645 shown in FIG. 47. Additionally, a communication device 647 may be connected to each of the cell packs to facilitate monitoring and controlling of individual cell packs by an internal or external controller or processor.

In FIGS. 48A–48C, there is illustrated an embodiment of an integrated equalizer/bypass module 645 which, as discussed previously, may be mounted on the interconnect board 630. The integrated equalizer/bypass module 645 advantageously provides for a compact housing configuration capable of efficiently dissipating heat generated during equalization and bypass conditions through contact terminals 667, 669 affixed to the interconnect board 630. The heat conducted through the contact terminals 667, 669 and to the interconnect board 630 may further be conducted to the walls of the housing 648 through thermal conductors extending from the cells and contacting the housing walls, as was discussed previously hereinabove.

In one embodiment, the integrated equalizer/bypass module 645 has a total length, $L_T$, of 2.75 inches. The housing 665 of the equalizer/bypass module 645 has a length, $L_M$, of 2.25 inches. The total width, $W_T$, of the equalizer/bypass module 645 is 1.50 inches, while the width of the positive and negative terminals 667, 669 is 1.25 inches. The height, $H_T$, of the housing 665 is 0.625 inches, and the height or thickness, $H_C$, of the positive and negative terminals 667, 669 is 0.05 inches. The equalizer/bypass module 645 is mounted on the interconnect board 630 which has length and width dimensions of 12.5 inches and 5.6 inches, respectively. The connection surface 632 of the interconnect board 630 includes a patterned copper plate having a thickness of 0.05 inches.

It is noted that the heat generated by the equalizer/bypass module 645 is typically conducted from the integrated module 645 and interconnect board 630 to the walls of the module casing 648 via the thermal conductors of the cells. In accordance with this design, the equalizer can pass a current on the order of 5 amps which results in the generation of approximately 15 watts of heat. Those skilled in the art will appreciate that the high current rating of the equalizer provides for relatively high rates of energy storage system charging and discharging.

Returning to FIGS. 45–46, one embodiment of an interconnect board 630 includes a plastic sheet 634, onto which a number of components are mounted, and a separate sheet of electrically conductive material, which is patterned to form an interconnect surface 632. The patterned conductive sheet is subsequently affixed to the plastic sheet 634. In one embodiment, the conductive sheet constitutes a copper sheet having a thickness of 0.05 inches and a width and length which varies depending on the size of the module 635. The thickness of the conductive sheet is required in order to pass a relatively high current, and virtually precludes employment of conventional photo-etched printed circuit board (PCB) techniques.

The copper sheet is machine milled to develop individual connection regions thereon in accordance with a pre-designed pattern layout. It is noted that the pattern layout should be designed to minimize the volume and weight of the copper sheet. Following machining of the copper sheet, each of the individual copper connection regions is cleaned and mounted to the plastic board 634 at appropriate locations to facilitate the reconstruction of the pre-designed pattern layout.

The plastic board 634 typically has a thickness of approximately 0.1 inches, and has a construction similar to circuit boards commonly used within the electronics industry. The copper connection regions may be affixed to the plastic board 634 by conventional adhesion or fastening techniques. It is understood that conductive materials other than copper, such as aluminum for example, may be employed to fabricate the connection regions.

In an embodiment in which various electronic devices are used to monitor and control electrical and thermal energy generated within the module 635, such devices are then mounted to the integrated interconnect board 630. For example, a number of equalizer/bypass modules 645 and communication devices 647 are mounted to the interconnect board 630. The equalizer/bypass modules 645 and positive and negative power terminals 638, 636 may be welded to the interconnect board 630, such as by employing a known ultrasonic welding technique. Alternatively, an air flow brazing or spot welding technique may be employed to mount the equalizer/bypass module 645 and terminals 636, 638 to the interconnect board 630.

After mounting the equalizer/bypass modules 645 and terminals 636, 638, the fuse packs 640 may be mounted on one or both sides of the interconnect board 630, depending on the cell configuration and the need to minimize the weight and volume of the interconnect surface 632. One side 651 of the fuse packs 640 is ultrasonically welded to the interconnect board 630. It is noted that the use of ultrasonic welding to mount various components to the interconnect board 630 results in the overall reduction in heat generated during the welding procedure in comparison to other known welding techniques. However, air flow brazing, soldering, or spot welding techniques may be employed in combination with well-designed heat sinks.

Finally, the interconnect board 630 is mounted on the stack 646 of electrochemical cells 650. Each of the cell terminals 652 is connected to the interconnect board 630, which may be performed by ultrasonic welding, soldering, or spot welding. Table 2 below provides various data associated with the use of an interconnect board 630, such as that shown in FIG. 47, for interconnecting a number of individual electrochemical cells 650 and various electronic devices encased in a sealed module housing 648. The data tabulated in Table 2 demonstrates that a total resistance of approximately 8 micro-ohms and a total weight of 7 to 14 grams may be realized by employing an integrated interconnect board 630 of the type illustrated herein for use in a power system capable of passing on the order of 400 A of peak current with less than approximately 4 mV of voltage drop across the power terminals and a power loss on the order of 1 watt.

It will, of course, be understood that modifications and additions can be made to the various embodiments discussed hereinabove without departing from the scope or spirit of the present invention. For example, discrete surfaces, rather than the entire surface, of a heat sink, such as a thermally conductive wall of a protective enclosure, may be subject to application of the above-described thermally conductive and electrically resistive material. By way of further example, the principles of the present invention may be employed for use with battery technologies other than those exploiting lithium polymer electrolytes, such as those employing nickel metal hydride (Ni-MH), lithium-ion, (Li-Ion), and other high-energy battery technologies. Accordingly, the scope of the present invention should not be limited by the particular embodiments discussed above, but should be defined only by the claims set forth below and equivalents thereof.

What we claim is:

1. An electrochemical energy storing device, comprising:
   a plurality of thin-film electrochemical cells maintained in a state of compression;
   a plurality of thermal conductors, each of the plurality of thermal conductors defining a positive or negative contact for one of the plurality of electrochemical cells, the thermal conductors conducting current into and out of the cells and conducting thermal energy between the cells and a first electrically resistive surface of a thermally conductive structure disposed adjacent the thermal conductors; and
   a cooling apparatus in thermal contact with a second surface of the thermally conductive structure, a heat transfer medium provided within the cooling apparatus to enhance thermal energy conduction between the cells and the thermally conductive structure.

2. The electrochemical energy storing device of claim 1, wherein a pressure apparatus external to the electrochemical cells maintains the electrochemical cells in the state of compression.

3. The electrochemical energy storing device of claim 1, wherein a pressure apparatus internal to at least some of the plurality of electrochemical cells maintains the plurality of electrochemical cells in the state of compression.

4. The electrochemical energy storing device of claim 1, wherein each of the electrochemical cells comprise one of a foam element, a microstructured elastomeric element, or a metal spring element to maintain the electrochemical cells in the state of compression.

5. The electrochemical energy storing device of claim 1, wherein each of the thermal conductors comprises an integral spring.

6. The electrochemical energy storing device of claim 1, wherein each of the thermal conductors comprises a spring mechanism having one of a substantially C-shaped, double C-shaped, Z-shaped, V-shaped, L-shaped, finger-shaped or O-shaped cross-section.

7. The electrochemical energy storing device of claim 1, wherein the cooling apparatus comprises a plate heat

TABLE 2

| Material | Thickness Mils | Volume cube meter | Weight grams | Resistance microohm @ 80° C. | Volt. drop mVolts | Power Watts | Energy Joules |
|---|---|---|---|---|---|---|---|
| Copper | 50 | 1.6E−06 | 14.41 | 8.39 | 3.36 | 1.34 | 40.29 |
| Aluminum | 80 | 2.58E−06 | 6.94 | 8.64 | 3.46 | 1.38 | 41.48 | exchanger defining a gap through which the heat transfer medium passes.

8. The electrochemical energy storing device of claim 7, wherein the heat exchanger is brazed to the second surface of the thermally conductive structure.

9. The electrochemical energy storing device of claim 1, further comprising a plurality of short-circuit protection devices, each of the plurality of short-circuit protection devices being coupled in series to one of the plurality of electrochemical cells, a particular short-circuit protection device of the plurality of short-circuit protection devices coupled to a particular cell of the plurality of electrochemical cells being activated by a current spike capacitively produced upon occurrence of a short in the particular cell, the particular cell being electrically isolated from other ones of the plurality of electrochemical cells upon activation of the particular short-circuit device.

10. The electrochemical energy storing device of claim 9, wherein the short-circuit protection devices, the electrochemical cells, and the thermal conductors are disposed in a hermetically sealed enclosure of the energy storing device.

11. The electrochemical energy storing device of claim 1, wherein:
the plurality of electrochemical cells are arranged such that a planar surface of a particular cell of the plurality of cells is in thermal contact with a planar surface of a cell disposed adjacent the particular cell; and
the planar surfaces of the particular cell and the adjacent cell each have a ratio of energy content-to-contact surface area such that thermal energy produced by a short-circuit condition arising in the particular cell is conducted to the adjacent cell so as to prevent a temperature of the particular cell from exceeding a breakdown temperature.

12. The electrochemical energy storing device of claim 1, wherein each of the thermal conductors is spot welded to a metalization layer provided along an edge of a respective electrochemical cell, the metalization layer defining the positive or negative contact of the respective cell and the current being conducted laterally along the metalization layer.

13. The electrochemical energy storing device of claim 1, wherein the electrochemical cells are arranged in a stacked configuration and selectively interconnected in a series or parallel relationship.

14. The electrochemical energy storing device of claim 1, further comprising an interconnect board including an electrically conductive surface comprising a connection pattern that provides selective connectivity with the electrochemical cells.

15. The electrochemical energy storing device of claim 14, wherein the interconnect board, the electrochemical cells, and the thermal conductors are disposed in a hermetically sealed enclosure of the energy storing device.

16. The electrochemical energy storing device of claim 1, wherein the first electrically resistive surface comprises an electrically insulating surface.

17. The electrochemical energy storing device of claim 1, wherein the electrically resistive surface comprises an anodized metallic material.

18. An electrochemical energy storing device, comprising:
an enclosure including a thermally conductive first wall and a second wall;
an electrically resistive material disposed on or adjacent to the first wall;
a plurality of thin-film electrochemical cells maintained in a state of compression and disposed between the first and second walls;
a plurality of thermal conductors, each of the plurality of thermal conductors attached to one of the plurality of electrochemical cells, the thermal conductors defining a current flux path for conducting current to and from the electrochemical cells, and defining a thermal flux path for conducting thermal energy between the electrochemical cells and the first wall of the enclosure;
a cover of the enclosure defining first and second holes through which positive and negative conduits respectively pass; and
a hermetic seal respectively disposed between the positive and negative conduits and respective perimeters of the first and second holes in the cover.

19. The electrochemical energy storing device of claim 18, wherein the thermal conductors maintain substantially continuous mechanical engagement with the first wall of the enclosure in response to relative movement between the electrochemical cells and the first wall.

20. The electrochemical energy storing device of claim 18, wherein the thermal conductors expand and contract to accommodate variations in a separation distance between the electrochemical cells and the first wall.

21. The electrochemical energy storing device of claim 18, wherein the thermal conductors each comprises a spring mechanism having one of a substantially C-shaped, double C-shaped, Z-shaped, V-shaped, L-shaped, finger-shaped or O-shaped cross-section.

22. The electrochemical energy storing device of claim 18, further comprising one of an internal pressure apparatus or an external pressure apparatus, with respect to the electrochemical cells, that maintains the electrochemical cells in the state of compression.

23. The electrochemical energy storing device of claim 18, wherein at least some of the plurality of electrochemical cells comprise one of a foam element or a metal spring element to maintain the plurality of electrochemical cells in the state of compression.

24. The electrochemical energy storing device of claim 18, further comprising a resilient band encompassing the electrochemical cells, the resilient band including one of a wave spring or elastic material for maintaining the electrochemical cells in the state of compression.

25. The electrochemical energy storing device of claim 18, further comprising a plurality of short-circuit protection devices, each of the plurality of short-circuit protection devices being coupled in series to one of the plurality of electrochemical cells, a particular short-circuit protection device of the plurality of short-circuit protection devices coupled to a particular cell of the plurality of electrochemical cells being activated by a current spike capacitively produced upon development of a short in the particular cell, the particular cell being electrically isolated from other ones of the plurality of electrochemical cells upon activation of the particular short-circuit device.

26. The electrochemical energy storing device of claim 25, wherein the short-circuit protection devices, the electrochemical cells, and the thermal conductors are disposed in the enclosure which forms a heretic seal with the cover.

27. The electrochemical energy storing device of claim 18, wherein:
the plurality of electrochemical cells are arranged such that a planar surface of a particular cell of the plurality of cells is in thermal contact with a planar surface of a cell disposed adjacent the particular cell; and
the planar surfaces of the particular cell and the adjacent cell each have a ratio of energy content-to-contact surface area such that thermal energy produced by a short-circuit condition arising in the particular cell is conducted to the adjacent cell so as to prevent a temperature of the particular cell from exceeding a breakdown temperature.

28. The electrochemical energy storing device of claim 18, further comprising a cooling apparatus in thermal contact with the first wall of the enclosure, a heat transfer medium provided within the cooling apparatus to enhance thermal energy conduction between the electrochemical cells and the first wall.

29. The electrochemical energy storing device of claim 28, wherein the cooling apparatus comprises a plate heat exchanger defining a gap through which the heat transfer medium passes.

30. The electrochemical energy storing device of claim 18, wherein each of the thermal conductors is spot welded to a metalization layer provided along an edge of a respective electrochemical cell, the current being conducted laterally along the metalization layer.

31. The electrochemical energy storing device of claim 18, wherein the electrochemical cells are arranged in a stacked configuration and selectively interconnected in a series or parallel relationship.

32. The electrochemical energy storing device of claim 18, further comprising an interconnect board disposed in the enclosure and coupled to first and second terminals passing through the first and second holes of the cover, the interconnect board including an electrically conductive surface comprising a connection pattern that provides selective connectivity with the electrochemical cells.

33. The electrochemical energy storing device of claim 18, wherein the electrically resistive material disposed on or adjacent to the first wall comprises an electrically insulating material.

34. A method of transferring thermal energy and electrical current into and out of thin-film electrochemical cells encased in a housing, comprising:

conducting current over a current flux path defined between the electrochemical cells and a contact external to the electrochemical cells;

conducting thermal energy, using a portion of the current flux path and a thermal flux path substantially separate from the current flux path, between the electrochemical cells and thermally conductive material disposed adjacent the thermal conductors;

maintaining mechanical contact between the thermal conductors and the thermally conductive material in the presence of relative movement between the electrochemical cells and the thermally conductive material; and maintaining the electrochemical cells in a state of compression.

35. The method of claim 34, further comprising regulating the thermal energy conduction using a heat transfer apparatus external to the electrochemical cells and in thermal contact with the thermally conductive material.

36. The method of claim 34, wherein maintaining the electrochemical cell in the state of compression comprises generating a compressive force external to the electrochemical cells.

37. The method of claim 34, wherein maintaining the electrochemical cells in the state of compression comprises generating a compressive force internal to selected ones of the plurality of electrochemical cells.

* * * * *

UNITED STATES PATENT AND TRADEMARK OFFICE
CERTIFICATE OF CORRECTION

PATENT NO.   : 6,087,036
DATED        : July 11, 2000
INVENTOR(S)  : Rouillard et al.

It is certified that error appears in the above-identified patent and that said Letters Patent is hereby corrected as shown below:

Title page,
Item [56], References Cited, U.S. PATENT DOCUMENTS, please replace "5,618,541" with -- 5,618,641 --.

Column 4,
Line 52, please replace "=internal" with -- internal --.

Column 8,
Line 52, please replace "typical" with -- typically --.

Column 12,
Line 66, please add after "[3])." and at the beginning of a new paragraph -- Equation [5] characterizes the maximum cell temperature for a module having cells of the same technology as that implicated in Equations [3]-[4] which incorporate a foam core element that is thinner than the element associated with Equation [4] above. More specifically, Equation [5] below assumes that a foam core element having a thickness of approximately 1/32 inches is provided in every two cells of the cell stack.
The foam core element is fabricated from Poron S2000. The maximum cell temperature for a module having this configuration is given by:

$$T_{max} = 1/1.1 \bullet 0.037738 \bullet (1/p_{cell} \bullet Cp_{cell}))^{0.3856} \bullet (Q/k_{cell}) \bullet (\delta)^{0.6146} \bullet (K/L)^{-0.077} \quad [5]$$

It is noted that the term $P_{cell} \bullet Cp_{cell}$ allows Equations [3]-[5] to be used to quantify the effect of heat capacity of the components within the cell on the maximum cell temperature, $T_{max}$, reached during a short-circuit event. These equations, therefore, may be used to characterize maximum cell temperatures under similar situations for energy storing cells of differing technologies.

These equations may also be employed to characterize the effects of modifications and improvements in cell design and construction. It is noted that the numerical simulations used to develop Equations [3]-[5] were directed to the investigation of electrochemical cells having an energy content that varied from approximately 30 to 40 Wh, a cell thickness, $\delta$, that varies from approximately 5.4 and 7.8mm, and cells that utilize a thermal conductor having a --.

UNITED STATES PATENT AND TRADEMARK OFFICE
CERTIFICATE OF CORRECTION

PATENT NO.    : 6,087,036
DATED         : July 11, 2000
INVENTOR(S)   : Rouillard et al.

It is certified that error appears in the above-identified patent and that said Letters Patent is hereby corrected as shown below:

Column 14,
Line 27, please delete "the".

Column 33,
Line 3, please replace "the" with -- that --.

Signed and Sealed this

Twenty-fourth Day of December, 2002

JAMES E. ROGAN
*Director of the United States Patent and Trademark Office*